US012607791B2

(12) United States Patent
Lai et al.

(10) Patent No.: US 12,607,791 B2
(45) Date of Patent: Apr. 21, 2026

(54) IMAGING LENS, CAMERA MODULE AND ELECTRONIC DEVICE

(71) Applicant: LARGAN PRECISION CO., LTD., Taichung City (TW)

(72) Inventors: Yu Chen Lai, Taichung City (TW); Chien-Hsun Wu, Taichung City (TW); Ming-Ta Chou, Taichung City (TW); Wen-Yu Tsai, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 358 days.

(21) Appl. No.: 18/229,114

(22) Filed: Aug. 1, 2023

(65) Prior Publication Data

US 2024/0295681 A1 Sep. 5, 2024

Related U.S. Application Data

(60) Provisional application No. 63/449,838, filed on Mar. 3, 2023.

(51) Int. Cl.
*G02B 5/20* (2006.01)
*G02B 5/22* (2006.01)
(Continued)

(52) U.S. Cl.
CPC .............. *G02B 5/208* (2013.01); *G02B 5/22* (2013.01); *G02B 7/021* (2013.01); *H04N 23/55* (2023.01)

(58) Field of Classification Search
CPC .......... G02B 5/208; G02B 5/22; G02B 5/282; G02B 5/226; G02B 1/11; G02B 1/118; G02B 7/021
(Continued)

(56) References Cited

U.S. PATENT DOCUMENTS 9,188,707 B2    11/2015 Lin et al.
9,268,072 B2    2/2016 Hasegawa et al.
(Continued)

FOREIGN PATENT DOCUMENTS

CN        111201455 A      5/2020
CN        112180487 A  *  1/2021   ............. G02B 7/021
(Continued)

OTHER PUBLICATIONS

Thorlabs Optical Coatings. Product description [online]. Page for AR Coatings. Thorlabs, 2025 [retrieved on Sep. 15, 2025]. Retrieved from the Internet: <URL: https://www.thorlabs.com/newgrouppage9. cfm?objectgroup_id=5840> (Year: 2025).*
(Continued)

*Primary Examiner* — Balram T Parbadia
*Assistant Examiner* — Seth D Moser
(74) *Attorney, Agent, or Firm* — R. Burns Israelsen

(57) ABSTRACT

An imaging lens includes a central optical path, a plurality of lens elements sequentially arranged along the central optical path, a wide-range low reflection layer, and an infrared light reduction layer. The plurality of lens elements include a first lens element. The wide-range low reflection layer is disposed on an object-side surface of the first lens element, and the average reflectance of the wide-range low reflection layer to light with a wavelength ranging from 750 to 1050 nanometers is less than or equal to 0.98%. The infrared light reduction layer is located closer to an image side than the wide-range low reflection layer, and the average reflectance of the infrared light reduction layer to light with a wavelength ranging from 750 to 1050 nanometers is greater than or equal to 50%. The central optical path passes through a paraxial region of the first lens element.

40 Claims, 48 Drawing Sheets

1

(51) Int. Cl.
    *G02B 7/02*     (2021.01)
    *H04N 23/55*     (2023.01)

(58) Field of Classification Search
    USPC .......................................... 359/359, 356, 355
    See application file for complete search history.

(56)              References Cited

U.S. PATENT DOCUMENTS

| | | | |
|---|---|---|---|
| 9,772,433 | B2 | 9/2017 | Chang et al. |
| 2001/0004300 | A1 | 6/2001 | Tanaka et al. |
| 2005/0233113 | A1 | 10/2005 | Kotani et al. |
| 2006/0134433 | A1 | 6/2006 | Maula et al. |
| 2006/0199040 | A1 | 9/2006 | Yamada et al. |
| 2008/0102259 | A1 | 5/2008 | Nikolov et al. |
| 2009/0022954 | A1 | 1/2009 | Kotani et al. |
| 2009/0081361 | A1 | 3/2009 | Yamada et al. |
| 2009/0219620 | A1 | 9/2009 | Yamada et al. |
| 2010/0119782 | A1 | 5/2010 | Ohgane |
| 2010/0220377 | A1 | 9/2010 | Yamada et al. |
| 2011/0019277 | A1 | 1/2011 | Sager et al. |
| 2011/0176216 | A1 | 7/2011 | Kawauchi et al. |
| 2012/0075688 | A1 | 3/2012 | Yamada et al. |
| 2012/0081792 | A1 | 4/2012 | Neuffer |
| 2012/0176681 | A1 | 7/2012 | Chang et al. |
| 2012/0212827 | A1 | 8/2012 | Kakegawa |
| 2012/0275027 | A1 | 11/2012 | Okuno |
| 2013/0016430 | A1 | 1/2013 | Ogawa et al. |
| 2013/0027779 | A1 | 1/2013 | Okuno et al. |
| 2013/0140675 | A1 | 6/2013 | Chen et al. |
| 2013/0201562 | A1 | 8/2013 | Kawagishi et al. |
| 2013/0228942 | A1 | 9/2013 | Ohgane |
| 2013/0258480 | A1 | 10/2013 | Makino et al. |
| 2013/0260096 | A1 | 10/2013 | Shiki et al. |
| 2013/0271842 | A1 | 10/2013 | Miyahara et al. |
| 2013/0273317 | A1 | 10/2013 | Nakayama |
| 2013/0329295 | A1 | 12/2013 | Okuno |
| 2014/0016188 | A1* | 1/2014 | Liu .................... G02B 13/0035 359/356 |
| 2014/0016189 | A1 | 1/2014 | Tamura et al. |
| 2014/0063610 | A1 | 3/2014 | Murata et al. |
| 2014/0091419 | A1 | 4/2014 | Hasegawa et al. |
| 2014/0117397 | A1 | 5/2014 | Saeki et al. |
| 2014/0254019 | A1 | 9/2014 | Murata et al. |
| 2014/0320968 | A1 | 10/2014 | Murata et al. |
| 2014/0320970 | A1 | 10/2014 | Kamiyam et al. |
| 2014/0329072 | A1 | 11/2014 | Hirasawa et al. |
| 2015/0103226 | A1 | 4/2015 | Takahashi et al. |
| 2015/0153484 | A1 | 6/2015 | Neuffer |
| 2015/0160377 | A1 | 6/2015 | Kuroda et al. |
| 2015/0369967 | A1 | 12/2015 | Okuno et al. |
| 2016/0054476 | A1 | 2/2016 | Choi et al. |
| 2016/0216409 | A1 | 7/2016 | Schulz et al. |
| 2016/0349420 | A1 | 12/2016 | Chang et al. |
| 2016/0377767 | A1 | 12/2016 | Sonoda et al. |
| 2017/0160437 | A1 | 6/2017 | Nakayama |
| 2017/0212278 | A1 | 7/2017 | Abe |
| 2017/0219749 | A1* | 8/2017 | Hou ................. B29D 11/00634 |
| 2017/0248739 | A1* | 8/2017 | Matsuo .................. G02B 5/208 |
| 2017/0276839 | A1 | 9/2017 | Teramoto |
| 2018/0100957 | A1 | 4/2018 | Ye et al. |
| 2018/0194619 | A1 | 7/2018 | Greer et al. |
| 2018/0203162 | A1 | 7/2018 | Schulz et al. |
| 2019/0016593 | A1 | 1/2019 | Greer et al. |
| 2019/0196064 | A1 | 6/2019 | Nakamura et al. |
| 2020/0240011 | A1 | 7/2020 | Kauppinen et al. |
| 2022/0187504 | A1* | 6/2022 | Zhang .................... G02B 5/208 |
| 2023/0204835 | A1* | 6/2023 | Heo ......................... G02B 1/02 359/359 |
| 2024/0125990 | A1* | 4/2024 | Jung ...................... G02B 5/282 |
| 2025/0180791 | A1* | 6/2025 | Orita ...................... C09B 23/04 |

FOREIGN PATENT DOCUMENTS

| | | | |
|---|---|---|---|
| JP | 2001-017907 A | | 1/2001 |
| JP | 2011164583 A | * | 8/2011 |
| TW | M591177 U | | 2/2020 |
| TW | 1687717 B | | 3/2020 |
| TW | 202113424 A | | 4/2021 |
| TW | 202118835 A | | 5/2021 |

OTHER PUBLICATIONS

European Search Report issued in corresponding application No. 23197684.6, dated Mar. 12, 2024.

* cited by examiner

IMAGING LENS, CAMERA MODULE AND ELECTRONIC DEVICE

RELATED APPLICATIONS

This application claims priority to U.S. Provisional Application No. 63/449,838, filed on Mar. 3, 2023, which is incorporated by reference herein in its entirety.

BACKGROUND

Technical Field

The present disclosure relates to an imaging lens, a camera module and an electronic device, more particularly to an imaging lens and a camera module applicable to an electronic device.

Description of Related Art

With the development of technology, featuring high image quality becomes one of the indispensable features of an optical system nowadays. Furthermore, electronic devices equipped with optical systems are trending towards multi-functionality for various applications, and therefore the functionality requirements for the optical systems have been increasing.

However, some elements in conventional optical systems are difficult to meet the requirement of high optical quality of an electronic device under diversified development in recent years, especially a coating disposed on a lens element for reducing reflection of visible light. The conventional coating can reduce the reflection of visible light, but still has relatively high reflectance to infrared light. This leads glare, or even ghost image, to be easily generated due to reflection between lens elements and thus significantly affects image quality, thereby unable to meet the optical quality requirement in the market of the current technology trends. Therefore, how to reduce glare and ghost image for meeting the requirement of high-end-specification electronic devices is an important topic in this field nowadays.

SUMMARY

According to one aspect of the present disclosure, an imaging lens has a central optical path and includes a plurality of lens elements, a wide-range low reflection layer and an infrared light reduction layer. The plurality of lens elements are sequentially arranged along the central optical path. The plurality of lens elements include a first lens element and at least one subsequent lens element, and the first lens element is located closer to an object side than the at least one subsequent lens element. The wide-range low reflection layer is disposed on an object-side surface of the first lens element, and an average reflectance of the wide-range low reflection layer to light with a wavelength ranging from 750 to 1050 nanometers is less than or equal to 0.98%. The infrared light reduction layer is located closer to an image side than the wide-range low reflection layer, and an average reflectance of the infrared light reduction layer to light with the wavelength ranging from 750 to 1050 nanometers is greater than or equal to 50%. The central optical path passes through a paraxial region of the first lens element.

When a thickness of the first lens element along the central optical path is T, a distance along the central optical path between the wide-range low reflection layer and the infrared light reduction layer is D, a curvature radius of the wide-range low reflection layer in a region where the central optical path passes is R1, and a curvature radius of the infrared light reduction layer in a region where the central optical path passes is R2, the following conditions are satisfied:

$$0.11 \leq T/D \leq 10;$$

and $$0 \leq R1/R2 \leq 1.48.$$

According to another aspect of the present disclosure, an imaging lens has a central optical path and includes a plurality of lens elements, a wide-range low reflection layer and an infrared light reduction layer. The plurality of lens elements are sequentially arranged along the central optical path. The plurality of lens elements include a first lens element and at least one subsequent lens element, and the first lens element is located closer to an object side than the at least one subsequent lens element. The wide-range low reflection layer is disposed on an object-side surface of the first lens element, and an average reflectance of the wide-range low reflection layer to light with a wavelength ranging from 750 to 1050 nanometers is less than or equal to 0.98%. The infrared light reduction layer is located closer to an image side than the wide-range low reflection layer, and an average reflectance of the infrared light reduction layer to light with the wavelength ranging from 750 to 1050 nanometers is greater than or equal to 50%. The central optical path passes through a paraxial region of the first lens element.

When a thickness of the first lens element along the central optical path is T, and a distance along the central optical path between the wide-range low reflection layer and the infrared light reduction layer is D, the following condition is satisfied:

$$0.11 \leq T/D \leq 1.0.$$

According to another aspect of the present disclosure, an imaging lens has a central optical path and includes a plurality of lens elements, a wide-range low reflection layer and an infrared light reduction layer. The plurality of lens elements are sequentially arranged along the central optical path. The plurality of lens elements include a first lens element and at least one subsequent lens element, and the first lens element is located closer to an object side than the at least one subsequent lens element. The wide-range low reflection layer is disposed on an object-side surface of the first lens element, and an average reflectance of the wide-range low reflection layer to light with a wavelength ranging from 750 to 1050 nanometers is less than or equal to 0.98%. The infrared light reduction layer is located closer to an image side than the wide-range low reflection layer, and an average reflectance of the infrared light reduction layer to light with the wavelength ranging from 750 to 1050 nanometers is greater than or equal to 50%.

When a curvature radius of the wide-range low reflection layer in a region where the central optical path passes is R1, and a curvature radius of the infrared light reduction layer in a region where the central optical path passes is R2, the following condition is satisfied:

$$0 \le R1/R2 \le 1.48.$$

According to another aspect of the present disclosure, a camera module includes one of the aforementioned imaging lenses.

According to another aspect of the present disclosure, an electronic device includes the aforementioned camera module and an image sensor, wherein the image sensor is disposed on an image surface of the imaging lens.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
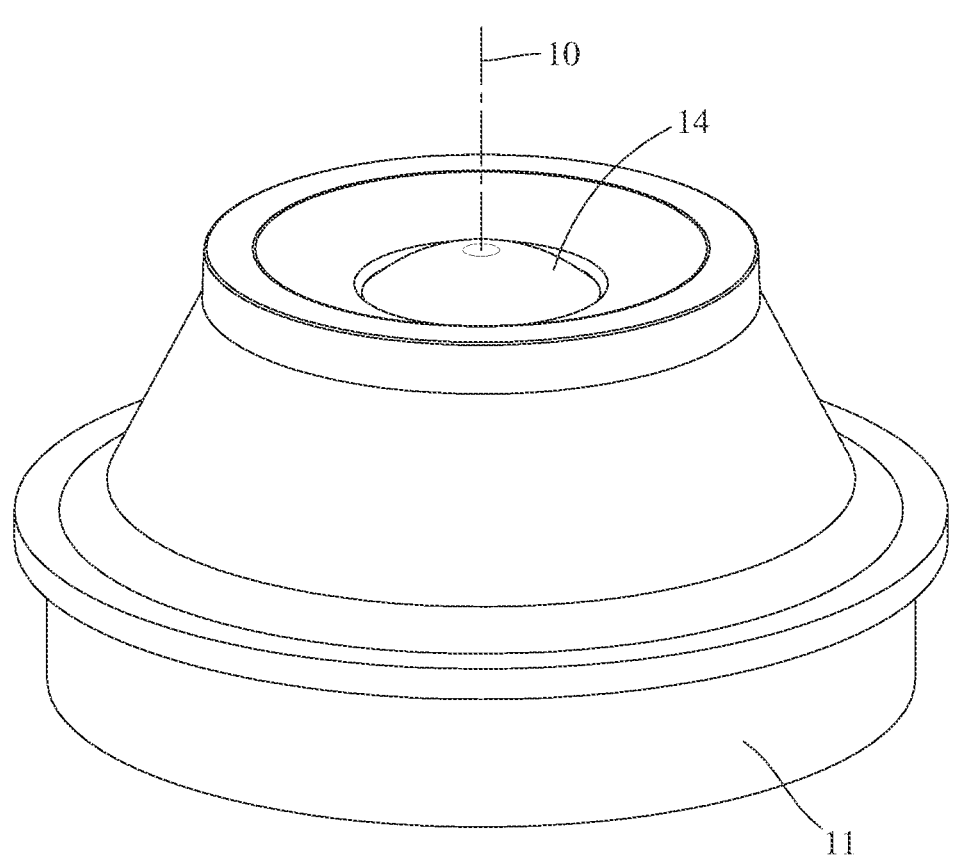
FIG. 1 is a perspective view of an imaging lens according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 46:
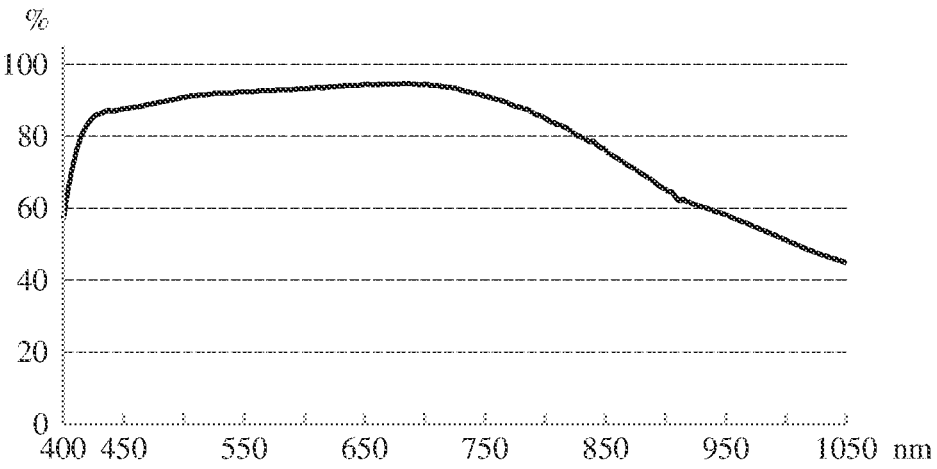
FIG. 46 is a chart showing the transmittance of a lens according to prior art to light with various wavelengths.
Figure 47:
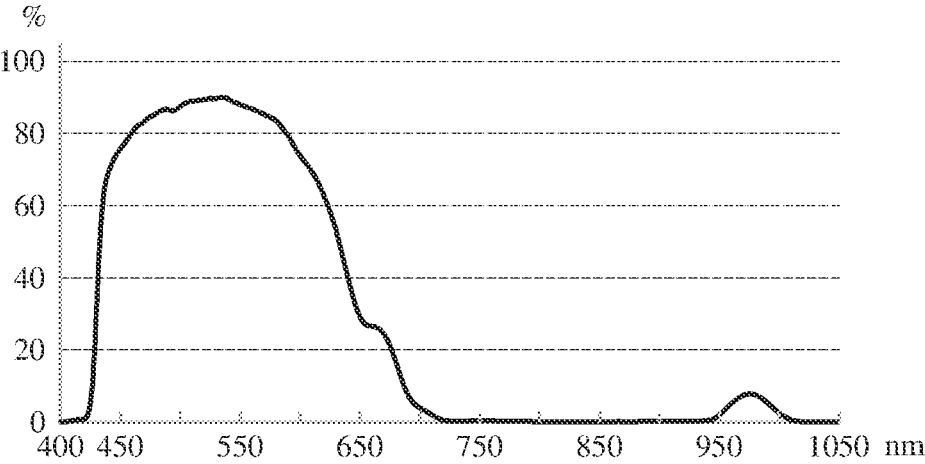
FIG. 47 is a chart showing the transmittance of an imaging lens according to one embodiment of the present to light with various wavelengths.
Figure 48:
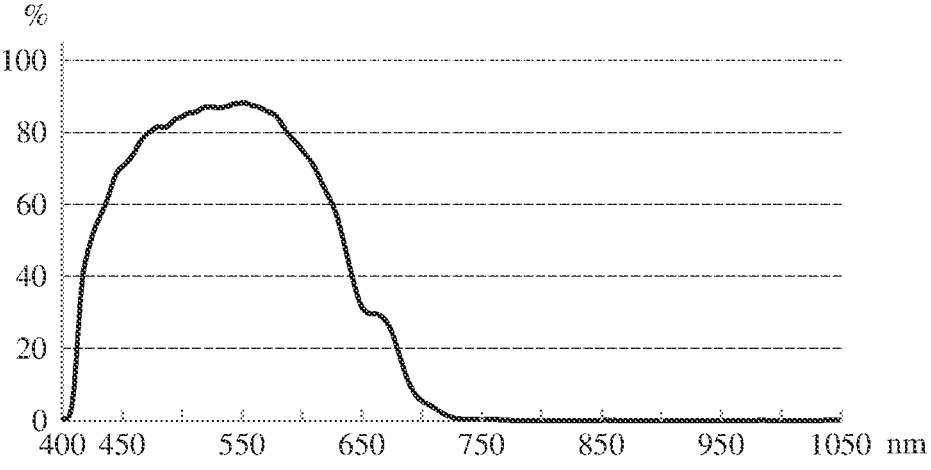
FIG. 48 is a chart showing the transmittance of an imaging lens according to another embodiment of the present to light with various wavelengths.

The present disclosure provides an imaging lens that can be applied to a camera module. Moreover, an average transmittance of the imaging lens to light with a wavelength ranging from 750 to 1050 nanometers (nm) can be less than or equal to 10%. Therefore, it is favorable for maximally preventing infrared light from entering into an image sensor of the camera module so as to ensure image quality of the lens. Moreover, the average transmittance of the imaging lens to light with the wavelength ranging from 750 to 1050 nanometers can also be less than or equal to 3%. Please refer to FIG. 46 to FIG. 48, as shown in FIG. 46, a transmittance of a lens according to prior art to light with the wavelength ranging from 750 to 1050 nanometers is greater than or equal to 40%; as shown in FIG. 47, a transmittance of an imaging lens according to one embodiment of the present disclosure to light with the wavelength ranging from 750 to 1050 nanometers is less than or equal to 10%; and as shown in FIG. 48, a transmittance of an imaging lens according to another embodiment of the present disclosure to light with the wavelength ranging from 750 to 1050 nanometers is less than or equal to 3%.

The imaging lens has a central optical path and includes a plurality of lens elements, a wide-range low reflection layer and an infrared light reduction layer.

The plurality of lens elements are sequentially arranged along the central optical path. The plurality of lens elements include a first lens element and at least one subsequent lens element, and the first lens element is located closer to an object side than the at least one subsequent lens element.

The first lens element has a paraxial region which the central optical path can pass through. Moreover, the first lens element can be configured to absorb infrared light and can have an absorption peak value within an infrared band ranging from 600 to 850 nanometers. Specifically, the first lens element can have a function of absorbing infrared light so as to be combined with the infrared light reduction layer for ensuring the function of filtering infrared light. Therefore, it is favorable for absorbing optical energy in the infrared band that has a relatively greater influence on the image sensor, thereby improving optical quality. Moreover, the first lens element can be a plastic lens element or a glass lens element, and can achieve the abovementioned infrared-light-absorption function by a chosen material or an added additive with a characteristic of absorbing infrared light. Moreover, the first lens element can have positive refractive power. Therefore, it is favorable for having convergence function of the first lens element so as to improve working efficiency of the infrared light reduction layer.

Figure 49:
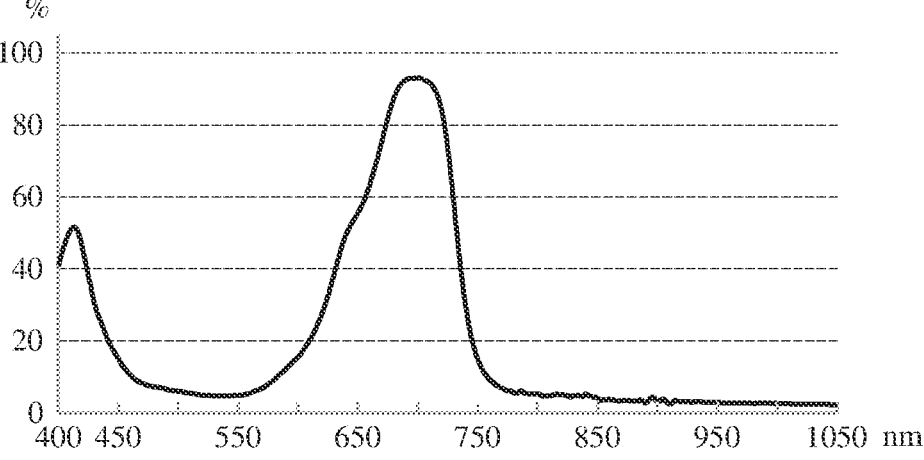
FIG. 49 is a chart showing the absorbance of an infrared light absorption lens element according to one embodiment of the present disclosure to light with various wavelengths.
Figure 50:
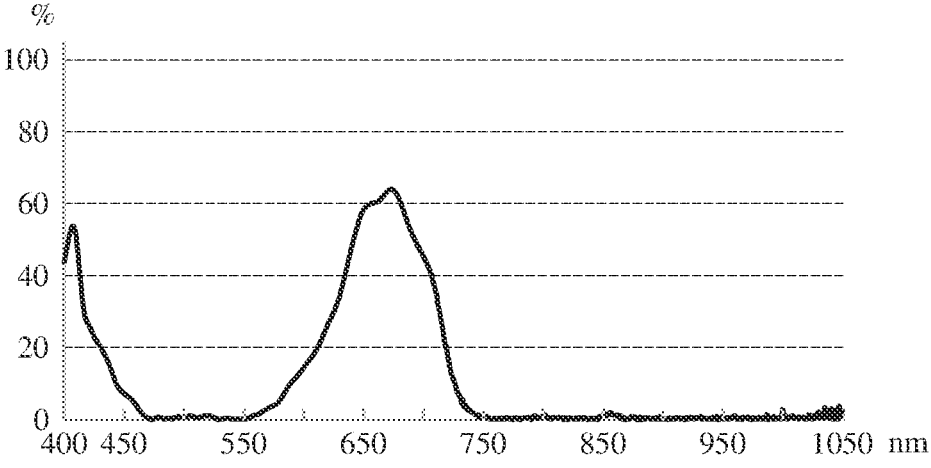
FIG. 50 is a chart showing the absorbance of an infrared light absorption lens element according to another embodiment of the present disclosure to light with various wavelengths.

At least one of the plurality of lens elements can be an infrared light absorption lens element. Moreover, the at least one subsequent lens element can include the infrared light absorption lens element. The infrared light absorption lens element can be disposed between the wide-range low reflection layer and the infrared light reduction layer. The infrared light absorption lens element has a paraxial region which the central optical path can pass through. Please refer to FIG. 49 to FIG. 50, as shown in FIG. 49, the infrared light absorption lens element according to one embodiment of the present disclosure has an absorption peak value at the infrared wavelength of 701 nanometers; and as shown in FIG. 50, the infrared light absorption lens element according to another embodiment of the present disclosure has an absorption peak value at the infrared wavelength of 673 nanometers.

Figure 51:
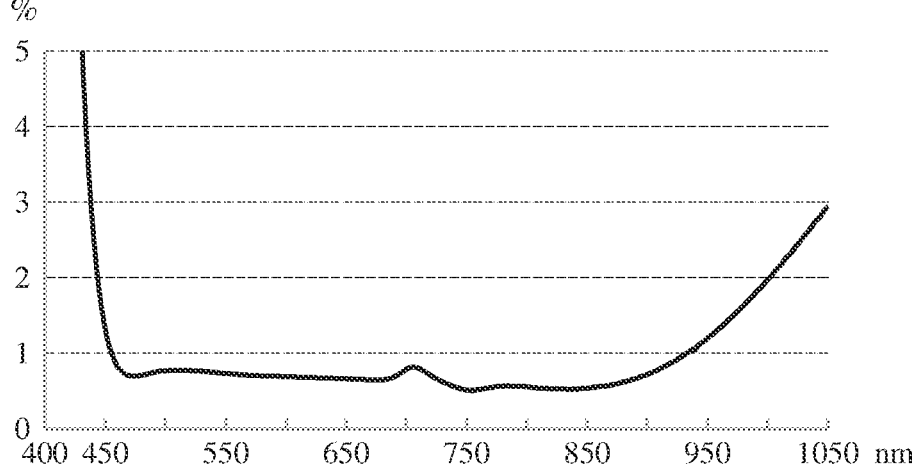
FIG. 51 is a chart showing the reflectance of an anti-reflection layer according to prior art to light with various wavelengths.
Figure 52:
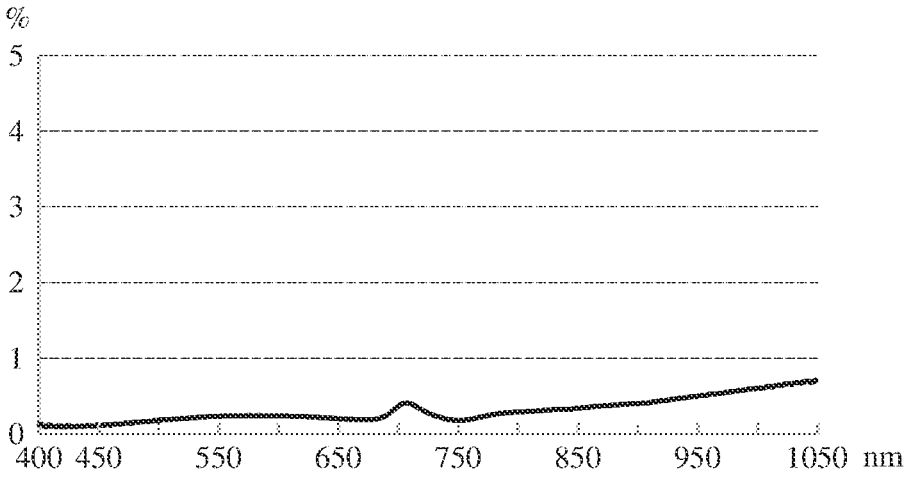
FIG. 52 is a chart showing the reflectance of a wide-range low reflection layer according to one embodiment of the present disclosure to light with various wavelengths.
Figure 53:
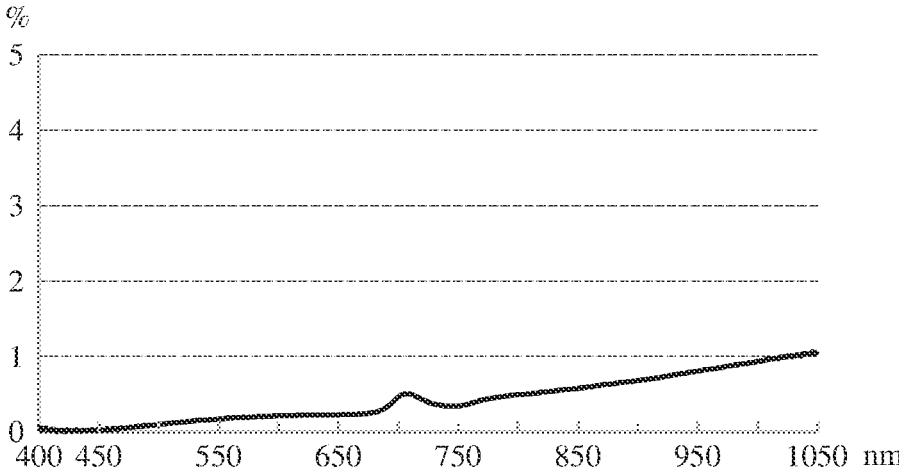
FIG. 53 is a chart showing the reflectance of a wide-range low reflection layer according to another embodiment of the present disclosure to light with various wavelengths.

The wide-range low reflection layer is disposed on an object-side surface of the first lens element, and an average reflectance of the wide-range low reflection layer to light with the wavelength ranging from 750 to 1050 nanometers is less than or equal to 0.98%. Therefore, the wide-range low reflection layer is favorable for preventing light reflected on the infrared light reduction layer from being further reflected several times between the lens elements, which can ensure image quality. Moreover, an average reflectance of the wide-range low reflection layer to light with a wavelength ranging from 400 to 1050 nanometers can be less than or equal to 0.98%. Therefore, the wide-range low reflection layer is favorable for having anti-reflection ability for visible spectrum so as to further have anti-reflection ability for near ultraviolet light. Moreover, the average reflectance of the wide-range low reflection layer to light with the wavelength ranging from 400 to 1050 nanometers can also be less than or equal to 0.5%. Moreover, a reflectance difference of the wide-range low reflection layer to light with a wavelength ranging from 550 to 1050 nanometers can be less than or equal to 2%. Therefore, it is favorable for preventing color deviation after light passing through the lens. Please be noted that the reflectance difference refers to the difference between two reflectance values of the wide-range low reflection layer to light at any two wavelengths within 550 to 1050 nanometers, and the difference can be less than or equal to 2%. Moreover, the reflectance difference of the wide-range low reflection layer to light with the wavelength ranging from 550 to 1050 nanometers can also be less than or equal to 1%. Please refer to FIGS. 51 to 53, as shown in FIG. 51, an anti-reflection layer according to prior art has an average reflectance of 1.11% to light with the wavelength ranging from 750 to 1050 nanometers, has an average reflectance of 1.60% to light with the wavelength ranging from 400 to 1050 nanometers, and has a reflectance difference of 2.42% to light with the wavelength ranging from 550 to 1050 nanometers; as shown in FIG. 52, a wide-range low reflection layer according to one embodiment of the present disclosure has an average reflectance of 0.43% to light with the wavelength ranging from 750 to 1050 nanometers, has an average reflectance of 0.30% to light with the wavelength ranging from 400 to 1050 nanometers, and has a reflectance difference of 0.54% to light with the wavelength ranging from 550 to 1050 nanometers; as shown in FIG. 53, a wide-range low reflection layer according to another embodiment of the present disclosure has an average reflectance of 0.70% to light with the wavelength ranging from 750 to 1050 nanometers, has an average reflectance of 0.43% to light with the wavelength ranging from 400 to 1050 nanometers, and has a reflectance difference of 0.89% to light with the wavelength ranging from 550 to 1050 nanometers.

The wide-range low reflection layer can include a ridge structure layer thereon. The ridge structure layer can taper off along a direction away from the first lens element, and a height of the ridge structure layer can range from 120 to 300 nanometers. Therefore, it is favorable for further reducing light reflection on the wide-range low reflection layer. Moreover, the ridge structure layer can be oxides, such as oxides containing aluminum, silicon, zirconium, chromium, phosphorus, but the preset disclosure is not limited thereto. Moreover, an average height of the ridge structure layer can approximate 200 nanometers, but the present disclosure is not limited thereto.

Figure 54:
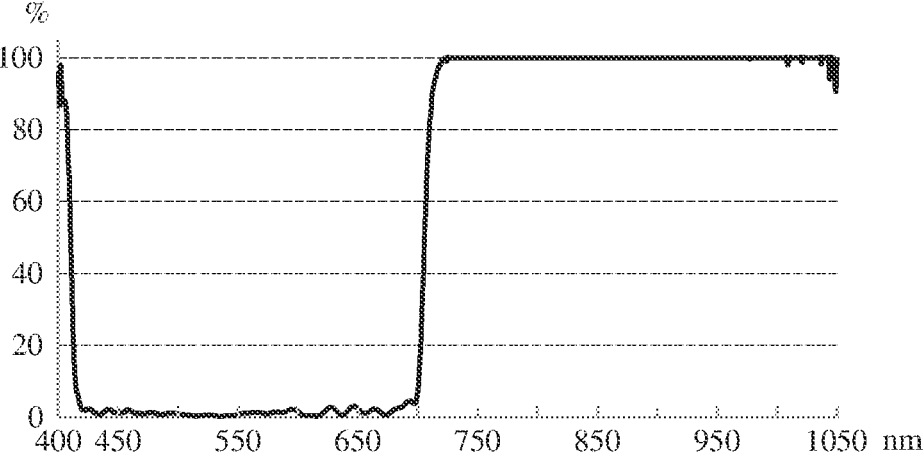
FIG. 54 is a chart showing the reflectance of an infrared light reduction layer according to one embodiment of the present disclosure to light with various wavelengths.
Figure 55:
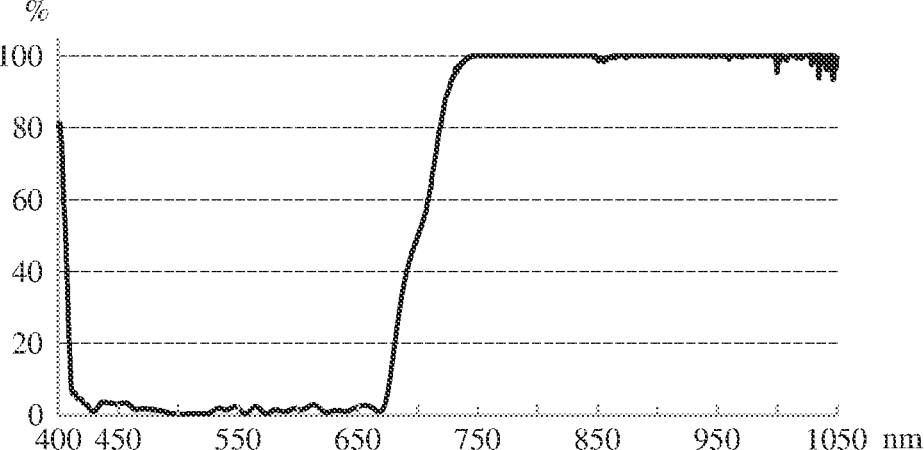
FIG. 55 is a chart showing the reflectance of an infrared light reduction layer according to another embodiment of the present disclosure to light with various wavelengths.

The infrared light reduction layer is located closer to an image side than the wide-range low reflection layer, and an average reflectance of the infrared light reduction layer to light with the wavelength ranging from 750 to 1050 nanometers is greater than or equal to 50%. Therefore, the high-reflection characteristic of the infrared light reduction layer to the infrared band is favorable for reducing infrared light transmission. Moreover, the infrared light reduction layer can be a multi-layer coating. Moreover, the infrared light reduction layer can be formed by coating. Moreover, the layer quantity of the infrared light reduction layer can range from 20 to 50 layers based on actual requirements and types of the layer material, but the present disclosure is not limited thereto. Moreover, the average reflectance of the infrared light reduction layer to light with the wavelength ranging from 750 to 1050 nanometers can also be greater than or equal to 80%. With the design of the multi-layer coating, the infrared light reduction layer can further have high-reflection characteristic to ultraviolet light in a specific band, which is able to prevent ultraviolet light from entering the imaging lens. Moreover, the average reflectance of the infrared light reduction layer to light with the wavelength ranging from 750 to 1050 nanometers can also be greater than or equal to 95%. Moreover, the infrared light reduction layer can be disposed on an image-side surface of the first lens element. Therefore, it is favorable for further ensuring the benefit of the imaging lens in infrared reduction. Please refer to FIG. 54 to FIG. 55, as shown in FIG. 54, an infrared light reduction layer according to one embodiment of the present disclosure has an average reflectance of 99.91% to light with the wavelength ranging from 750 to 1050 nanometers; as shown in FIG. 55, an infrared light reduction layer according to another embodiment of the present disclosure has an average reflectance of 99.80% to light with the wavelength ranging from 750 to 1050 nanometers.

Please be noted that the visible spectrum approximately ranges from 420 to 680 nanometers, and wavelengths ranging from 750 to 1050 nanometers are classified in the infrared band in the present disclosure.

When a thickness of the first lens element along the central optical path is T, and a distance along the central optical path between the wide-range low reflection layer and the infrared light reduction layer is D, the following condition can be satisfied: $0.11 \leq T/D \leq 1.0$. Therefore, it is favorable for preventing glare while ensuring the imaging lens has infrared-filtering ability. Moreover, the following condition can also be satisfied: $0.2 \leq T/D \leq 1.0$. Please refer to FIG. 3, which shows parameters T and D according to the 1st embodiment of the present disclosure. Please be noted that the thickness T along the central optical path and the distance D along the central optical path refer to the lengths where the central optical path passes instead of the maximum lengths in directions parallel to the central optical path.

When a thickness of the infrared light absorption lens element along the central optical path is T', and the distance along the central optical path between the wide-range low reflection layer and the infrared light reduction layer is D, the following condition can be satisfied: $0.18 \leq T'/D \leq 1.0$. Therefore, it is favorable for further preventing glare. Please be noted that the thickness T' along the central optical path and the distance D along the central optical path refer to the lengths where the central optical path passes instead of the maximum lengths in directions parallel to the central optical path.

When a curvature radius of the wide-range low reflection layer in a region where the central optical path passes is R1, and a curvature radius of the infrared light reduction layer in a region where the central optical path passes is R2, the following condition can be satisfied: $0 \leq R1/R2 \leq 1.48$. Therefore, it is favorable for ensuring compatibility between the wide-range low reflection layer and the infrared light reduction layer so as to ensure image quality. Moreover, the following condition can also be satisfied: $0 \leq R1/R2 \leq 0.8$. Please be noted that curvature radii referred herein are taken from their absolute values instead of indicating their convex or concave surface.

According to the present disclosure, the imaging lens can further include a second wide-range low reflection layer. The second wide-range low reflection layer can be similar to the abovementioned wide-range low reflection layer in function, and the second wide-range low reflection layer can face an image-side surface of the infrared light reduction layer. Therefore, it is favorable for further reducing glare generated at an image side of the infrared light reduction layer after light passing through the infrared light reduction layer.

The present disclosure provides a camera module, which includes the abovementioned imaging lens.

The present disclosure provides an electronic device, which includes the abovementioned camera module and the image sensor disposed on an image surface of the imaging lens.

According to the present disclosure, the electronic device can further include a cover element and an additional wide-range low reflection layer. The cover element is disposed at an object side of the imaging lens. The cover element has a light passable region disposed corresponding to the abovementioned wide-range low reflection layer. The additional wide-range low reflection layer is disposed on the light passable region. Therefore, it is favorable for further preventing glare generated between the abovementioned wide-range low reflection layer and the cover element.

According to the present disclosure, the aforementioned features and conditions can be utilized in numerous combinations so as to achieve corresponding effect.

According to the above description of the present disclosure, the following specific embodiments are provided for further explanation.

1st Embodiment

Figure 2:
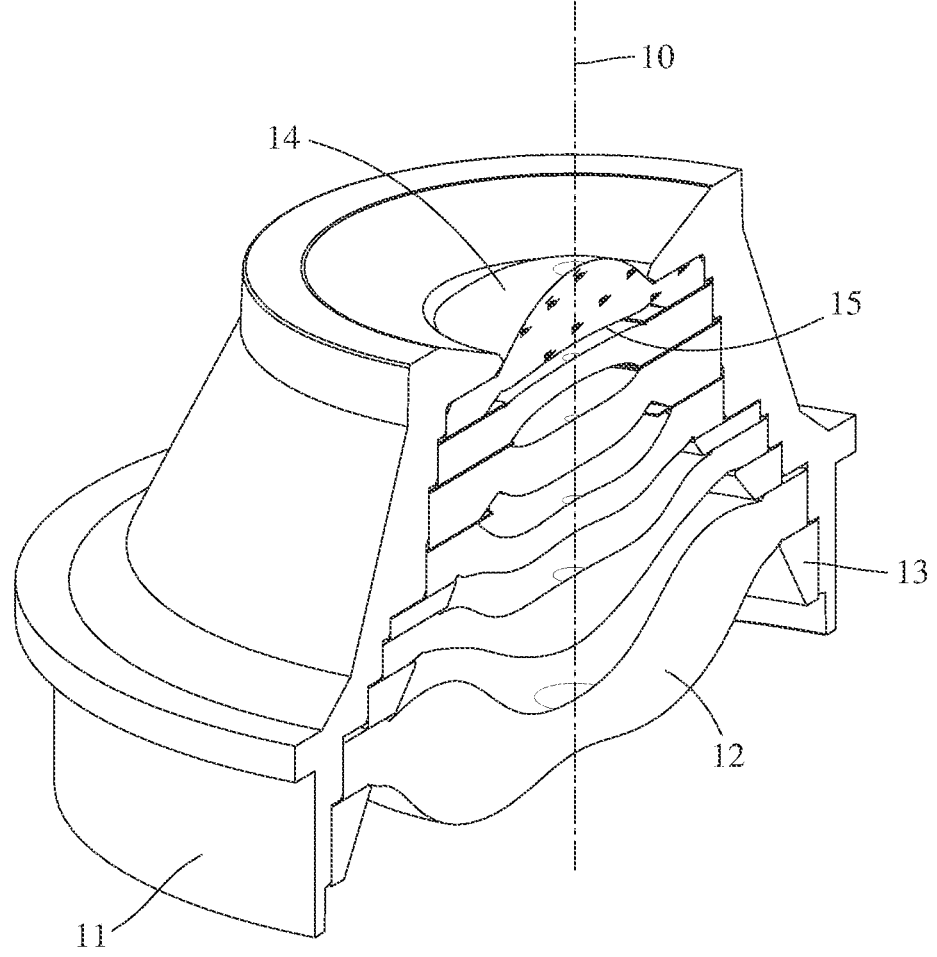
FIG. 2 is a perspective view of the imaging lens in FIG. 1 that has been sectioned.
Figure 3:
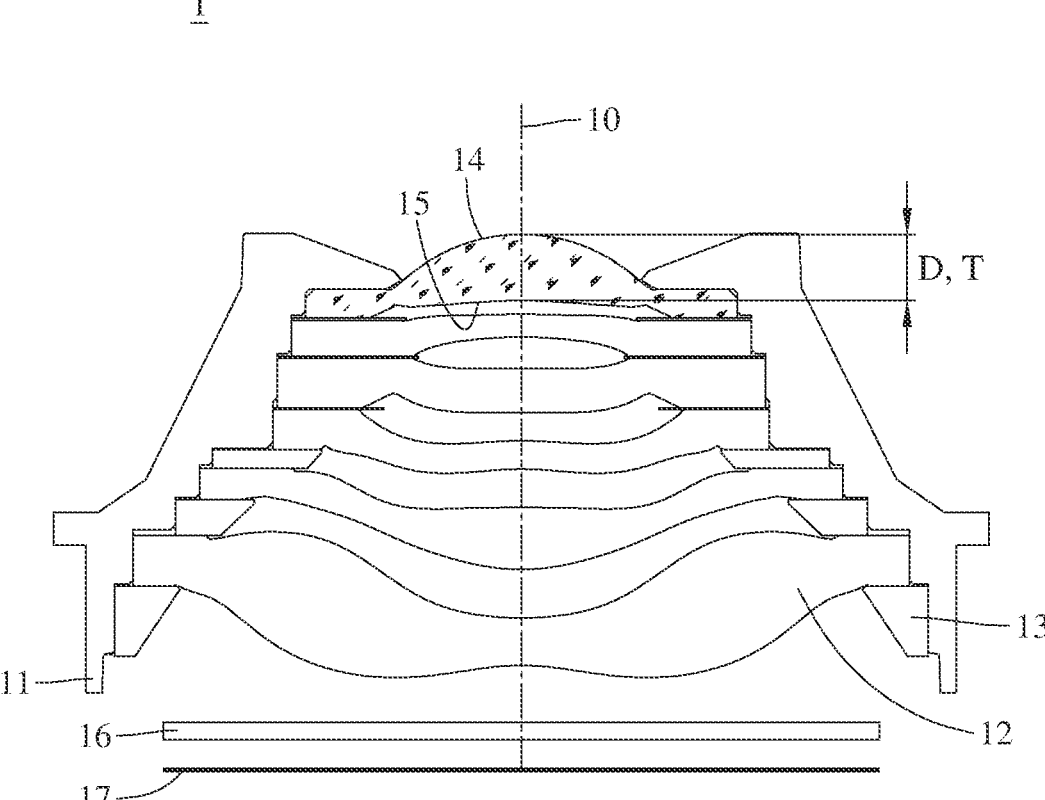
FIG. 3 is a cross-sectional view of the imaging lens in FIG. 1.
Figure 4:
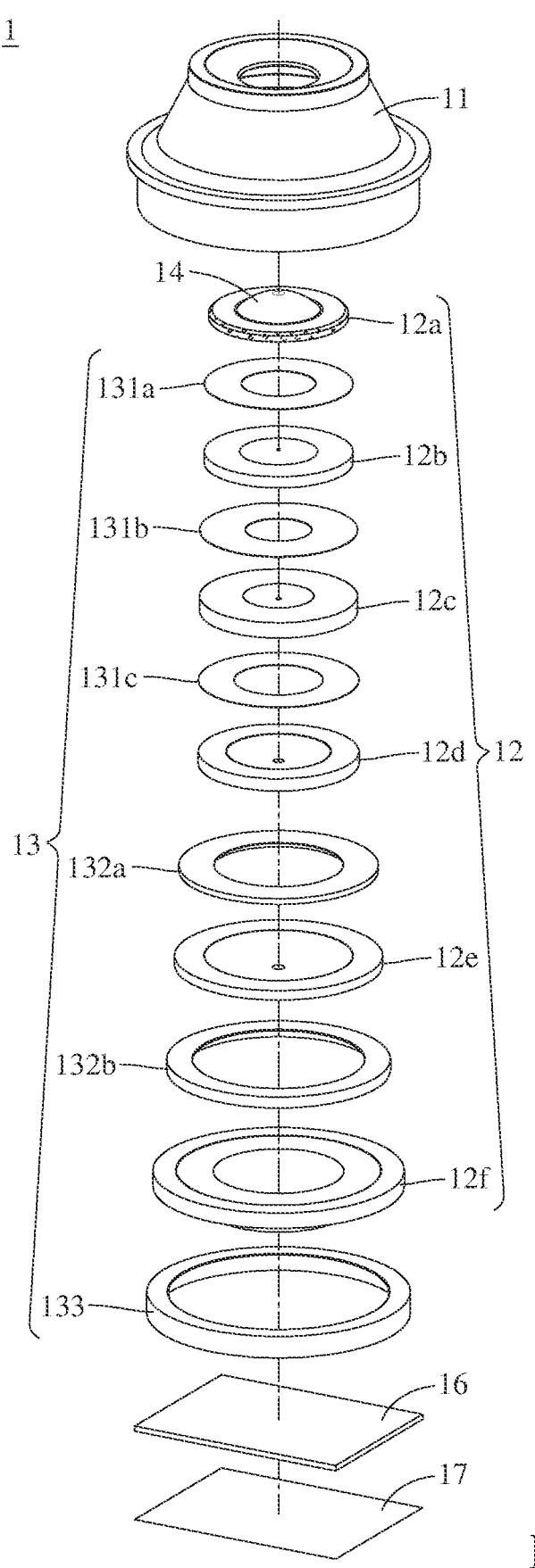
FIG. 4 is an exploded view of the imaging lens in FIG. 3.
Figure 5:
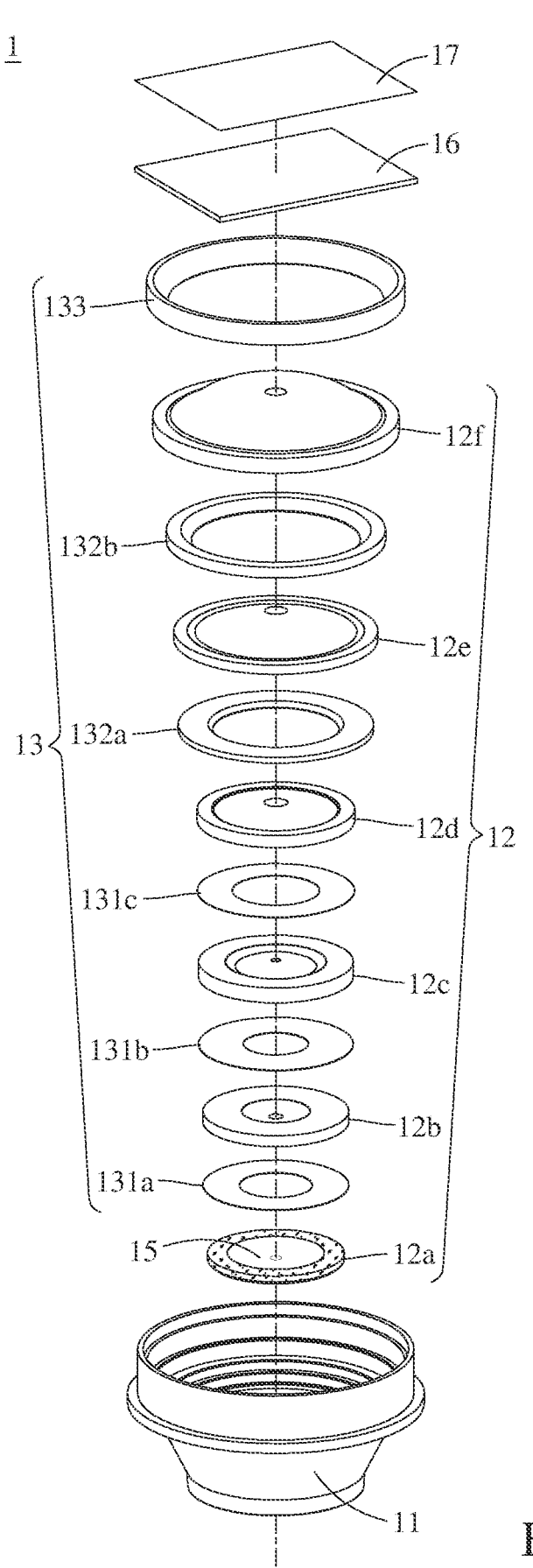
FIG. 5 is another exploded view of the imaging lens in FIG. 3.
Figure 6:
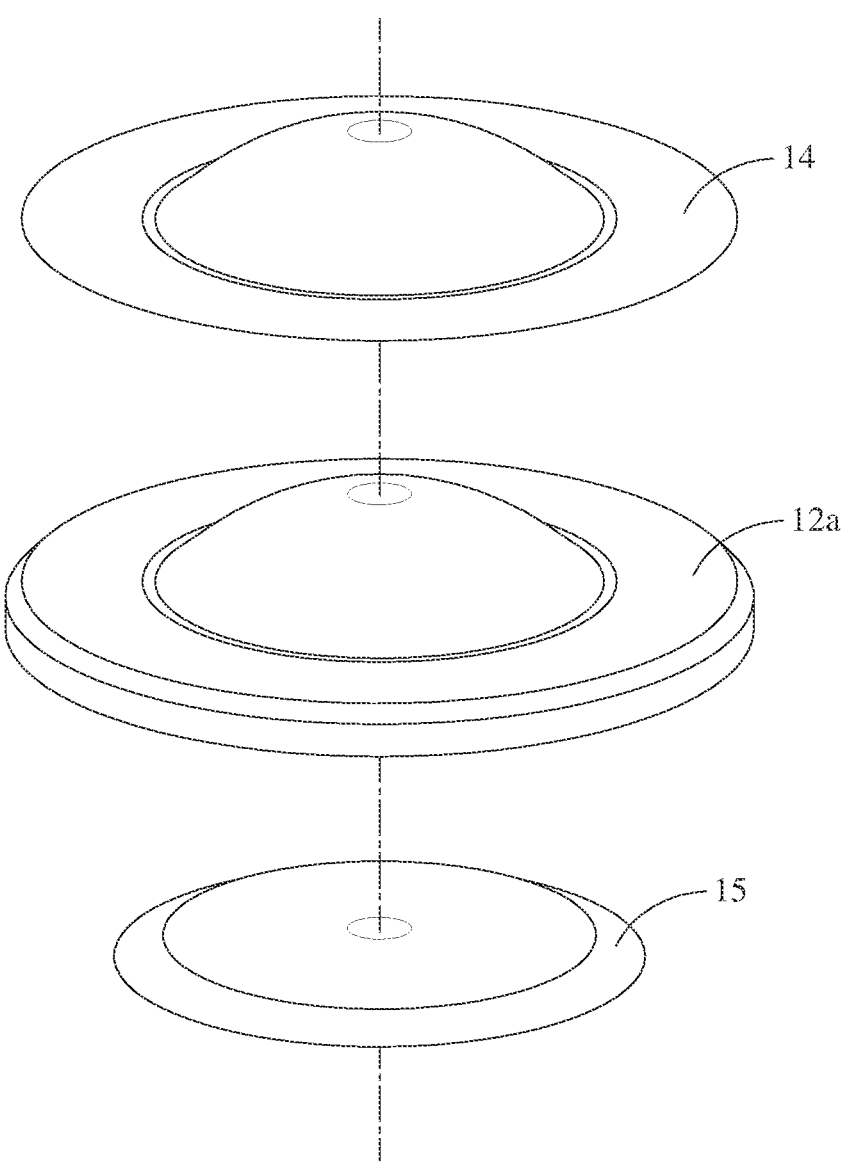
FIG. 6 is a schematic view showing the explosion relationship between a first lens element, a wide-range low reflection layer and an infrared light reduction layer of the imaging lens in FIG. 4.
Figure 7:
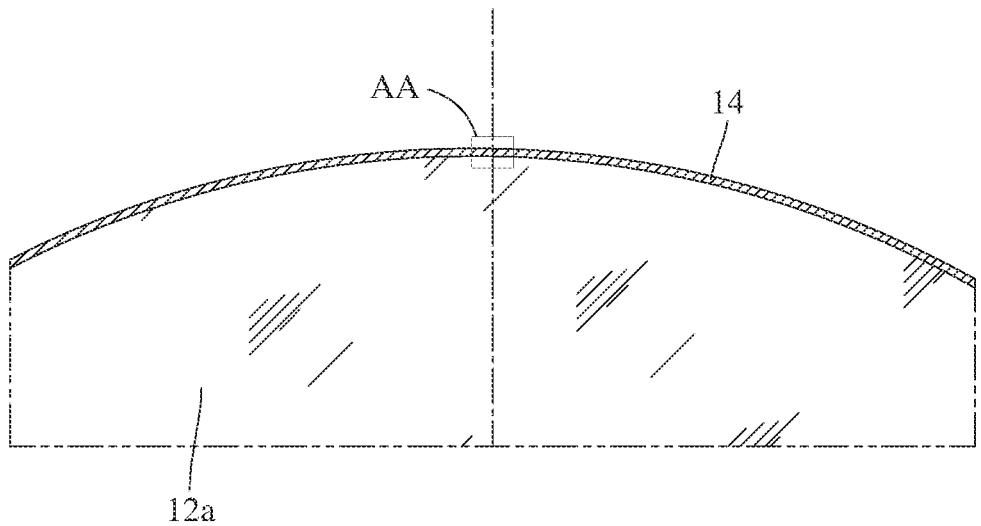
FIG. 7 is a partial and enlarged view of the first lens element and the wide-range low reflection layer of the imaging lens in FIG. 3.
Figure 8:
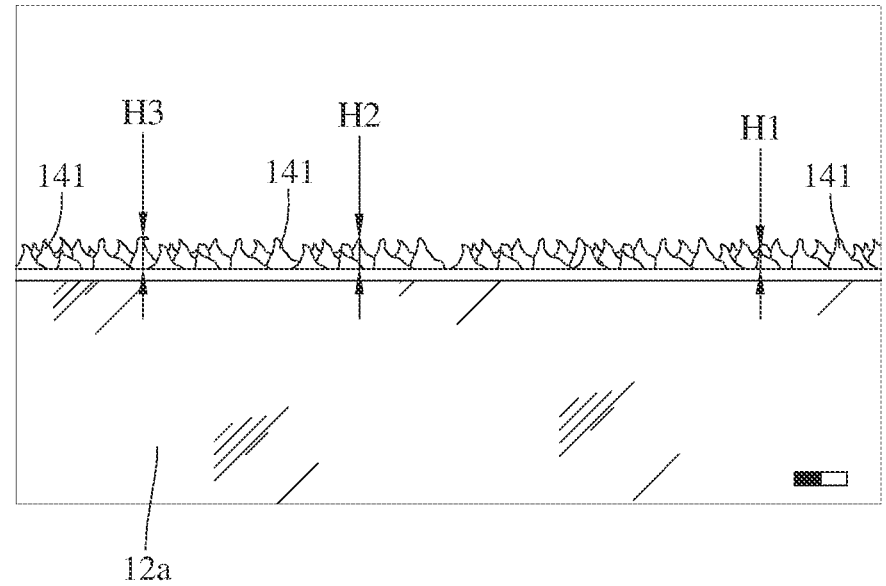
FIG. 8 is an enlarged view of AA region in FIG. 7.
Figure 9:
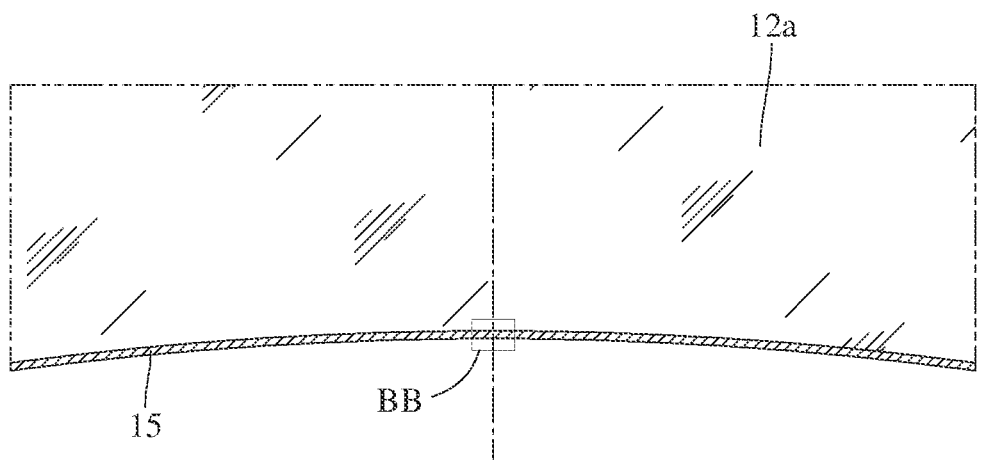
FIG. 9 is a partial and enlarged view of the first lens element and the infrared light reduction layer of the imaging lens in FIG. 3.
Figure 10:
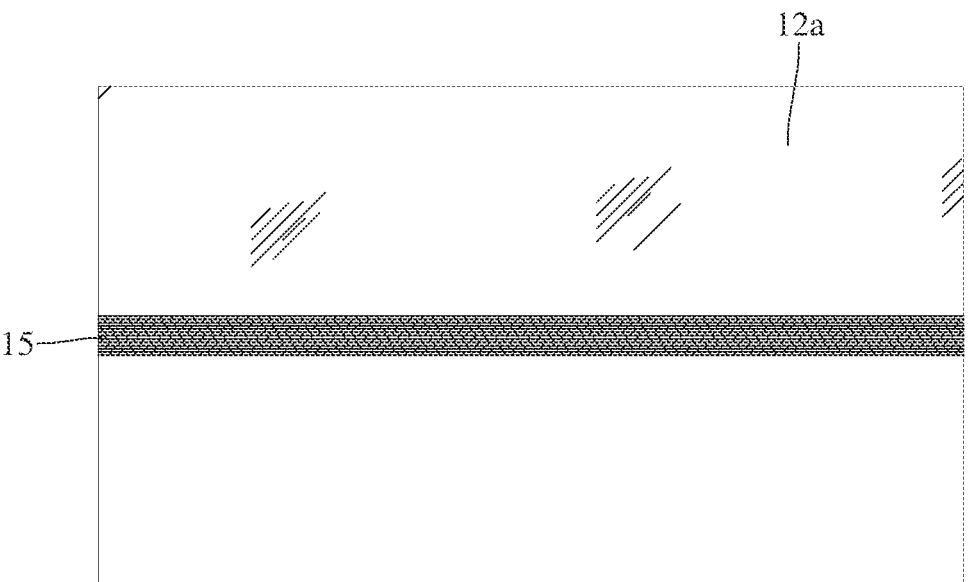
FIG. 10 is an enlarged view of BB region in FIG. 9.

Please refer to FIG. 1 to FIG. 10, where FIG. 1 is a perspective view of an imaging lens according to the 1st embodiment of the present disclosure, FIG. 2 is a perspective view of the imaging lens in FIG. 1 that has been sectioned, FIG. 3 is a cross-sectional view of the imaging lens in FIG. 1, FIG. 4 is an exploded view of the imaging lens in FIG. 3, FIG. 5 is another exploded view of the imaging lens in FIG. 3, FIG. 6 is a schematic view showing the explosion relationship between a first lens element, a wide-range low reflection layer and an infrared light reduction layer of the imaging lens in FIG. 4, FIG. 7 is a partial and enlarged view of the first lens element and the wide-range low reflection layer of the imaging lens in FIG. 3, FIG. 8 is an enlarged view of AA region in FIG. 7, FIG. 9 is a partial and enlarged view of the first lens element and the infrared light reduction layer of the imaging lens in FIG. 3, and FIG. 10 is an enlarged view of BB region in FIG. 9.

In this embodiment, the imaging lens 1 has an average transmittance less than or equal to 10% to light with a wavelength ranging from 750 to 1050 nanometers. The imaging lens 1 includes a central optical path 10, a lens carrier 11, a plurality of lens elements 12, a plurality of optical elements 13, a wide-range low reflection layer 14, an infrared light reduction layer 15, a flat element 16 and an image surface 17, wherein the central optical path 10 passes through the lens carrier 11, the lens elements 12, the optical elements 13, the wide-range low reflection layer 14, the infrared light reduction layer 15 and the flat element 16 and then arrives the image surface 17.

The lens carrier 11 accommodates the lens elements 12 and the optical elements 13. The lens elements 12 are sequentially arranged along the central optical path 10. The lens elements 12 include a first lens element 12a and a plurality of subsequent lens elements, and the first lens element 12a is located closer to an object side than the plurality of subsequent lens elements.

The first lens element 12a has a paraxial region which the central optical path 10 passes through, and the first lens element 12a has positive refractive power. The first lens element 12a is an infrared light absorption lens element configured to absorb infrared light, and the first lens element 12a has an absorption peak value within an infrared band ranging from 600 to 850 nanometers.

The first lens element 12a has an object-side surface where the wide-range low reflection layer 14 is disposed. The wide-range low reflection layer 14 has an average reflectance less than or equal to 0.98% to light with the wavelength ranging from 750 to 1050 nanometers, and has a reflectance difference less than or equal to 2% to light with a wavelength ranging from 550 to 1050 nanometers.

The first lens element 12a has an image-side surface where the infrared light reduction layer 15 is disposed. The infrared light reduction layer 15 has an average reflectance greater than or equal to 50% to light with the wavelength ranging from 750 to 1050 nanometers. As shown in FIG. 9 to FIG. 10, the infrared light reduction layer 15 is a multilayer coating. Please be noted that FIG. 9 and FIG. 10 are not depicted in actual scale for clearly showing the multi-layer coating of the infrared light reduction layer 15.

The subsequent lens elements include a second lens element 12b, a third lens element 12c, a fourth lens element 12d, a fifth lens element 12e and a sixth lens element 12f. The optical elements 13 are arranged along the central optical path 10. The optical elements 13 include a first light-blocking element 131a, a second light-blocking element 131b, a third light-blocking element 131c, a first spacer 132a, a second spacer 132b and a retainer 133.

In the imaging lens 1, in order from the object side to an image side along the central optical path 10, the wide-range low reflection layer 14, the first lens element 12a, the infrared light reduction layer 15, the first light-blocking element 131a, the second lens element 12b, the second light-blocking element 131b, the third lens element 12c, the third light-blocking element 131c, the fourth lens element 12d, the first spacer 132a, the fifth lens element 12e, the second spacer 132b, the sixth lens element 12f, the retainer 133, the flat element 16 and the image surface 17 are sequentially arranged.

Further, the wide-range low reflection layer 14 includes a ridge structure layer 141 thereon. The ridge structure layer 141 tapers off along a direction away from the first lens element 12a, and a height of the ridge structure layer 141 ranges from 120 to 300 nanometers. As shown in FIG. 8, based on the 200 nanometers scale bar in the lower right corner of FIG. 8, heights measured at any three chosen positions of the ridge structure layer 141 are H1=142 [nm]; H2=230 [nm]; and H3=246 [nm]. The average value of H1, H2 and H3 is 206 nanometers. It can be also considered that the average height of the ridge structure layer 141 approximates 200 nanometers. Please be noted that FIG. 7 is not depicted in actual scale for clearly showing the ridge structure layer 141.

When a thickness of the first lens element 12a along the central optical path 10 is T, and a distance along the central optical path 10 between the wide-range low reflection layer 14 and the infrared light reduction layer 15 is D, the following conditions are satisfied: T=0.817 [mm]; D=0.817 [mm]; and T/D=1.

When a curvature radius of the wide-range low reflection layer 14 in a region where the central optical path 10 passes is R1, and a curvature radius of the infrared light reduction layer 15 in a region where the central optical path 10 passes is R2, the following conditions are satisfied: R1=1.96 [mm]; R2=13.14 [mm]; and R1/R2=0.15.

2nd Embodiment

Figure 11:
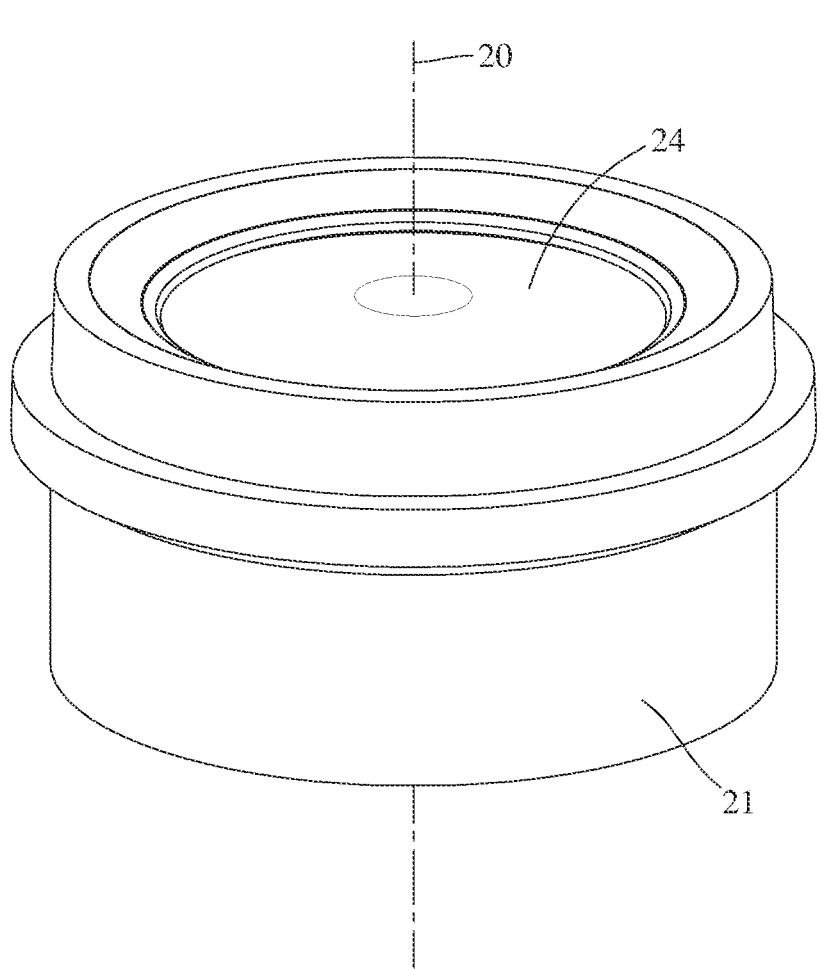
FIG. 11 is a perspective view of an imaging lens according to the 2nd embodiment of the present disclosure.
Figure 12:
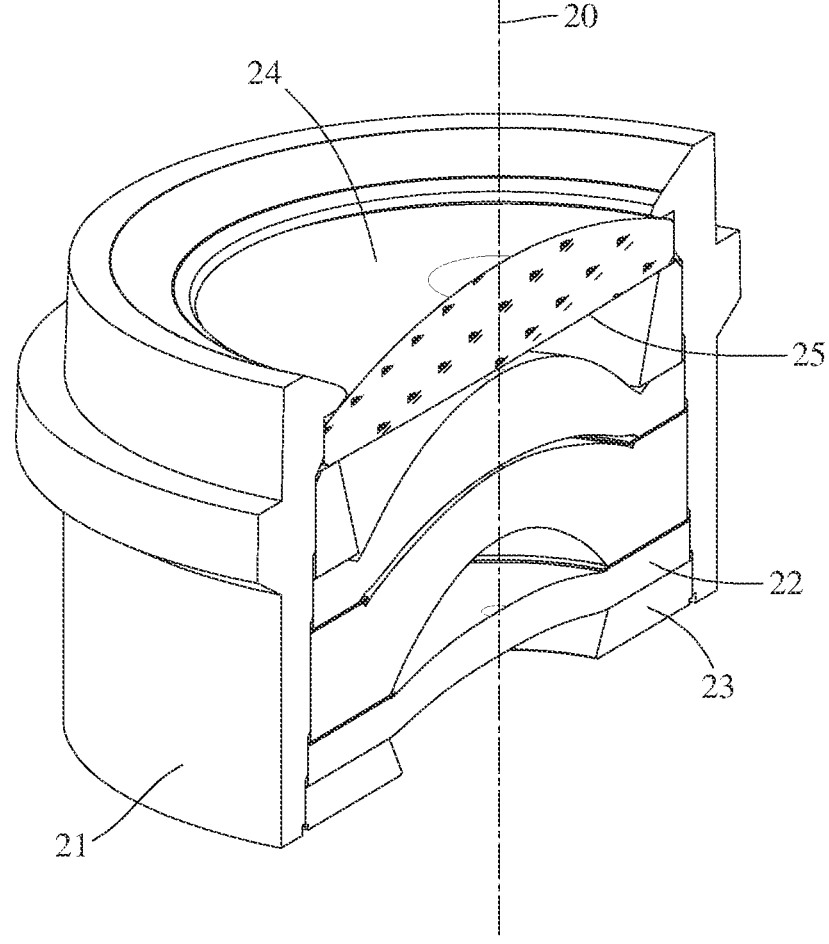
FIG. 12 is a perspective view of the imaging lens in FIG. 11 that has been sectioned.
Figure 13:
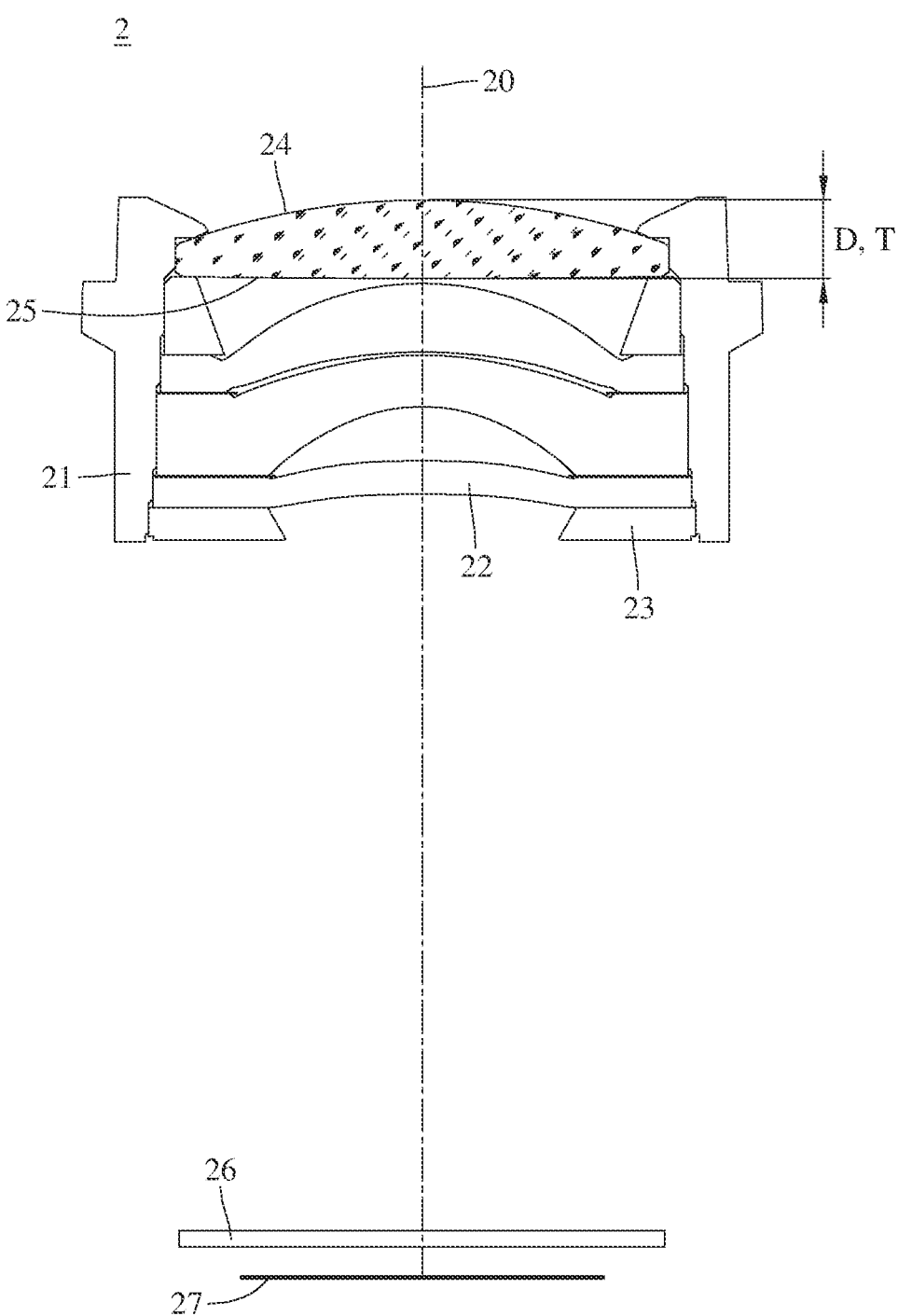
FIG. 13 is a cross-sectional view of the imaging lens in FIG. 11.
Figure 14:
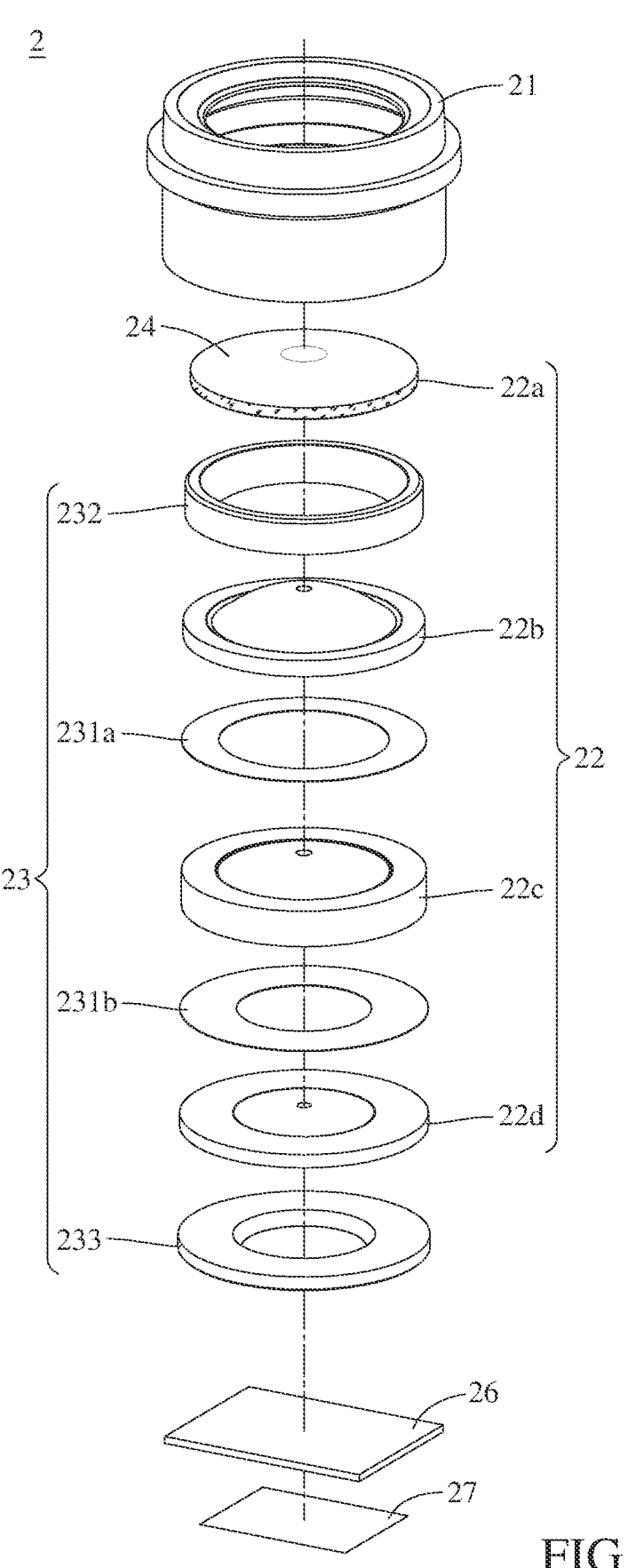
FIG. 14 is an exploded view of the imaging lens in FIG. 13.
Figure 15:
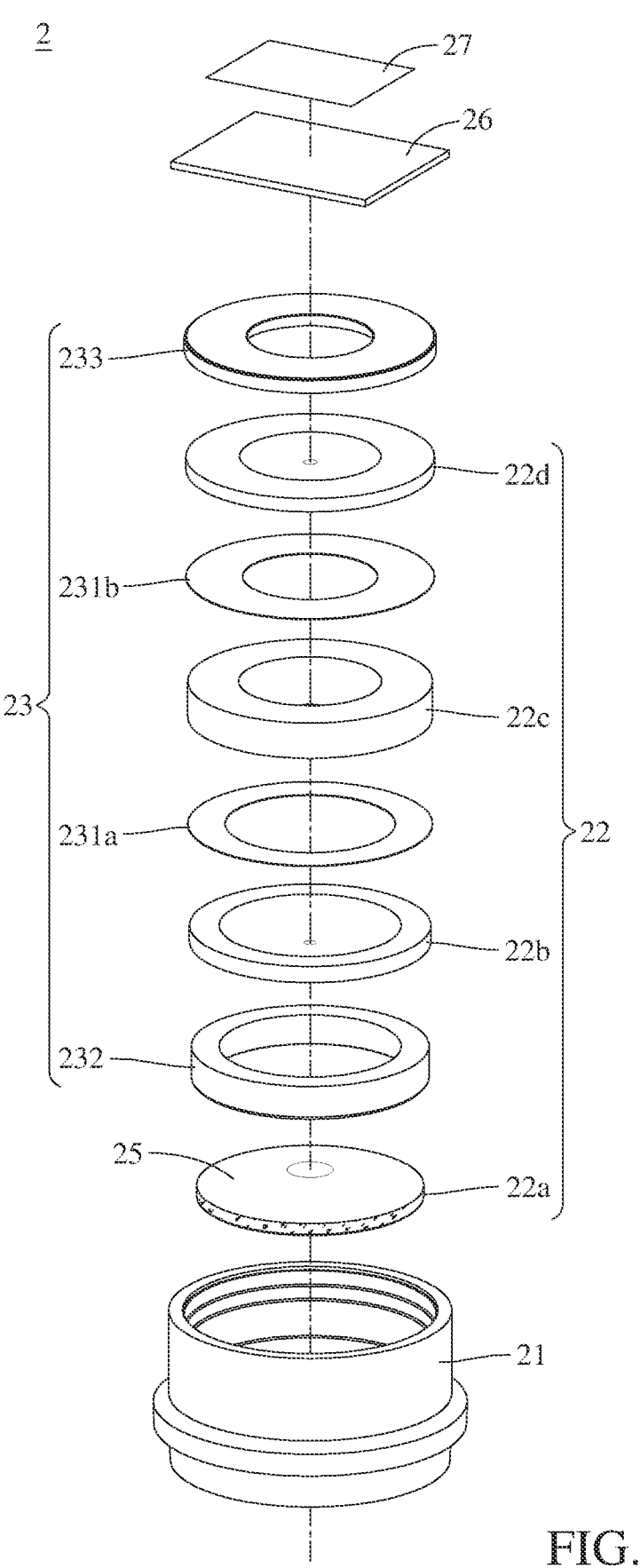
FIG. 15 is another exploded view of the imaging lens in FIG. 13.
Figure 16:
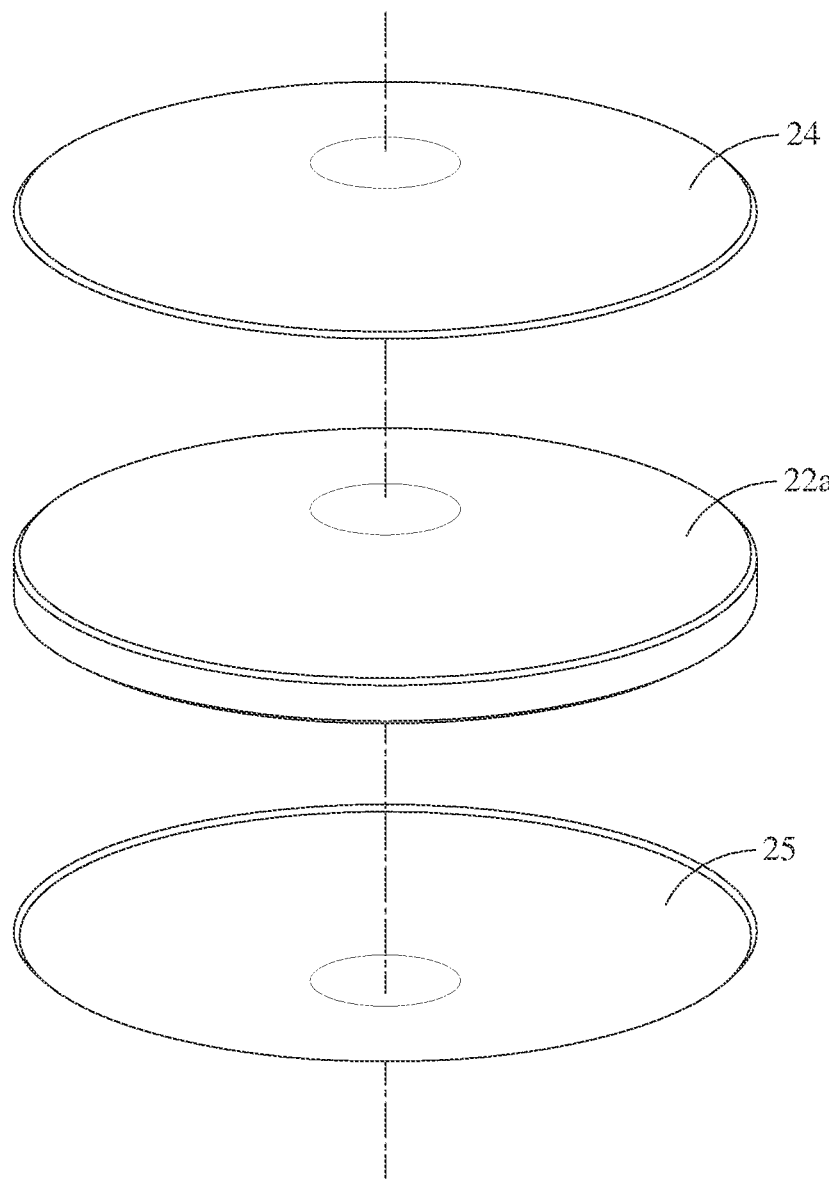
FIG. 16 is a schematic view showing the explosion relationship between a first lens element, a wide-range low reflection layer and an infrared light reduction layer of the imaging lens in FIG. 14.

Please refer to FIG. 11 to FIG. 16, where FIG. 11 is a perspective view of an imaging lens according to the 2nd embodiment of the present disclosure, FIG. 12 is a perspective view of the imaging lens in FIG. 11 that has been sectioned, FIG. 13 is a cross-sectional view of the imaging lens in FIG. 11, FIG. 14 is an exploded view of the imaging lens in FIG. 13, FIG. 15 is another exploded view of the imaging lens in FIG. 13, and FIG. 16 is a schematic view showing the explosion relationship between a first lens element, a wide-range low reflection layer and an infrared light reduction layer of the imaging lens in FIG. 14.

In this embodiment, the imaging lens 2 has an average transmittance less than or equal to 10% to light with a wavelength ranging from 750 to 1050 nanometers. The imaging lens 2 includes a central optical path 20, a lens carrier 21, a plurality of lens elements 22, a plurality of optical elements 23, a wide-range low reflection layer 24, an infrared light reduction layer 25, a flat element 26 and an image surface 27, wherein the central optical path 20 passes through the lens carrier 21, the lens elements 22, the optical elements 23, the wide-range low reflection layer 24, the infrared light reduction layer 25 and the flat element 26 and then arrives the image surface 27.

The lens carrier 21 accommodates the lens elements 22 and the optical elements 23. The lens elements 22 are sequentially arranged along the central optical path 20. The lens elements 22 include a first lens element 22a and a plurality of subsequent lens elements, and the first lens element 22a is located closer to an object side than the plurality of subsequent lens elements.

The first lens element 22a has a paraxial region which the central optical path 20 passes through, and the first lens element 22a has positive refractive power. The first lens element 22a is a glass lens element, and the first lens element 22a can be, for example, a molded glass lens element. The first lens element 22a has a function of absorbing infrared light, and the first lens element 22a has an absorption peak value within an infrared band ranging from 600 to 850 nanometers.

The first lens element 22a has an object-side surface where the wide-range low reflection layer 24 is disposed. The wide-range low reflection layer 24 has an average reflectance less than or equal to 0.98% to light with the wavelength ranging from 750 to 1050 nanometers, and has a reflectance difference less than or equal to 2% to light with a wavelength ranging from 550 to 1050 nanometers.

The first lens element 22a has an image-side surface where the infrared light reduction layer 25 is disposed. The infrared light reduction layer 25 has an average reflectance greater than or equal to 50% to light with the wavelength ranging from 750 to 1050 nanometers.

The subsequent lens elements include a second lens element 22b, a third lens element 22c and a fourth lens element 22d. The optical elements 23 are arranged along the central optical path 20. The optical elements 23 include a first light-blocking element 231a, a second light-blocking element 231b, a spacer 232 and a retainer 233.

In the imaging lens 2, in order from the object side to an image side along the central optical path 20, the wide-range low reflection layer 24, the first lens element 22a, the infrared light reduction layer 25, the spacer 232, the second lens element 22b, the first light-blocking element 231a, the third lens element 22c, the second light-blocking element 231b, the fourth lens element 22d, the retainer 233, the flat element 26 and the image surface 27 are sequentially arranged.

When a thickness of the first lens element 22a along the central optical path 20 is T, and a distance along the central optical path 20 between the wide-range low reflection layer 24 and the infrared light reduction layer 25 is D, the following conditions are satisfied: T=1.036 [mm]; D=1.036 [mm]; and T/D=1.

When a curvature radius of the wide-range low reflection layer 24 in a region where the central optical path 20 passes is R1, and a curvature radius of the infrared light reduction layer 25 in a region where the central optical path 20 passes is R2, the following conditions are satisfied: R1=3.80 [mm]; R2=6.37 [mm]; and R1/R2=0.60.

3rd Embodiment

Figure 17:
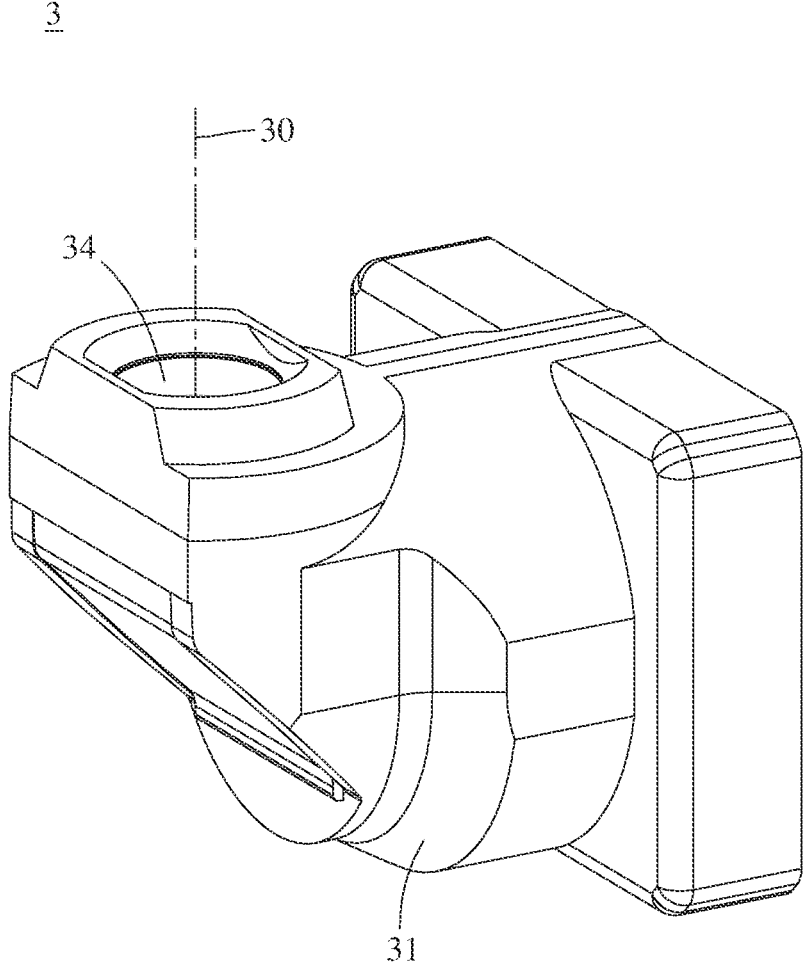
FIG. 17 is a perspective view of an imaging lens according to the 3rd embodiment of the present disclosure.
Figure 18:
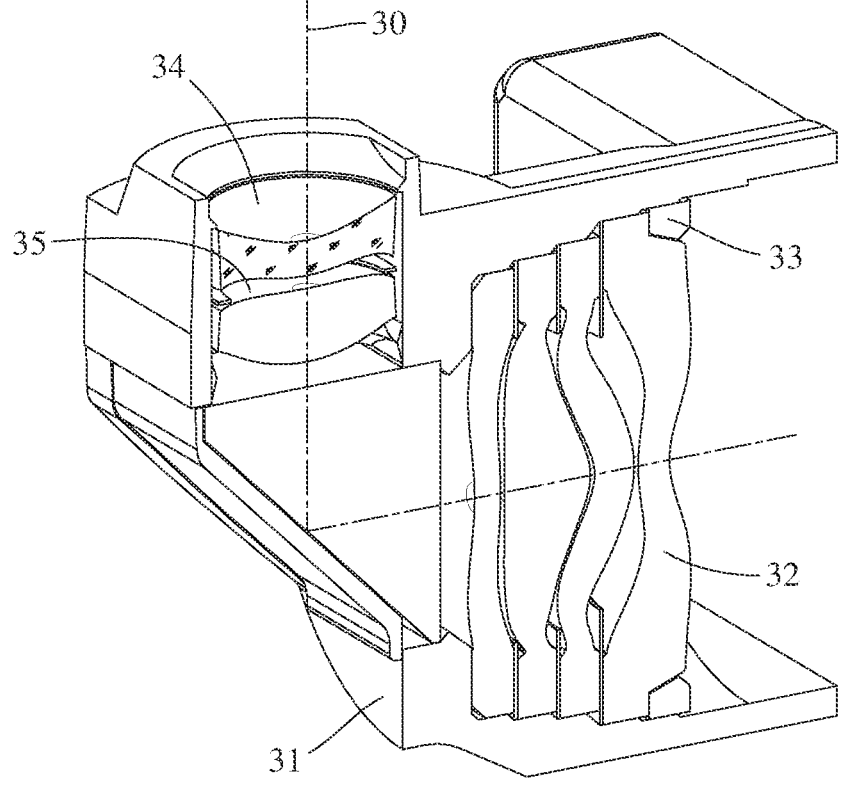
FIG. 18 is a perspective view of the imaging lens in FIG. 17 that has been sectioned.
Figure 19:
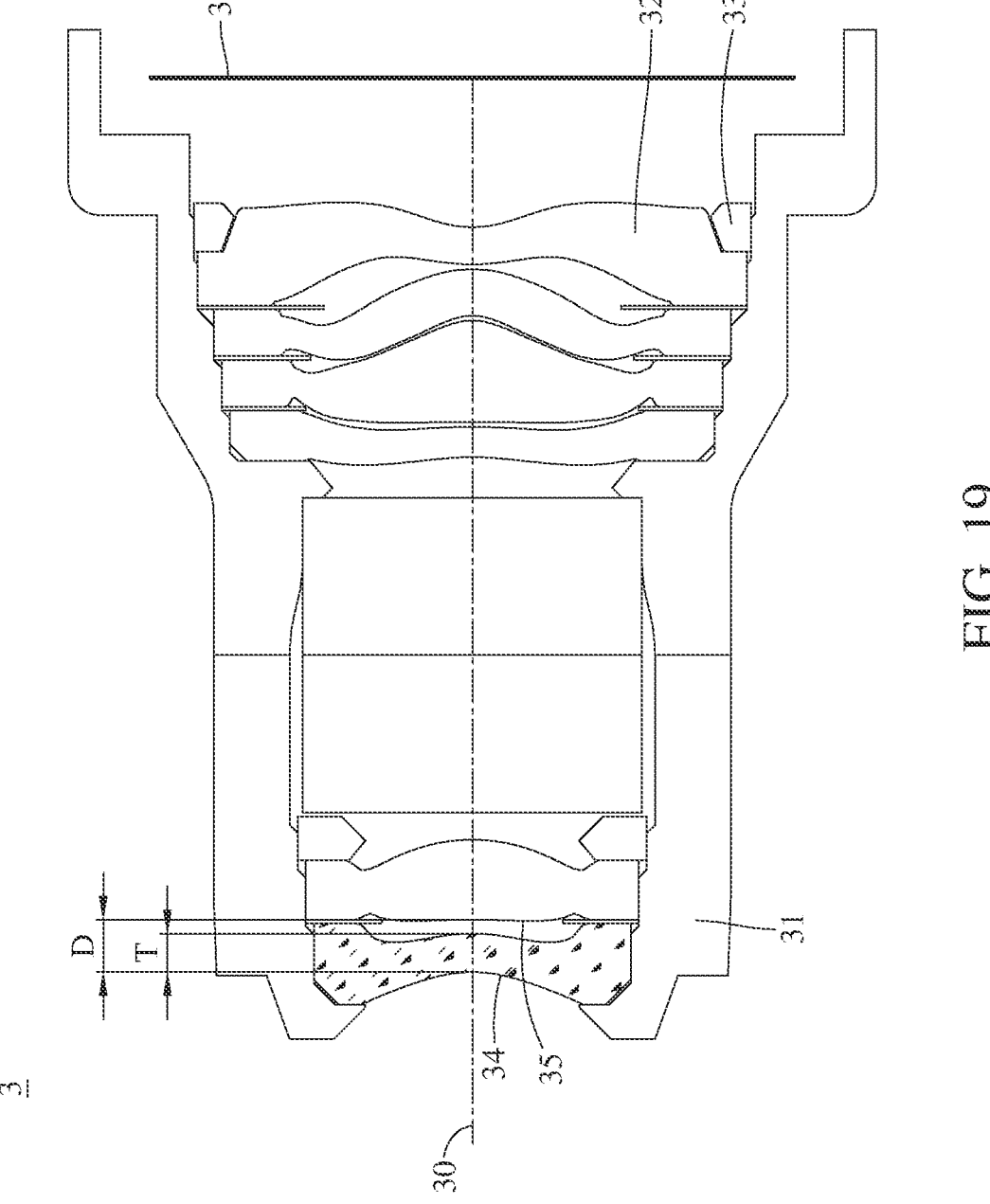
FIG. 19 is a cross-sectional view of the imaging lens in FIG. 17 along a central optical path.
Figure 20:
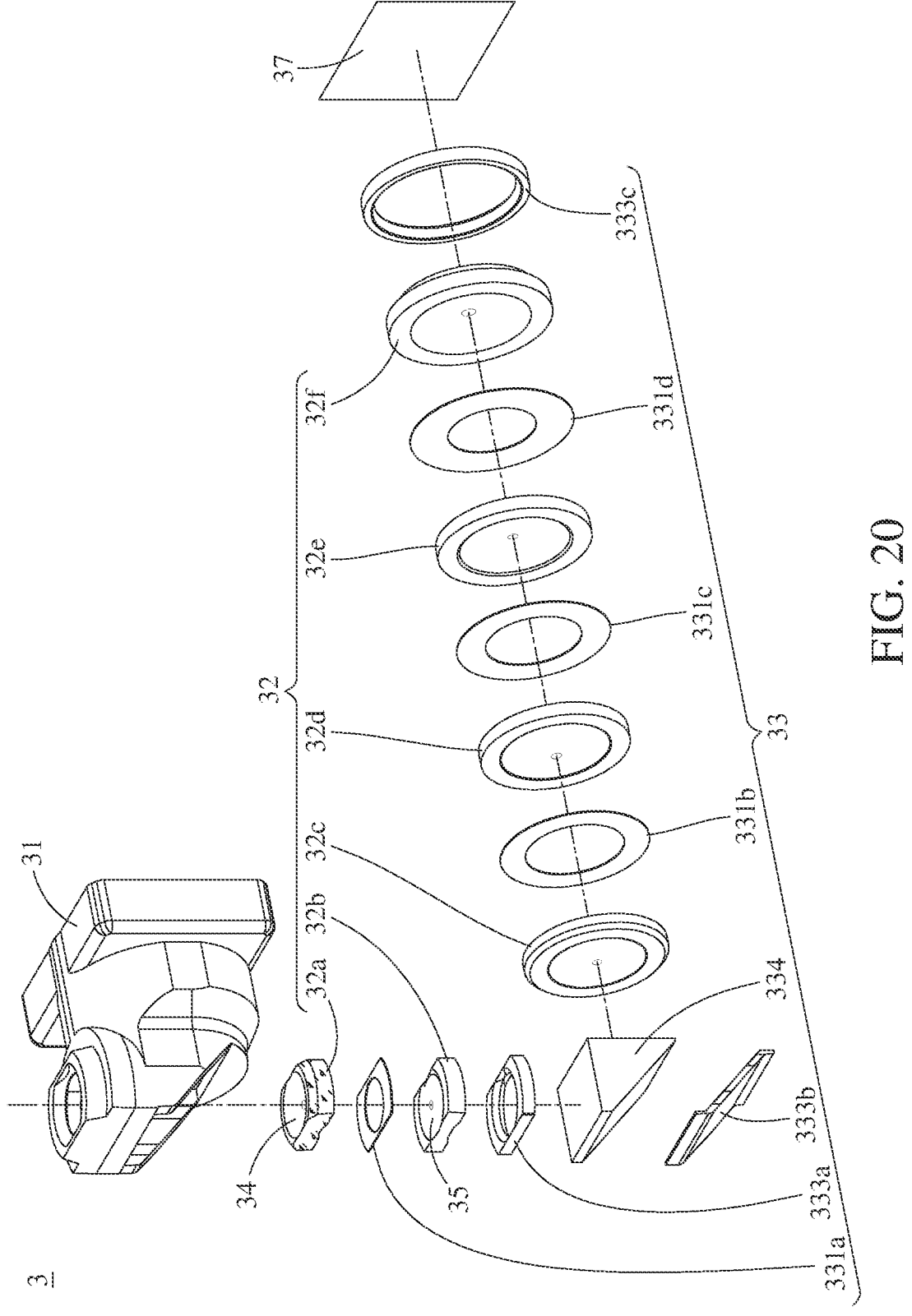
FIG. 20 is an exploded view of the imaging lens in FIG. 19.
Figure 21:
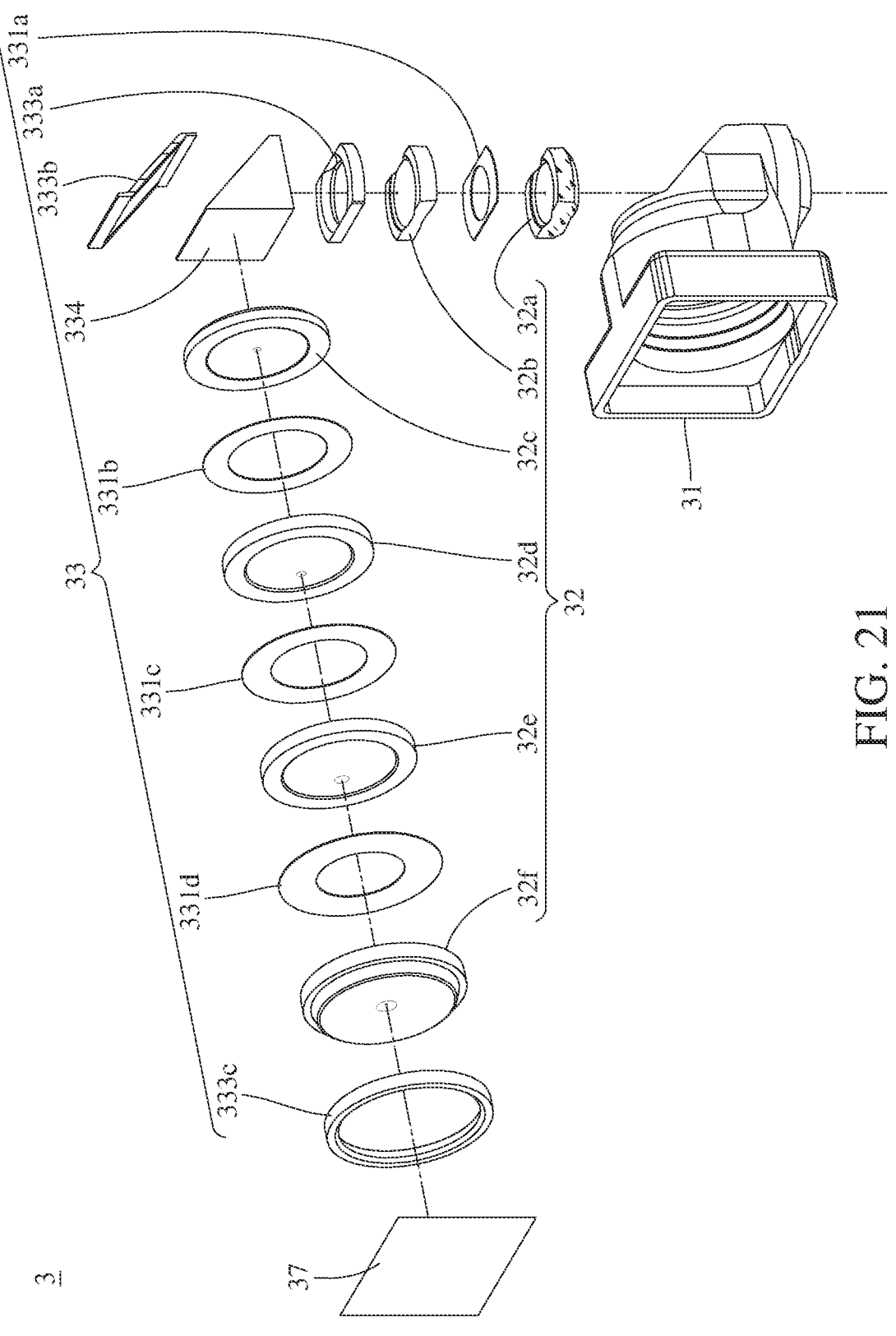
FIG. 21 is another exploded view of the imaging lens in FIG. 19.
Figure 22:
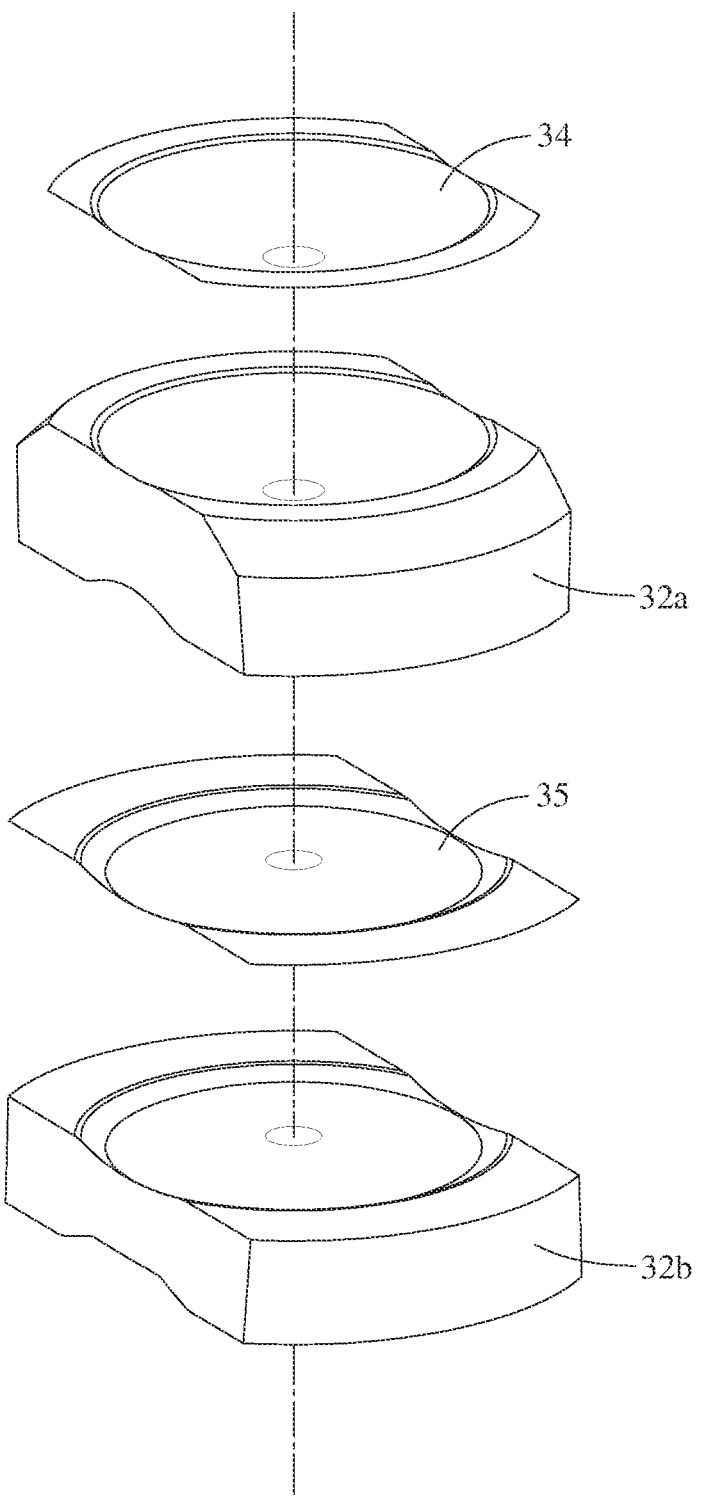
FIG. 22 is a schematic view showing the explosion relationship between a first lens element, a second lens element, a wide-range low reflection layer and an infrared light reduction layer of the imaging lens in FIG. 20.

Please refer to FIG. 17 to FIG. 22, where FIG. 17 is a perspective view of an imaging lens according to the 3rd embodiment of the present disclosure, FIG. 18 is a perspective view of the imaging lens in FIG. 17 that has been sectioned, FIG. 19 is a cross-sectional view of the imaging lens in FIG. 17 along a central optical path, FIG. 20 is an exploded view of the imaging lens in FIG. 19, FIG. 21 is another exploded view of the imaging lens in FIG. 19, and FIG. 22 is a schematic view showing the explosion relationship between a first lens element, a second lens element, a wide-range low reflection layer and an infrared light reduction layer of the imaging lens in FIG. 20.

In this embodiment, the imaging lens 3 has an average transmittance to light with a wavelength ranging from 750 to 1050 nanometers being less than or equal to 10%. The imaging lens 3 includes a central optical path 30, a lens carrier 31, a plurality of lens elements 32, a plurality of optical elements 33, a wide-range low reflection layer 34, an infrared light reduction layer 35 and an image surface 37, wherein the central optical path 30 passes through the lens carrier 31, the lens elements 32, the optical elements 33, the wide-range low reflection layer 34 and the infrared light reduction layer 35 and then arrives the image surface 37.

The lens carrier 31 accommodates the lens elements 32 and the optical elements 33. The lens elements 32 are sequentially arranged along the central optical path 30. The lens elements 32 include a first lens element 32a and a plurality of subsequent lens elements, and the first lens element 32a is located closer to an object side than the plurality of subsequent lens elements.

The first lens element 32a has a paraxial region which the central optical path 30 passes through, and the first lens element 32a has negative refractive power. The first lens element 32a is an infrared light absorption lens element configured to absorb infrared light, and the first lens element 32a has an absorption peak value within an infrared band ranging from 600 to 850 nanometers.

The first lens element 32a has an object-side surface where the wide-range low reflection layer 34 is disposed. The wide-range low reflection layer 34 has an average reflectance less than or equal to 0.98% to light with the wavelength ranging from 750 to 1050 nanometers, and has a reflectance difference less than or equal to 2% to light with a wavelength ranging from 550 to 1050 nanometers.

The subsequent lens elements include a second lens element 32b, a third lens element 32c, a fourth lens element 32d, a fifth lens element 32e and a sixth lens element 32f.

The second lens element 32b has an object-side surface where the infrared light reduction layer 35 is disposed. The infrared light reduction layer 35 has an average reflectance greater than or equal to 50% to light with the wavelength ranging from 750 to 1050 nanometers.

The optical elements 33 are arranged along the central optical path 30. The optical elements 33 include a first light-blocking element 331a, a second light-blocking element 331b, a third light-blocking element 331c, a fourth light-blocking element 331d, a first retainer 333a, a second retainer 333b, a third retainer 333c and an optical folding element 334.

In the imaging lens 3, in order from the object side to an image side along the central optical path 30, the wide-range low reflection layer 34, the first lens element 32a, the first light-blocking element 331a, the infrared light reduction layer 35, the second lens element 32b, the first retainer 333a, the optical folding element 334, the third lens element 32c, the second light-blocking element 331b, the fourth lens element 32d, the third light-blocking element 331c, the fifth lens element 32e, the fourth light-blocking element 331d, the sixth lens element 32f, the third retainer 333c and the image surface 37 are sequentially arranged. The optical folding element 334 is supported by the second retainer 333b, and the central optical path 30 is refracted by the optical folding element 334 when travelling through the optical folding element 334, as shown in FIG. 18. Please be noted that the first lens element 32a and the infrared light reduction layer 35 in this embodiment are used to performing partial function of the flat element, so that the flat element can be omitted in process, thereby reducing cost and preventing ghost image generated at the flat element. Moreover, please be noted that FIG. 19 is depicted in a form that the central optical path 30 is not refracted by the optical folding element 334.

When a thickness of the first lens element 32a along the central optical path 30 is T, and a distance along the central optical path 30 between the wide-range low reflection layer 34 and the infrared light reduction layer 35 is D, the following conditions are satisfied: T=0.240 [mm]; D=0.325 [mm]; and T/D=0.74.

When a curvature radius of the wide-range low reflection layer 34 in a region where the central optical path 30 passes is R1, and a curvature radius of the infrared light reduction layer 35 in a region where the central optical path 30 passes is R2, the following conditions are satisfied: R1=0.81 [mm]; R2=3.30 [mm]; and R1/R2=0.25.

4th Embodiment

Figure 23:
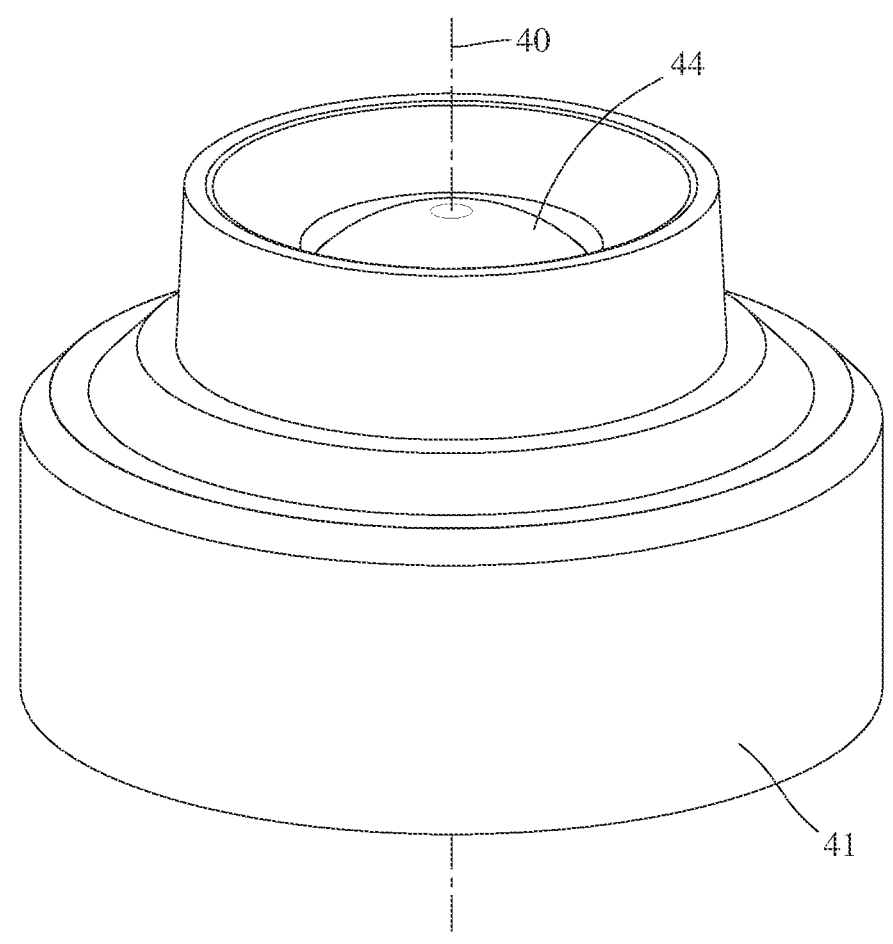
FIG. 23 is a perspective view of an imaging lens according to the 4th embodiment of the present disclosure.
Figure 24:
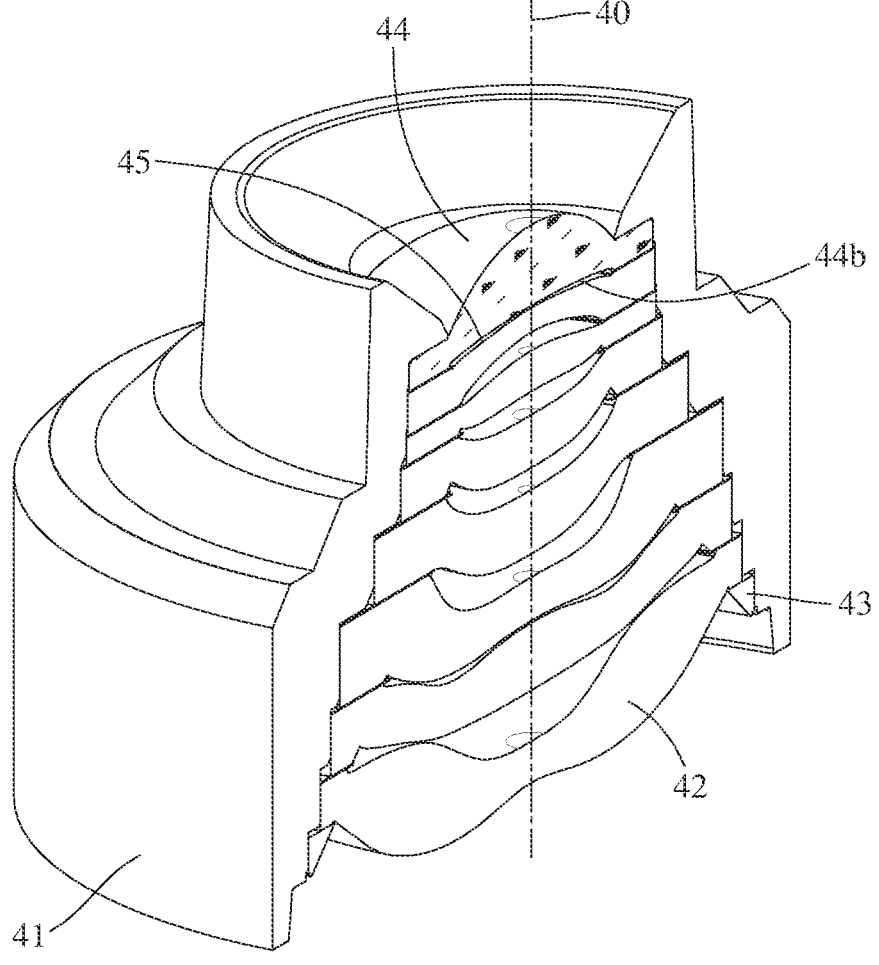
FIG. 24 is a perspective view of the imaging lens in FIG. 23 that has been sectioned.
Figure 25:
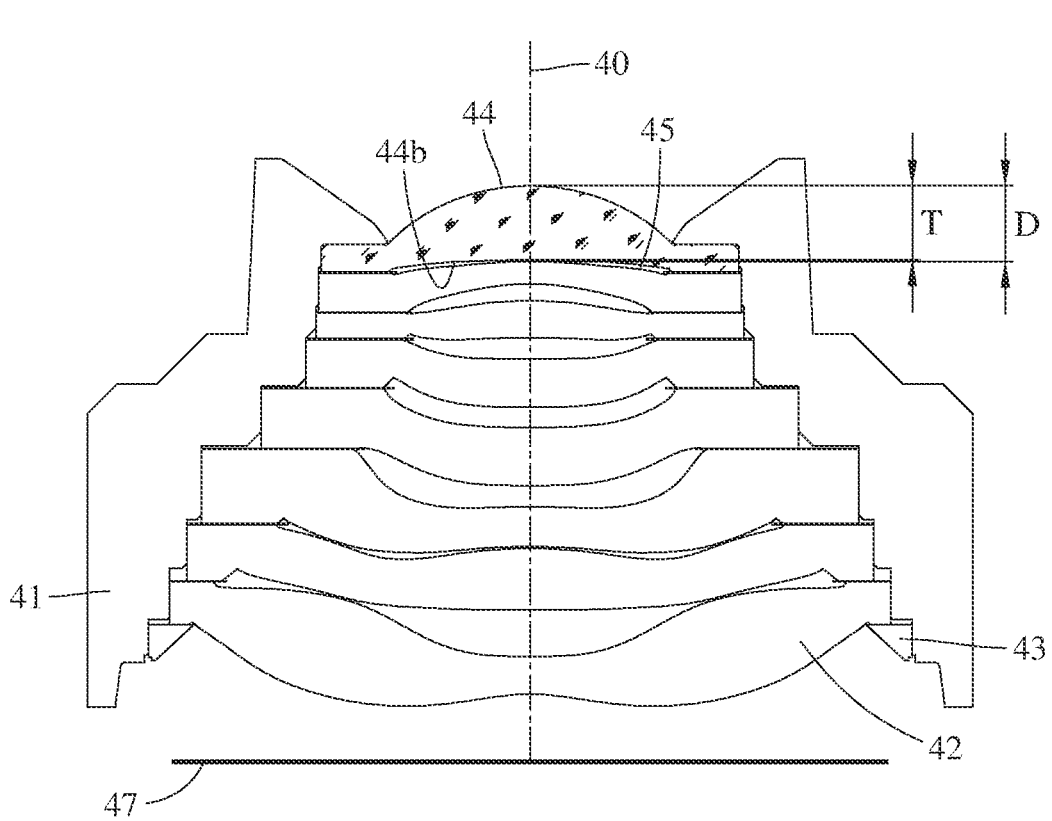
FIG. 25 is a cross-sectional view of the imaging lens in FIG. 23.
Figure 26:
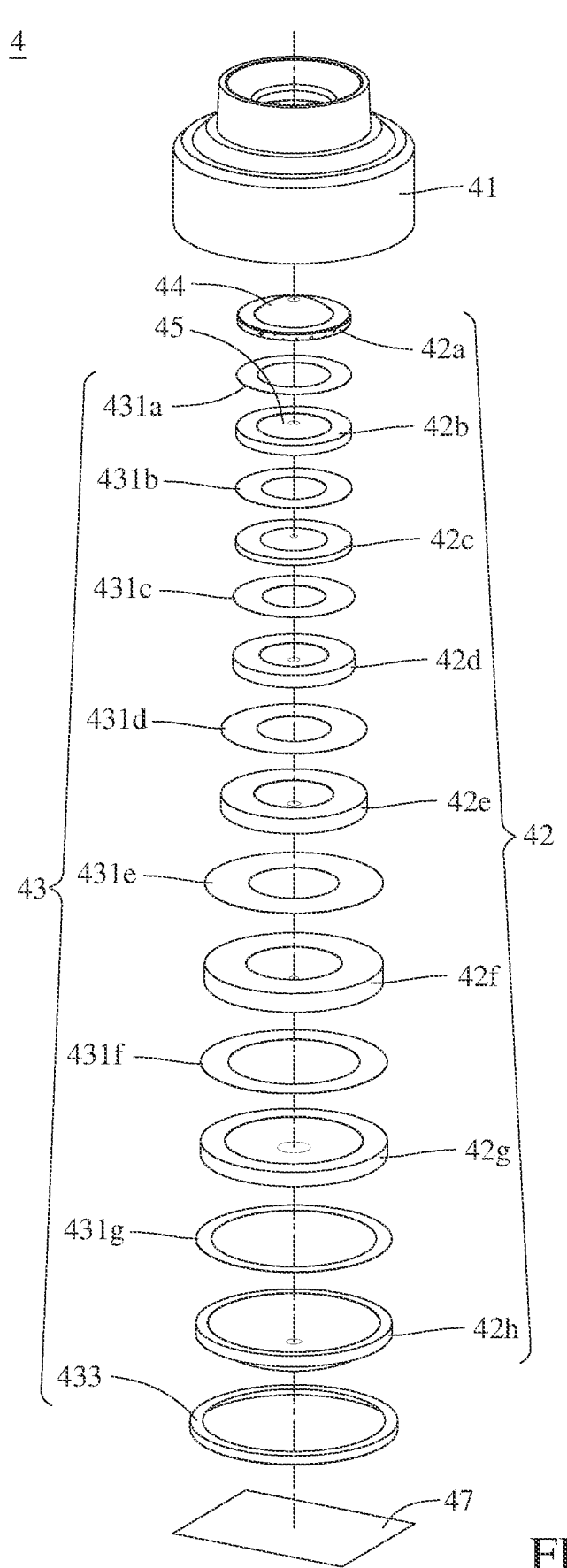
FIG. 26 is an exploded view of the imaging lens in FIG. 25.
Figure 27:
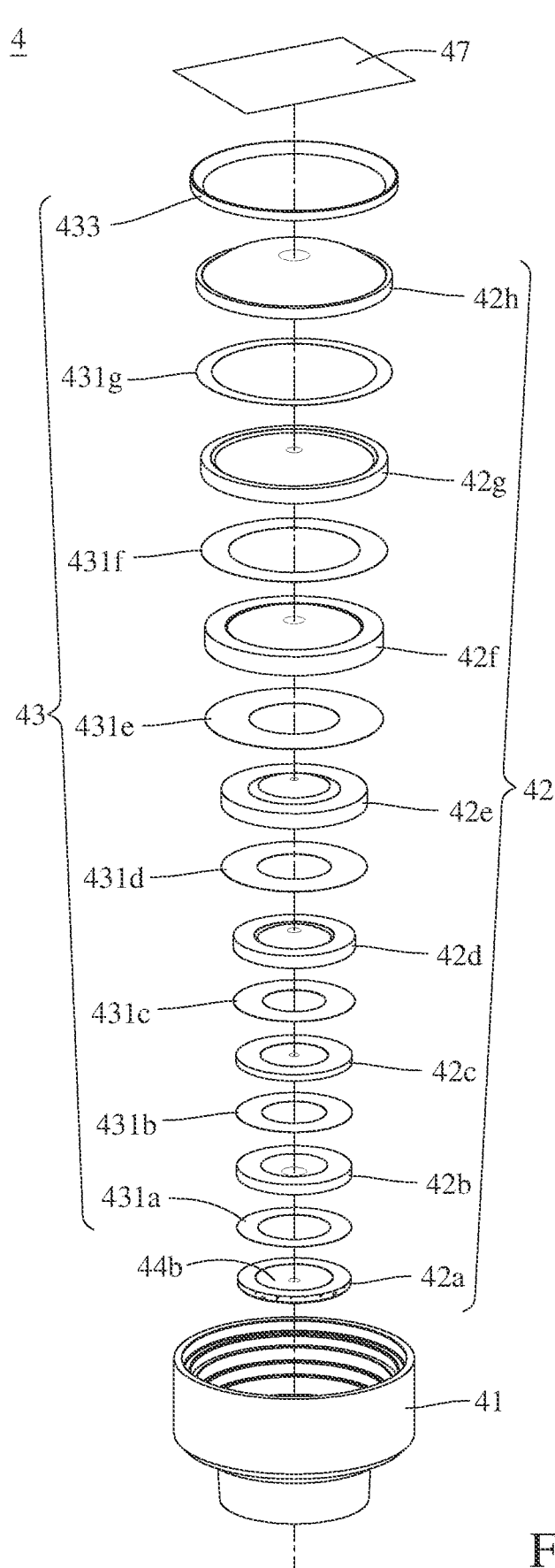
FIG. 27 is another exploded view of the imaging lens in FIG. 25.
Figure 28:
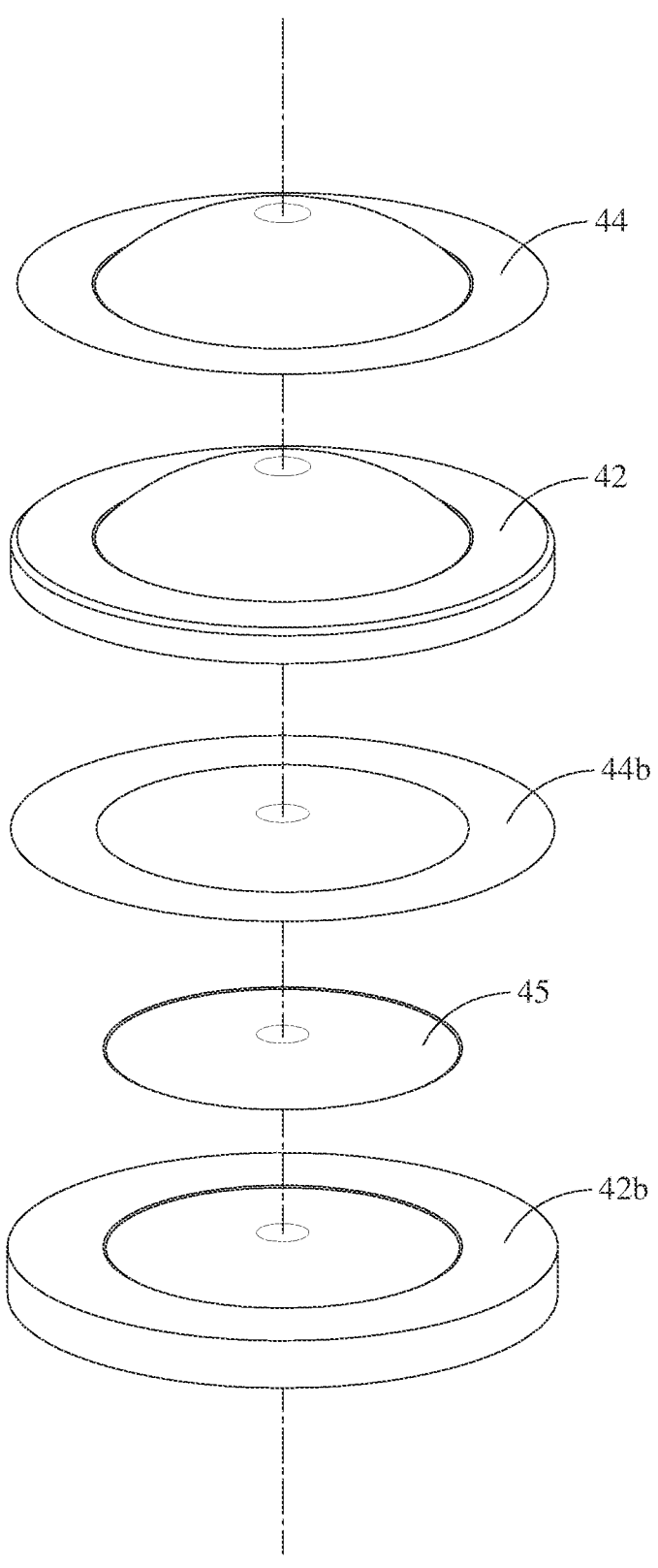
FIG. 28 is a schematic view showing the explosion relationship between a first lens element, a second lens element, a wide-range low reflection layer, a second wide-range low reflection layer and an infrared light reduction layer of the imaging lens in FIG. 26.

Please refer to FIG. 23 to FIG. 28, where FIG. 23 is a perspective view of an imaging lens according to the 4th embodiment of the present disclosure, FIG. 24 is a perspective view of the imaging lens in FIG. 23 that has been sectioned, FIG. 25 is a cross-sectional view of the imaging lens in FIG. 23, FIG. 26 is an exploded view of the imaging lens in FIG. 25, FIG. 27 is another exploded view of the imaging lens in FIG. 25, and FIG. 28 is a schematic view showing the explosion relationship between a first lens element, a second lens element, a wide-range low reflection layer, a second wide-range low reflection layer and an infrared light reduction layer of the imaging lens in FIG. 26.

In this embodiment, the imaging lens 4 has an average transmittance less than or equal to 10% to light with a wavelength ranging from 750 to 1050 nanometers. The imaging lens 4 includes a central optical path 40, a lens carrier 41, a plurality of lens elements 42, a plurality of optical elements 43, a wide-range low reflection layer 44, a second wide-range low reflection layer 44b, an infrared light reduction layer 45 and an image surface 47, wherein the central optical path 40 passes through the lens carrier 41, the lens elements 42, the optical elements 43, the wide-range low reflection layer 44, the second wide-range low reflection layer 44b and the infrared light reduction layer 45 and then arrives the image surface 47.

The lens carrier 41 accommodates the lens elements 42 and the optical elements 43. The lens elements 42 are sequentially arranged along the central optical path 40. The lens elements 42 include a first lens element 42a and a plurality of subsequent lens elements, and the first lens element 42a is located closer to an object side than the plurality of subsequent lens elements.

The first lens element 42a has a paraxial region which the central optical path 40 passes through, and the first lens element 42a has positive refractive power. The first lens element 42a is an infrared light absorption lens element configured to absorb infrared light, and the first lens element 42a has an absorption peak value within an infrared band ranging from 600 to 850 nanometers.

The first lens element 42a has an object-side surface where the wide-range low reflection layer 44 is disposed. The wide-range low reflection layer 44 has an average reflectance less than or equal to 0.98% to light with the wavelength ranging from 750 to 1050 nanometers, and has a reflectance difference less than or equal to 2% to light with a wavelength ranging from 550 to 1050 nanometers.

The first lens element 42a has an image-side surface where the second wide-range low reflection layer 44b is disposed. The second wide-range low reflection layer 44b has an average reflectance less than or equal to 0.98% to light with the wavelength ranging from 750 to 1050 nanometers, and has a reflectance difference less than or equal to 2% to light with the wavelength ranging from 550 to 1050 nanometers.

The subsequent lens elements include a second lens element 42b, a third lens element 42c, a fourth lens element 42d, a fifth lens element 42e, a sixth lens element 42f, a seventh lens element 42g and an eighth lens element 42h.

The second lens element 42b has an object-side surface where the infrared light reduction layer 45 is disposed. The infrared light reduction layer 45 has an average reflectance greater than or equal to 50%. to light with the wavelength ranging from 750 to 1050 nanometers.

The optical elements 43 are arranged along the central optical path 40. The optical elements 43 include a first light-blocking element 431a, a second light-blocking element 431b, a third light-blocking element 431c, a fourth light-blocking element 431d, a fifth light-blocking element 431e, a sixth light-blocking element 431f, a seventh light-blocking element 431g and a retainer 433.

In the imaging lens 4, in order from the object side to an image side along the central optical path 40, the wide-range low reflection layer 44, the first lens element 42a, the second wide-range low reflection layer 44b, the first light-blocking element 431a, the infrared light reduction layer 45, the second lens element 42b, the second light-blocking element 431b, the third lens element 42c, the third light-blocking element 431c, the fourth lens element 42d, the fourth light-blocking element 431d, the fifth lens element 42e, the fifth light-blocking element 431e, the sixth lens element 42f, the sixth light-blocking element 431f, the seventh lens element 42g, the seventh light-blocking element 431g, the eighth lens element 42h, the retainer 433 and the image surface 47 are sequentially arranged. Please be noted that the first lens element 42a and the infrared light reduction layer 45 in this embodiment are used to performing partial function of the flat element, so that the flat element can be omitted in process, thereby reducing cost and preventing ghost image generated at the flat element.

When a thickness of the first lens element 42a along the central optical path 40 is T, and a distance along the central optical path 40 between the wide-range low reflection layer 44 and the infrared light reduction layer 45 is D, the following conditions are satisfied: T=1.488 [mm]; D=1.523 [mm]; and T/D=0.98.

When a curvature radius of the wide-range low reflection layer 44 in a region where the central optical path 40 passes is R1, and a curvature radius of the infrared light reduction layer 45 in a region where the central optical path 40 passes is R2, the following conditions are satisfied: R1=4.24 [mm]; R2=9.51 [mm]; and R1/R2=0.45.

5th Embodiment

Figure 29:
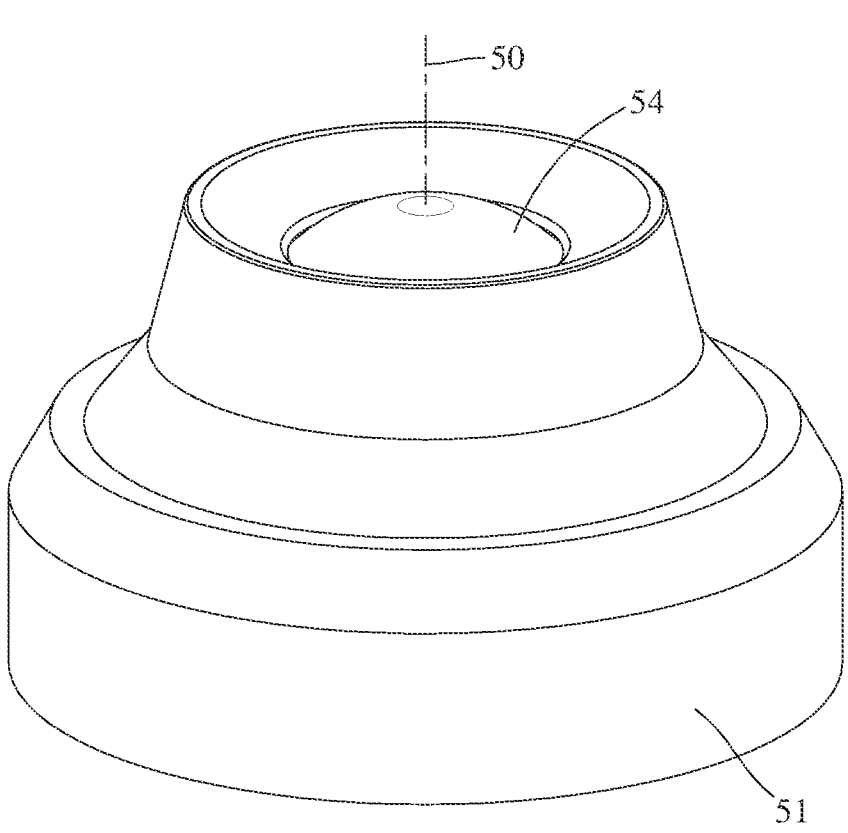
FIG. 29 is a perspective view of an imaging lens according to the 5th embodiment of the present disclosure.
Figure 30:
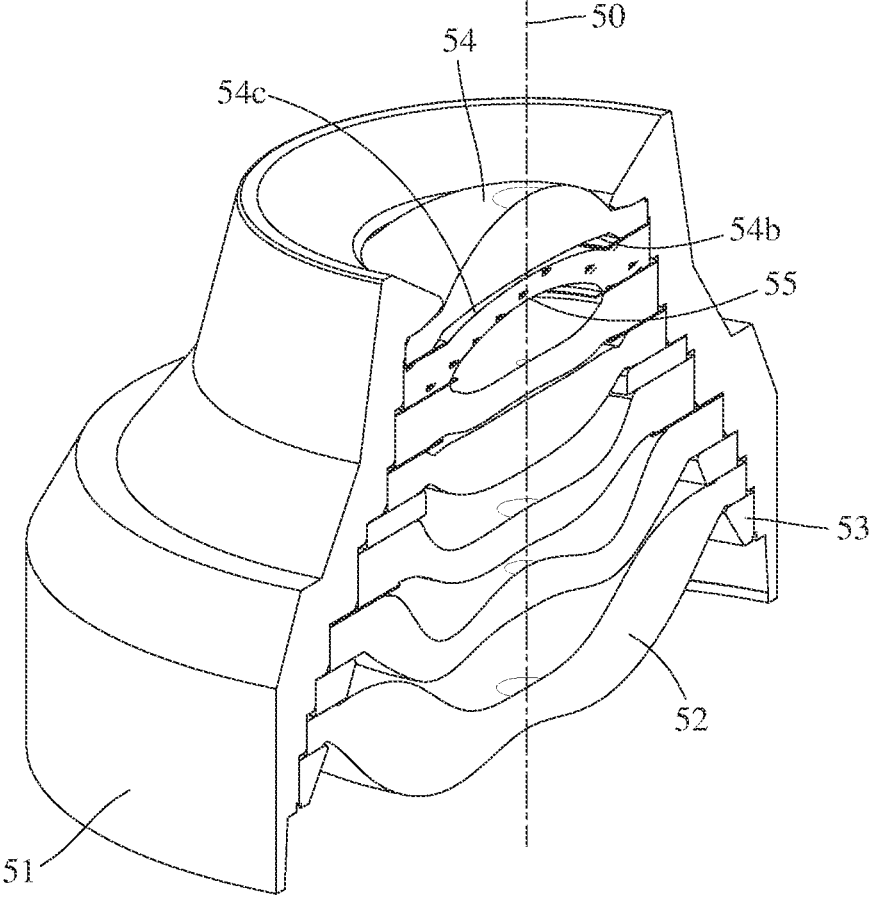
FIG. 30 is a perspective view of the imaging lens in FIG. 29 that has been sectioned.
Figure 31:
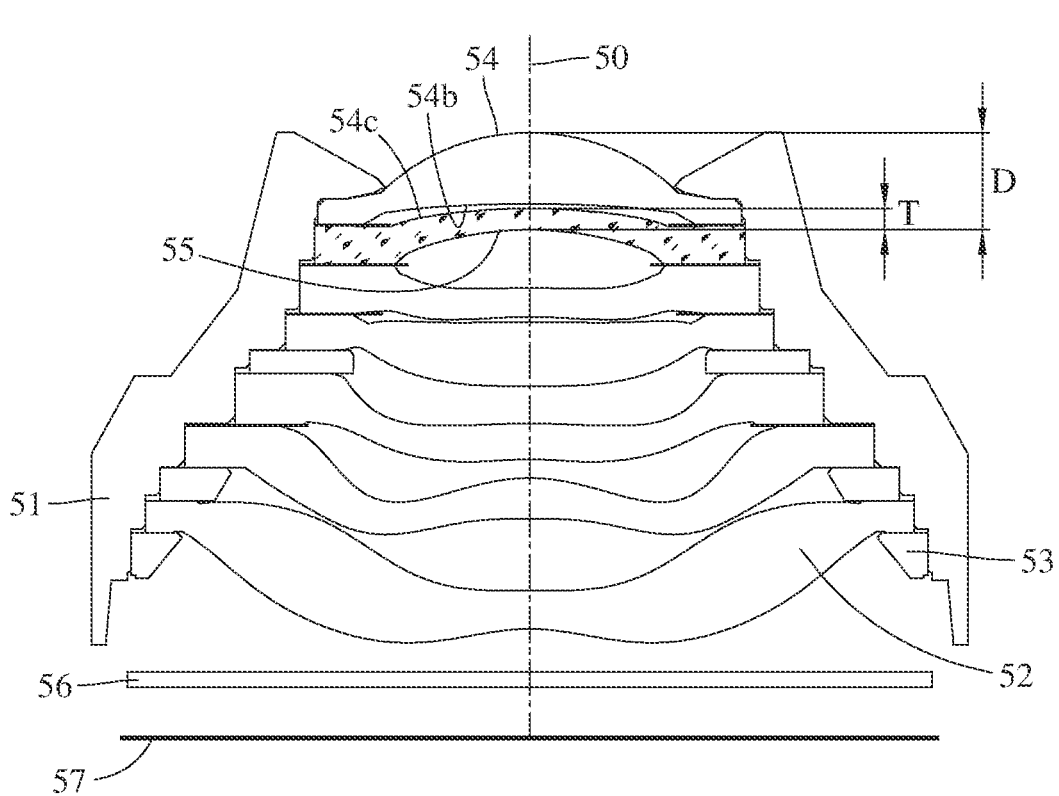
FIG. 31 is a cross-sectional view of the imaging lens in FIG. 29.
Figure 32:
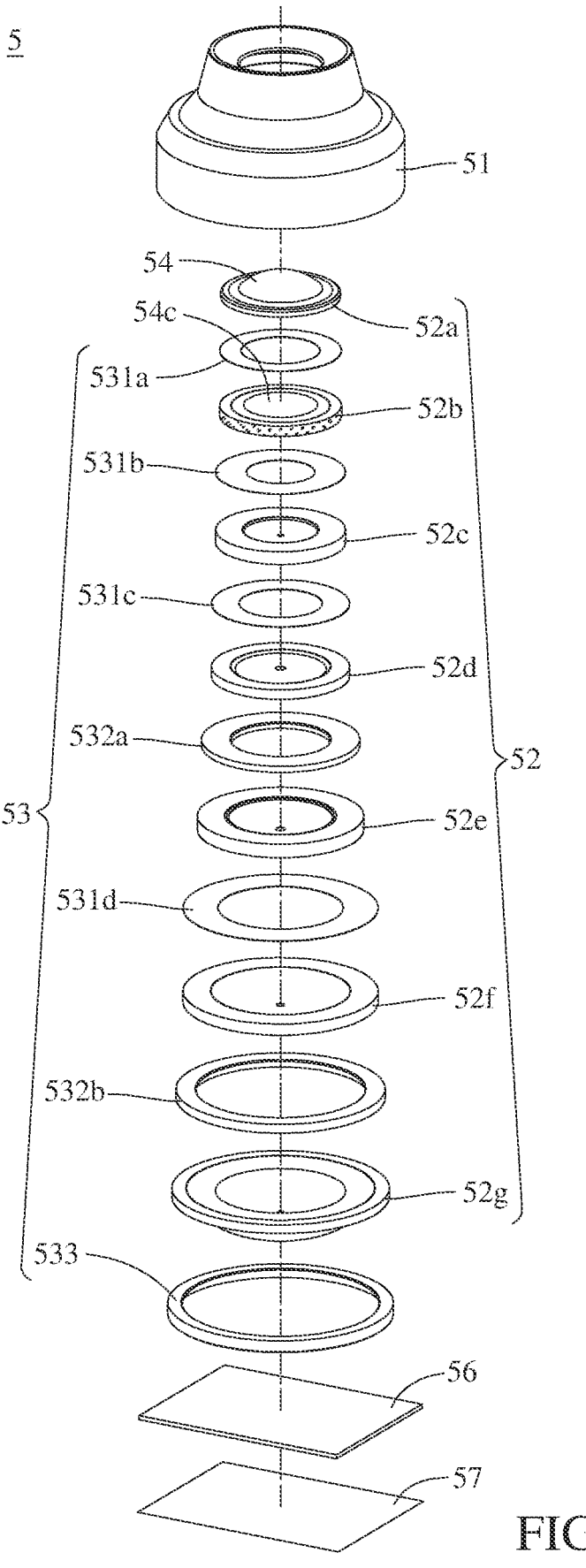
FIG. 32 is an exploded view of the imaging lens in FIG. 31.
Figure 33:
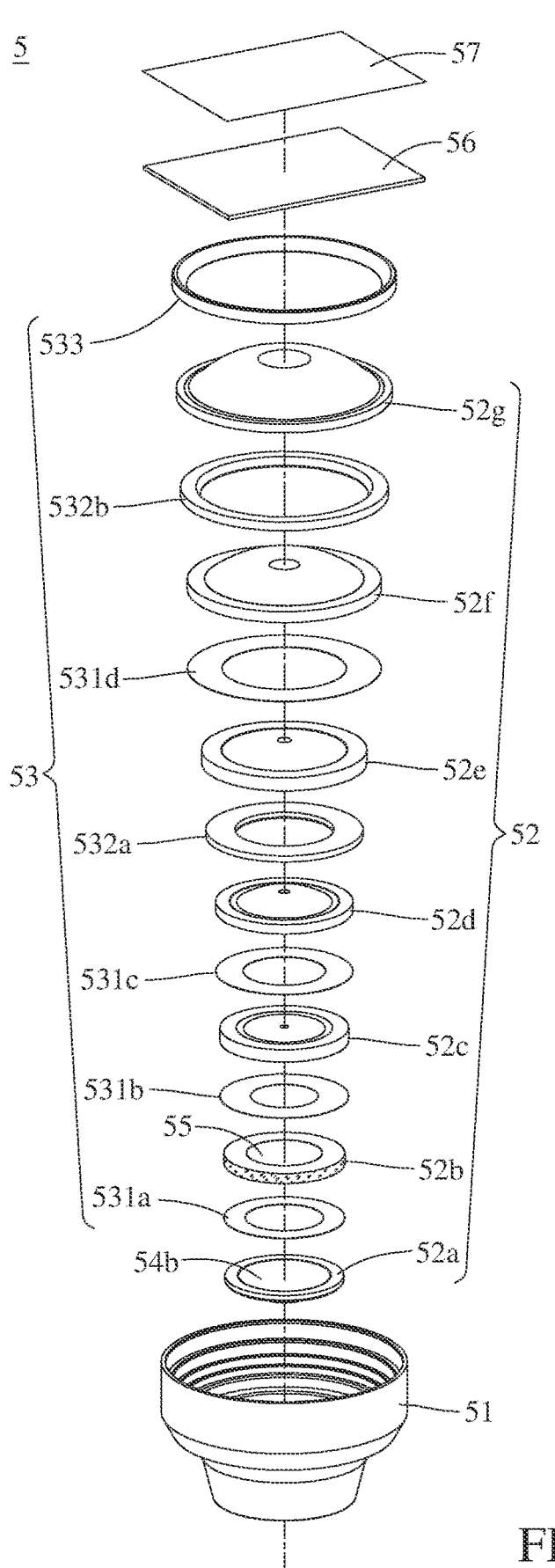
FIG. 33 is another exploded view of the imaging lens in FIG. 31.
Figure 34:
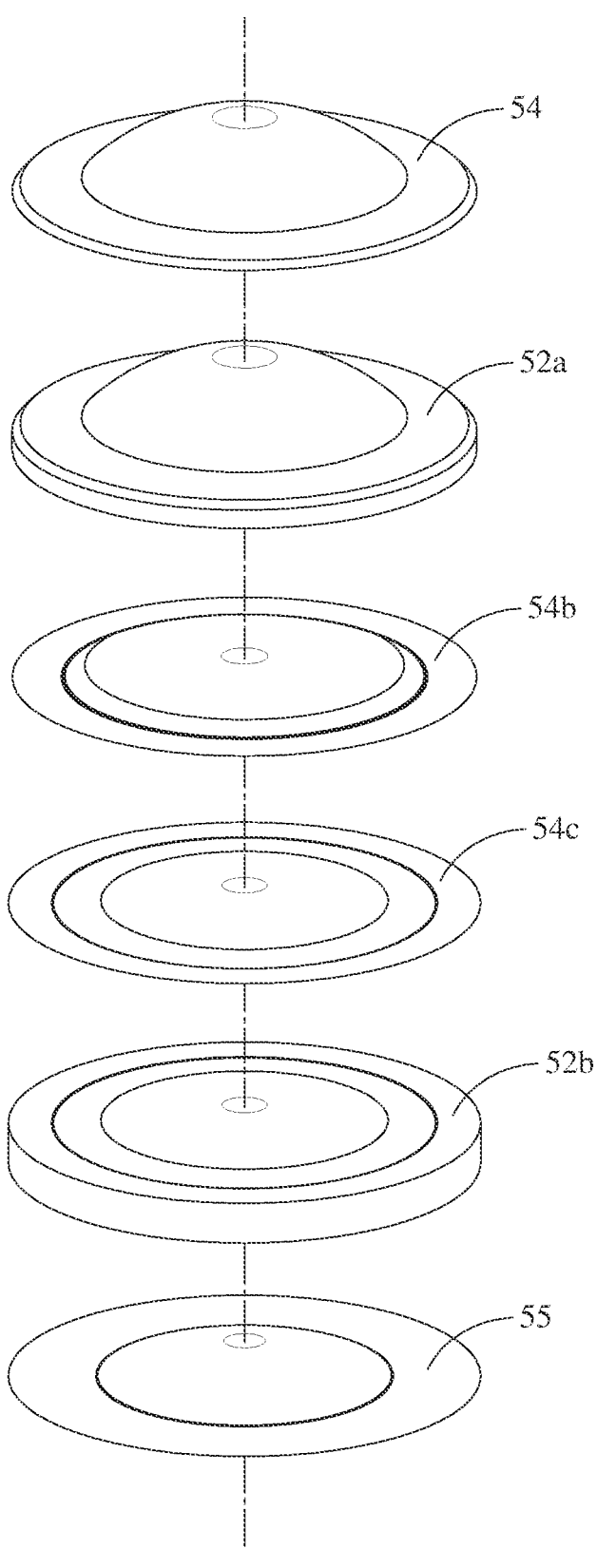
FIG. 34 is a schematic view showing the explosion relationship between a first lens element, a second lens element, a wide-range low reflection layer, a second wide-range low reflection layer, a third wide-range low reflection layer and an infrared light reduction layer of the imaging lens in FIG. 32.

Please refer to FIG. 29 to FIG. 34, where FIG. 29 is a perspective view of an imaging lens according to the 5th embodiment of the present disclosure, FIG. 30 is a perspective view of the imaging lens in FIG. 29 that has been sectioned, FIG. 31 is a cross-sectional view of the imaging lens in FIG. 29, FIG. 32 is an exploded view of the imaging lens in FIG. 31, FIG. 33 is another exploded view of the imaging lens in FIG. 31, and FIG. 34 is a schematic view showing the explosion relationship between a first lens element, a second lens element, a wide-range low reflection layer, a second wide-range low reflection layer, a third wide-range low reflection layer and an infrared light reduction layer of the imaging lens in FIG. 32.

In this embodiment, the imaging lens 5 has an average transmittance less than or equal to 10% to light with a wavelength ranging from 750 to 1050 nanometers. The imaging lens 5 includes a central optical path 50, a lens carrier 51, a plurality of lens elements 52, a plurality of optical elements 53, a wide-range low reflection layer 54, a second wide-range low reflection layer 54b, a third wide-range low reflection layer 54c, an infrared light reduction layer 55, a flat element 56 and an image surface 57, wherein the central optical path 50 passes through the lens carrier 51, the lens elements 52, the optical elements 53, the wide-range low reflection layer 54, the second wide-range low reflection layer 54b, the third wide-range low reflection layer 54c, the infrared light reduction layer 55 and the flat element 56 and then arrives the image surface 57.

The lens carrier 51 accommodates the lens elements 52 and the optical elements 53. The lens elements 52 are sequentially arranged along the central optical path 50. The lens elements 52 include a first lens element 52a and a plurality of subsequent lens elements, and the first lens element 52a is located closer to an object side than the plurality of subsequent lens elements.

The first lens element 52a has a paraxial region which the central optical path 50 passes through, and the first lens element 52a has positive refractive power.

The first lens element 52a has an object-side surface where the wide-range low reflection layer 54 is disposed. The wide-range low reflection layer 54 has an average reflectance less than or equal to 0.98% to light with the wavelength ranging from 750 to 1050 nanometers, and has a reflectance difference less than or equal to 2% to light with a wavelength ranging from 550 to 1050 nanometers.

The first lens element 52a has an image-side surface where the second wide-range low reflection layer 54b is disposed. The second wide-range low reflection layer 54b has an average reflectance less than or equal to 0.98% to light with the wavelength ranging from 750 to 1050 nanometers, and has a reflectance difference less than or equal to 2% to light with the wavelength ranging from 550 to 1050 nanometers.

The subsequent lens elements include a second lens element 52b, a third lens element 52c, a fourth lens element 52d, a fifth lens element 52e, a sixth lens element 52f and a seventh lens element 52g.

The second lens element 52b has a paraxial region which the central optical path 50 passes through. The second lens element 52b is an infrared light absorption lens element configured to absorb infrared light, and the second lens element 52b has an absorption peak value within an infrared band ranging from 600 to 850 nanometers. The second lens element 52b as the infrared light absorption lens element is disposed between the wide-range low reflection layer 54 and the infrared light reduction layer 55.

The second lens element 52b has an object-side surface where the third wide-range low reflection layer 54c is disposed. The third wide-range low reflection layer 54c has an average reflectance less than or equal to 0.98% to light with the wavelength ranging from 750 to 1050 nanometers and has a reflectance difference less than or equal to 2% to light with the wavelength ranging from 550 to 1050 nanometers.

The second lens element 52b has an image-side surface where the infrared light reduction layer 55 is disposed. The infrared light reduction layer 55 has an average reflectance greater than or equal to 50% to light with the wavelength ranging from 750 to 1050 nanometers.

The optical elements 53 are arranged along the central optical path 50. The optical elements 53 include a first light-blocking element 531a, a second light-blocking element 531b, a third light-blocking element 531c, a fourth light-blocking element 531d, a first spacer 532a, a second spacer 532b and a retainer 533.

In the imaging lens 5, in order from the object side to an image side along the central optical path 50, the wide-range low reflection layer 54, the first lens element 52a, the second wide-range low reflection layer 54b, the first light-blocking element 531a, the third wide-range low reflection layer 54c, the second lens element 52b, the infrared light reduction layer 55, the second light-blocking element 531b, the third lens element 52c, the third light-blocking element 531c, the fourth lens element 52d, the first spacer 532a, the fifth lens element 52e, the fourth light-blocking element 531d, the sixth lens element 52f, the second spacer 532b, the seventh lens element 52g, the retainer 533, the flat element 56 and the image surface 57 are sequentially arranged.

When a thickness of the second lens element 52b along the central optical path 50 is T', and a distance along the central optical path 50 between the wide-range low reflection layer 54 and the infrared light reduction layer 55 is D, the following conditions are satisfied: T'=0.300 [mm]; D=1.352 [mm]; and T'/D=0.22.

When a curvature radius of the wide-range low reflection layer 54 in a region where the central optical path 50 passes is R1, and a curvature radius of the infrared light reduction layer 55 in a region where the central optical path 50 passes is R2, the following conditions are satisfied: R1=3.06 [mm]; R2=4.23 [mm]; and R1/R2=0.72.

6th Embodiment

Figure 35:
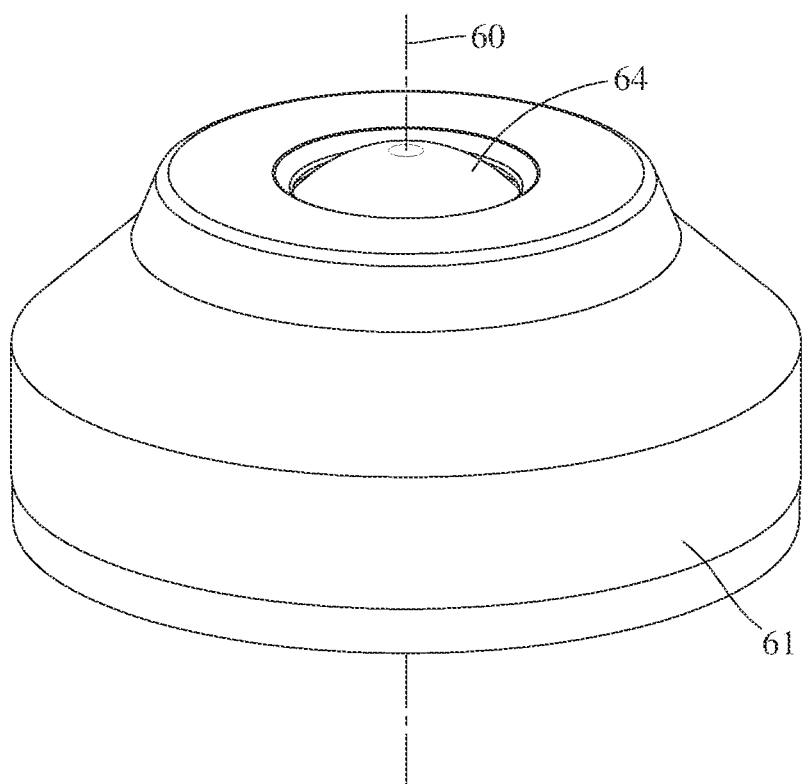
FIG. 35 is a perspective view of an imaging lens according to the 6th embodiment of the present disclosure.
Figure 36:
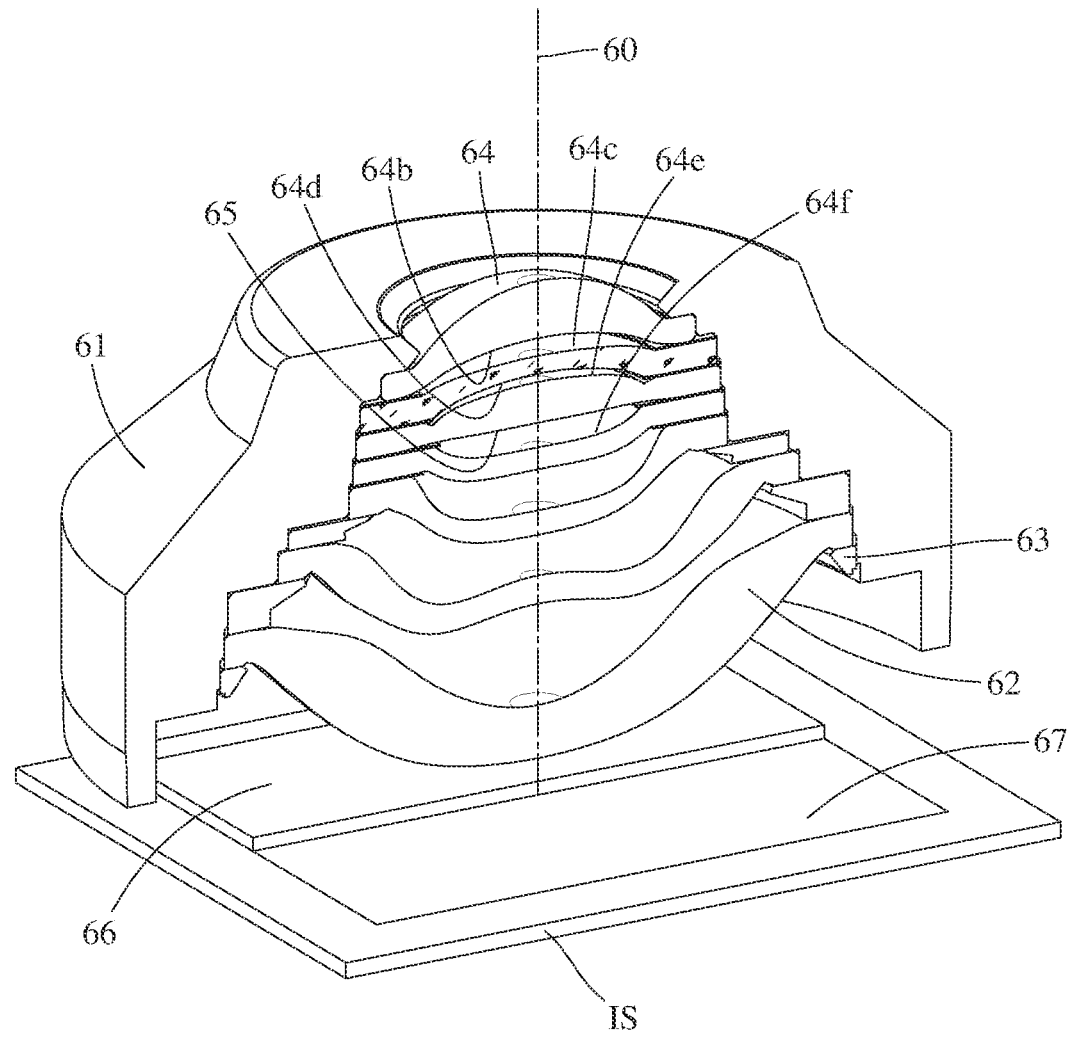
FIG. 36 is a perspective view of the imaging lens in FIG. 35 and an image sensor that are partially sectioned.
Figure 37:
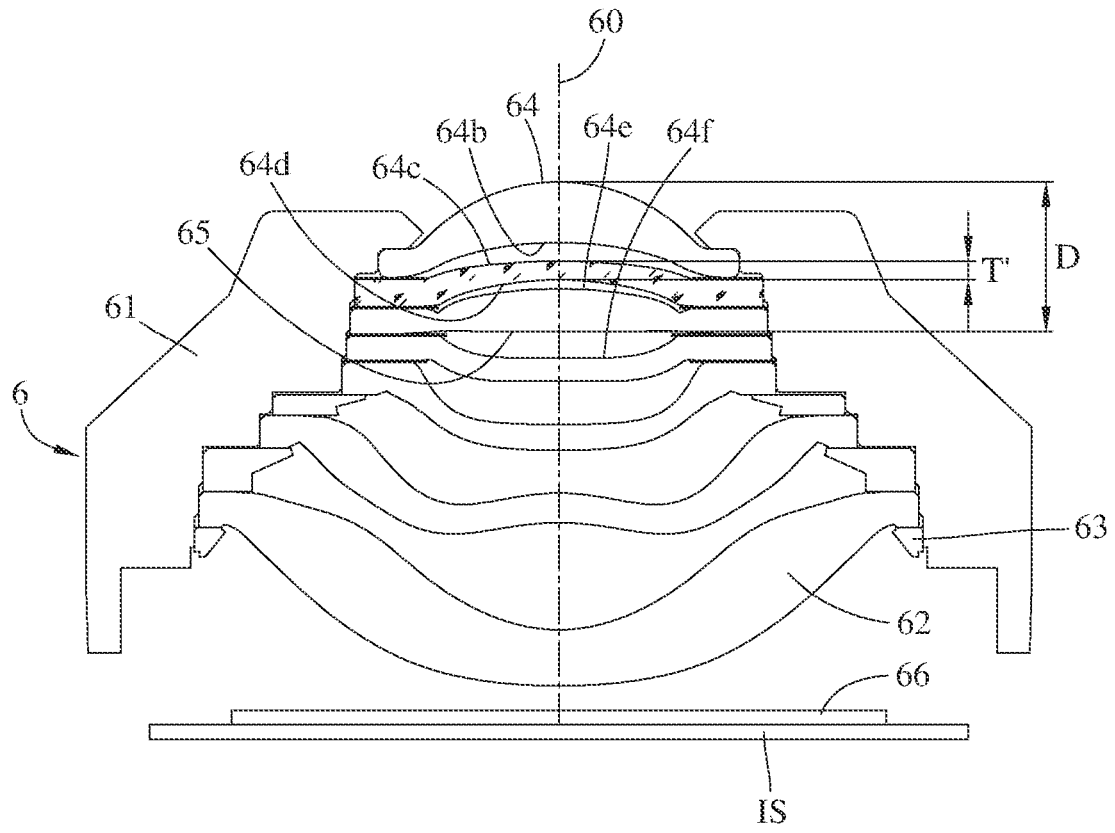
FIG. 37 is a cross-sectional view of the imaging lens and the image sensor in FIG. 36.
Figure 38:
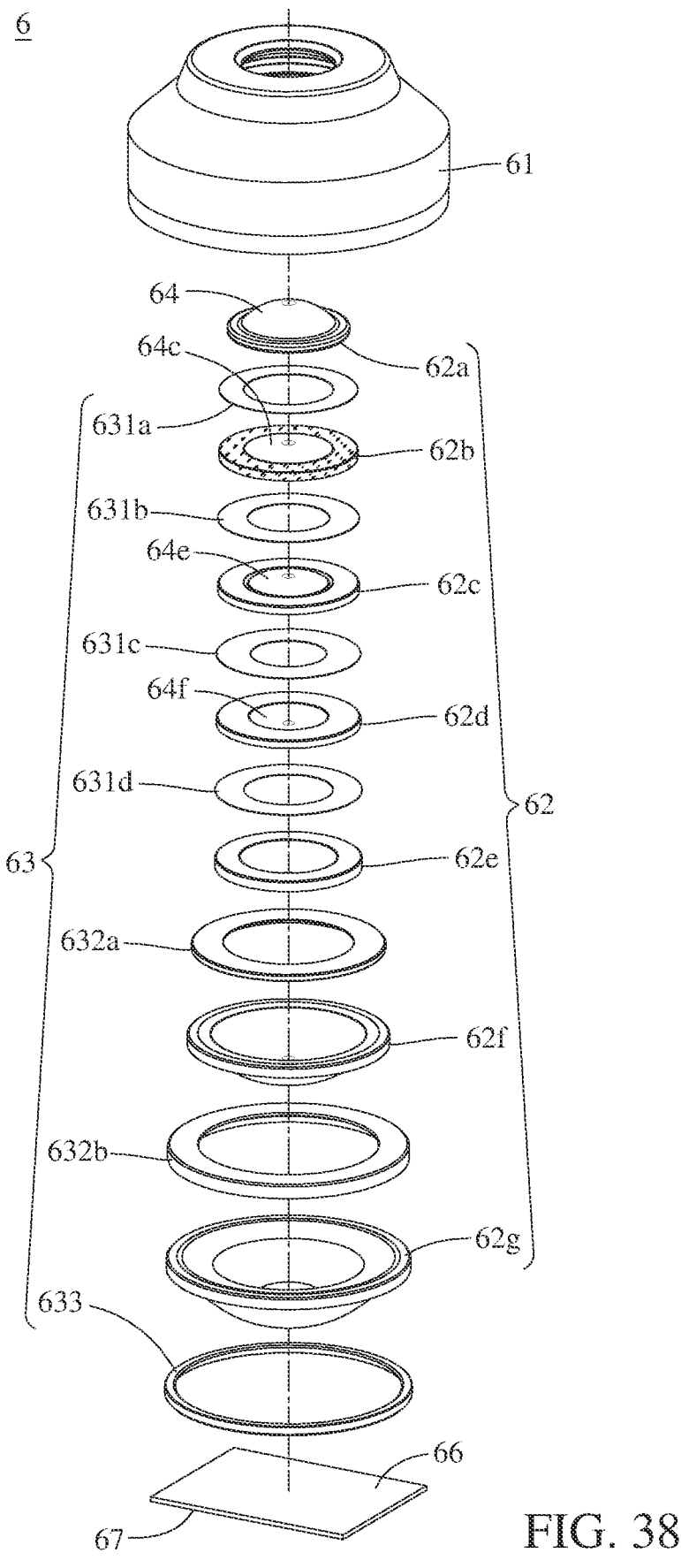
FIG. 38 is an exploded view of the imaging lens in FIG. 37.
Figure 39:
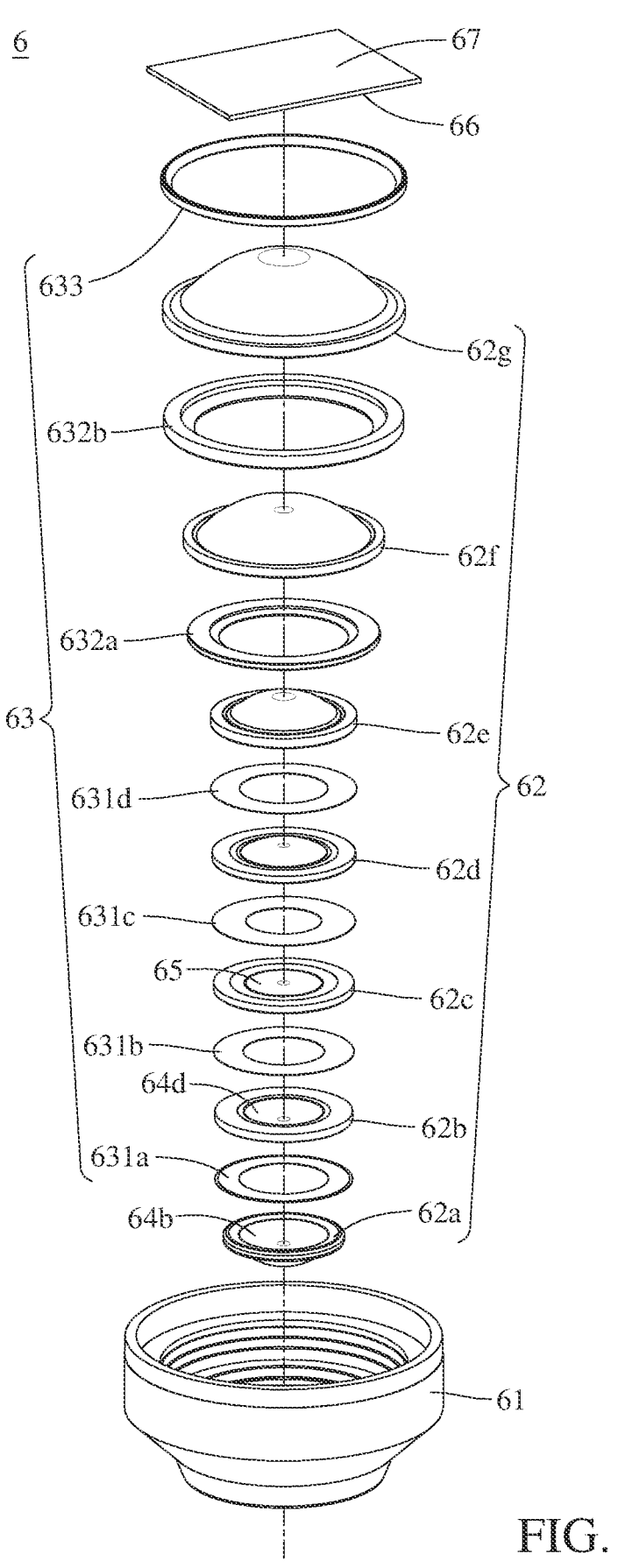
FIG. 39 is another exploded view of the imaging lens in FIG. 37.
Figure 40:
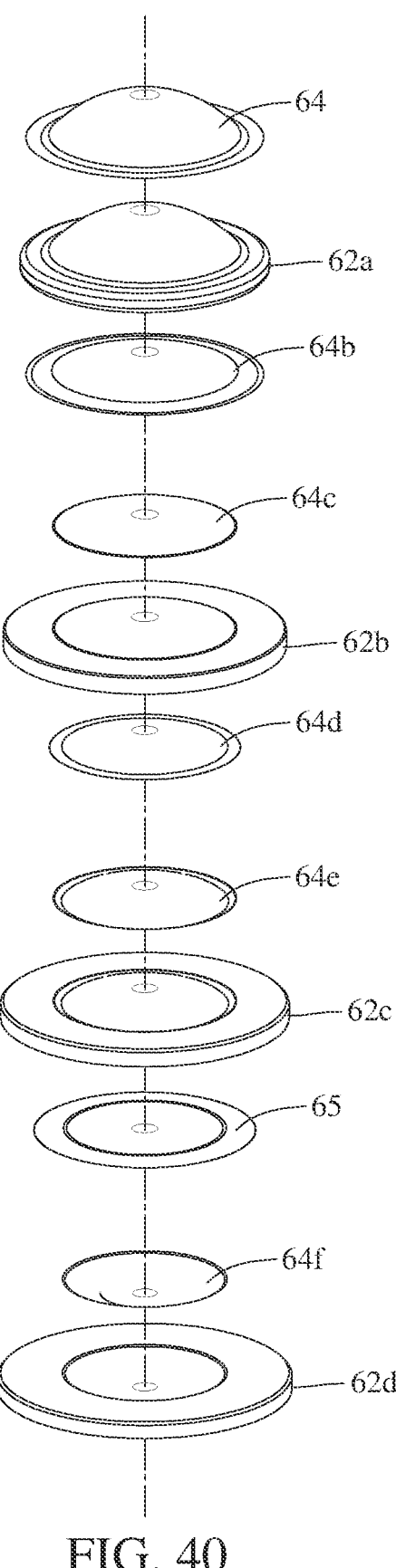
FIG. 40 is a schematic view showing the explosion relationship between a first lens element, a second lens element, a third lens element, a fourth lens element, a plurality of wide-range low reflection layers and an infrared light reduction layer of the imaging lens in FIG. 38.

Please refer to FIG. 35 to FIG. 40, where FIG. 35 is a perspective view of an imaging lens according to the 6th embodiment of the present disclosure, FIG. 36 is a perspective view of the imaging lens in FIG. 35 and an image sensor that are partially sectioned, FIG. 37 is a cross-sectional view of the imaging lens and the image sensor in FIG. 36, FIG. 38 is an exploded view of the imaging lens in FIG. 37, FIG. 39 is another exploded view of the imaging lens in FIG. 37, and FIG. 40 is a schematic view showing the explosion relationship between a first lens element, a second lens element, a third lens element, a fourth lens element, a plurality of wide-range low reflection layers and an infrared light reduction layer of the imaging lens in FIG. 38.

In this embodiment, the imaging lens 6 has an average transmittance less than or equal to 10% to light with a wavelength ranging from 750 to 1050 nanometers. The imaging lens 6 includes a central optical path 60, a lens carrier 61, a plurality of lens elements 62, a plurality of optical elements 63, a wide-range low reflection layer 64, a second wide-range low reflection layer 64b, a third wide-range low reflection layer 64c, a fourth wide-range low reflection layer 64d, a fifth wide-range low reflection layer 64e, a sixth wide-range low reflection layer 64f, an infrared light reduction layer 65, a flat element 66 and an image surface 67. Further, as shown in FIG. 36, when the imaging lens 6 is applied to an electronic device (not numbered), the flat element 66 is disposed on a surface of an image sensor IS of the electronic device corresponding to the image surface 67 so as to prevent ghost image generated between the flat element 66 and the image sensor IS. The flat element

66 can be fixed on the surface of the image sensor IS corresponding to the image surface 67 by adhering, or the flat element 66 can also be formed on the surface of the image sensor IS corresponding to the image surface 67 by molding, and the present disclosure is not limited thereto. Moreover, the central optical path 60 passes through the lens carrier 61, the lens elements 62, the optical elements 63, the wide-range low reflection layer 64, the second wide-range low reflection layer 64b, the third wide-range low reflection layer 64c, the fourth wide-range low reflection layer 64d, the fifth wide-range low reflection layer 64e, the sixth wide-range low reflection layer 64f, the infrared light reduction layer 65 and the flat element 66 and then arrives the image surface 67.

The lens carrier 61 accommodates the lens elements 62 and the optical elements 63. The lens elements 62 are sequentially arranged along the central optical path 60. The lens elements 62 include a first lens element 62a and a plurality of subsequent lens elements, and the first lens element 62a is located closer to an object side than the plurality of subsequent lens elements.

The first lens element 62a has a paraxial region which the central optical path 60 passes through, and the first lens element 62a has positive refractive power. The first lens element 62a has an object-side surface where the wide-range low reflection layer 64 is disposed. The wide-range low reflection layer 64 has an average reflectance less than or equal to 0.98% to light with the wavelength ranging from 750 to 1050 nanometers, and has a reflectance difference less than or equal to 2% to light with a wavelength ranging from 550 to 1050 nanometers.

The first lens element 62a has an image-side surface where the second wide-range low reflection layer 64b is disposed. The second wide-range low reflection layer 64b has an average reflectance less than or equal to 0.98% to light with the wavelength ranging from 750 to 1050 nanometers, and has a reflectance difference less than or equal to 2% to light with the wavelength ranging from 550 to 1050 nanometers.

The subsequent lens elements include a second lens element 62b, a third lens element 62c, a fourth lens element 62d, a fifth lens element 62e, a sixth lens element 62f and a seventh lens element 62g.

The second lens element 62b has a paraxial region which the central optical path 60 passes through. The second lens element 62b is a glass lens element, and the second lens element 62b can be, for example, a molded glass lens element. The second lens element 62b is an infrared light absorption lens element configured to absorb infrared light, and the second lens element 62b has an absorption peak value within an infrared band ranging from 600 to 850 nanometers. The second lens element 62b as the infrared light absorption lens element is disposed between the wide-range low reflection layer 64 and the infrared light reduction layer 65.

The second lens element 62b has an object-side surface where the third wide-range low reflection layer 64c is disposed. The third wide-range low reflection layer 64c has an average reflectance less than or equal to 0.98% to light with the wavelength ranging from 750 to 1050 nanometers, and has a reflectance difference less than or equal to 2% to light with the wavelength ranging from 550 to 1050 nanometers.

The second lens element 62b has an image-side surface where the fourth wide-range low reflection layer 64d is disposed. The fourth wide-range low reflection layer 64d has an average reflectance less than or equal to 0.98% to light with the wavelength ranging from 750 to 1050 nanometers, and has a reflectance difference less than or equal to 2% to light with the wavelength ranging from 550 to 1050 nanometers.

The third lens element 62c has an object-side surface where the fifth wide-range low reflection layer 64e is disposed. The fifth wide-range low reflection layer 64e has an average reflectance less than or equal to 0.98% to light with the wavelength ranging from 750 to 1050 nanometers, and has a reflectance difference less than or equal to 2% to light with the wavelength ranging from 550 to 1050 nanometers.

The third lens element 62c has an image-side surface where the infrared light reduction layer 65 is disposed. The infrared light reduction layer 65 has an average reflectance greater than or equal to 50% to light with the wavelength ranging from 750 to 1050 nanometers.

The fourth lens element 62d has an object-side surface where the sixth wide-range low reflection layer 64f is disposed. It can be also considered that the sixth wide-range low reflection layer 64f faces an image-side surface of the infrared light reduction layer 65. The sixth wide-range low reflection layer 64f has an average reflectance less than or equal to 0.98% to light with the wavelength ranging from 750 to 1050 nanometers, and has a reflectance difference less than or equal to 2% to light with the wavelength ranging from 550 to 1050 nanometers.

The optical elements 63 are arranged along the central optical path 60. The optical elements 63 include a first light-blocking element 631a, a second light-blocking element 631b, a third light-blocking element 631c, a fourth light-blocking element 631d, a first spacer 632a, a second spacer 632b and a retainer 633.

In the imaging lens 6, in order from the object side to an image side along the central optical path 60, the wide-range low reflection layer 64, the first lens element 62a, the second wide-range low reflection layer 64b, the first light-blocking element 631a, the third wide-range low reflection layer 64c, the second lens element 62b, the fourth wide-range low reflection layer 64d, the second light-blocking element 631b, the fifth wide-range low reflection layer 64e, the third lens element 62c, the infrared light reduction layer 65, the third light-blocking element 631c, the sixth wide-range low reflection layer 64f, the fourth lens element 62d, the fourth light-blocking element 631d, the fifth lens element 62e, the first spacer 632a, the sixth lens element 62f, the second spacer 632b, the seventh lens element 62g, the retainer 633, the flat element 66 and the image surface 67 are sequentially arranged.

When a thickness of the second lens element 62b along the central optical path 60 is T', and a distance along the central optical path 60 between the wide-range low reflection layer 64 and the infrared light reduction layer 65 is D, the following conditions are satisfied: T'=0.23 [mm]; D=1.833 [mm]; and T'/D=0.13.

When a curvature radius of the wide-range low reflection layer 64 in a region where the central optical path 60 passes is R1, and a curvature radius of the infrared light reduction layer 65 in a region where the central optical path 60 passes is R2, the following conditions are satisfied: R1=2.22 [mm]; R2=35.71 [mm]; and R1/R2=0.06.

7th Embodiment

Figure 41:
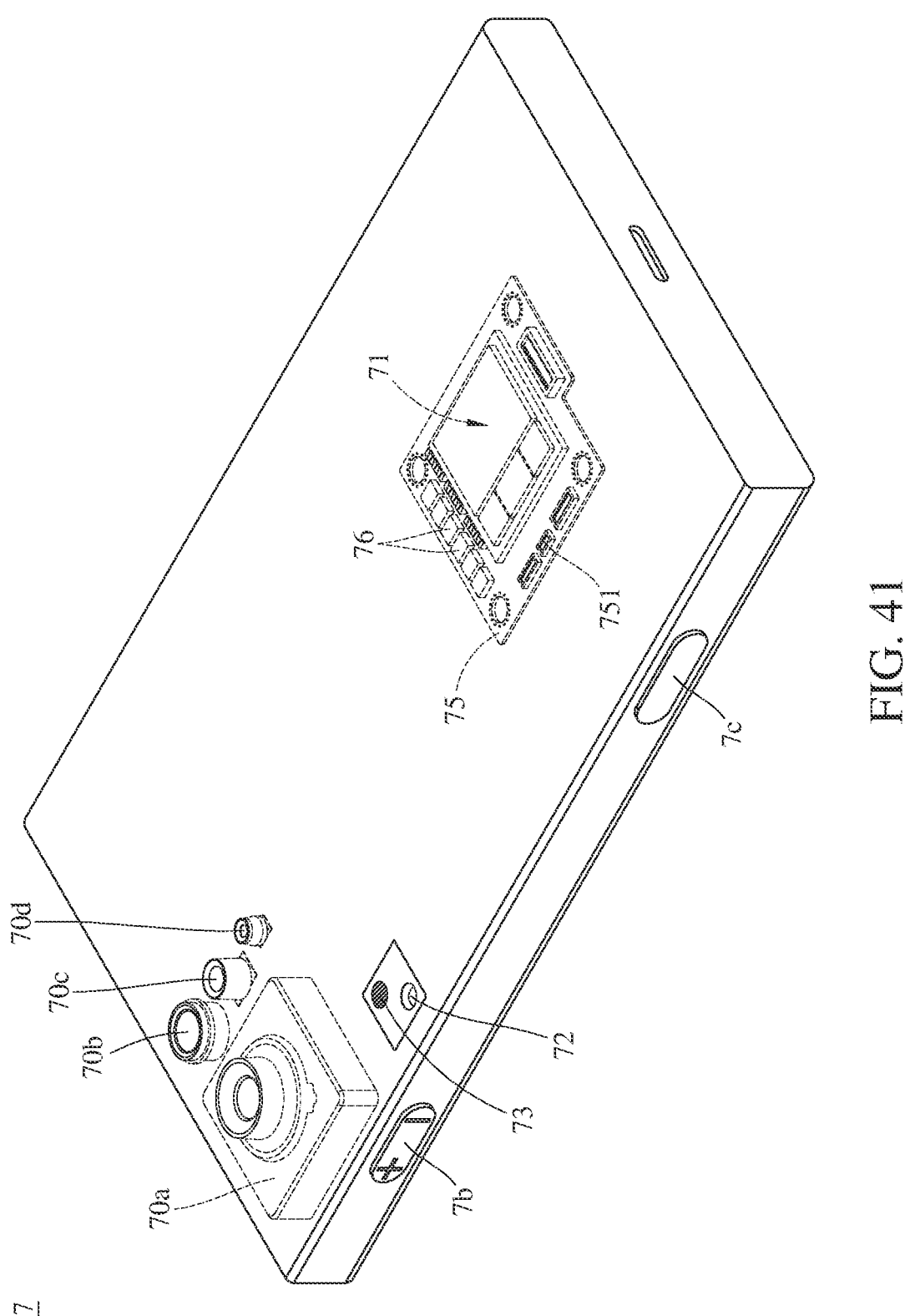
FIG. 41 is a perspective view of an electronic device according to the 7th embodiment of the present disclosure.
Figure 42:
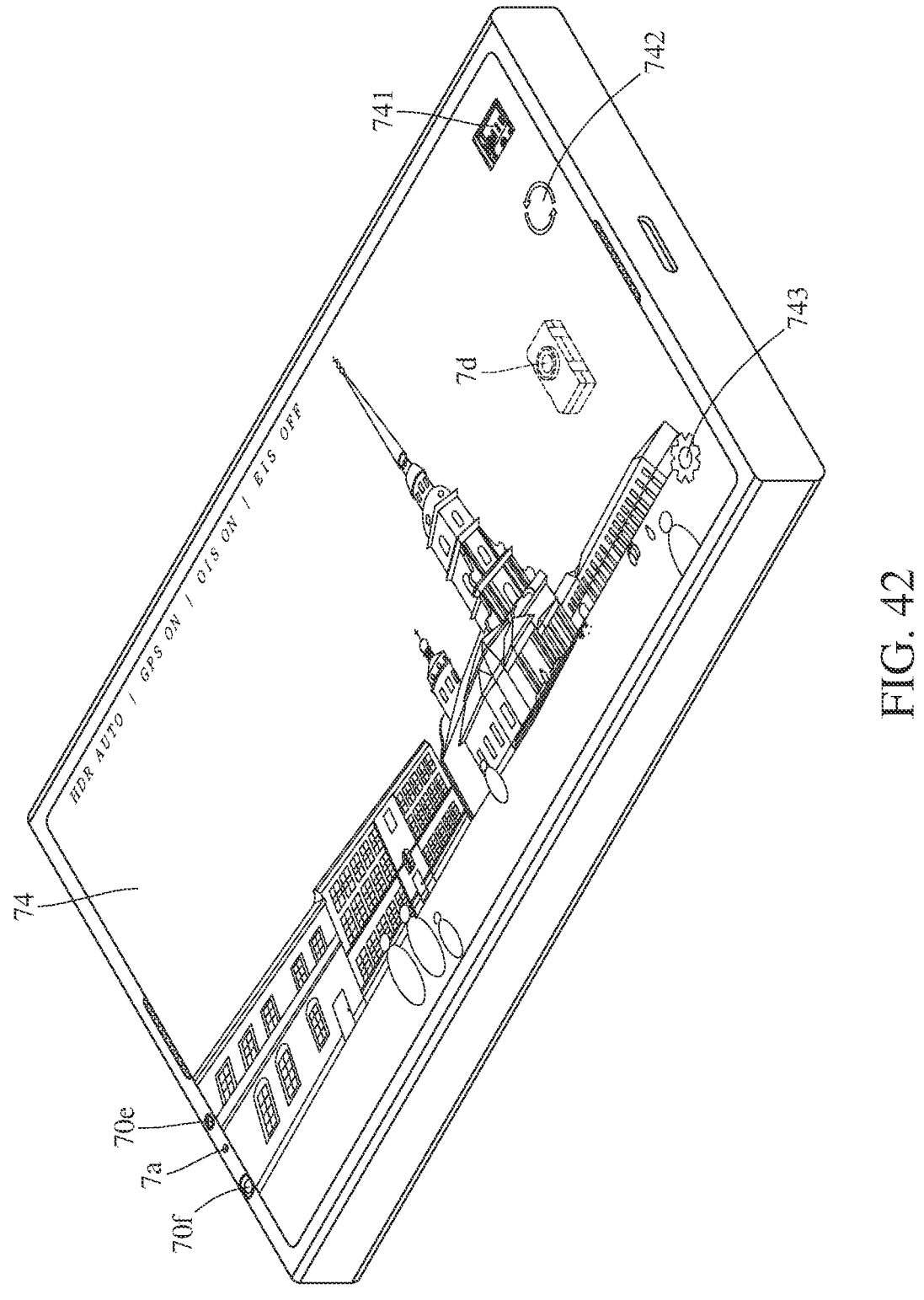
FIG. 42 is another perspective view of the electronic device in FIG. 41.
Figure 43:
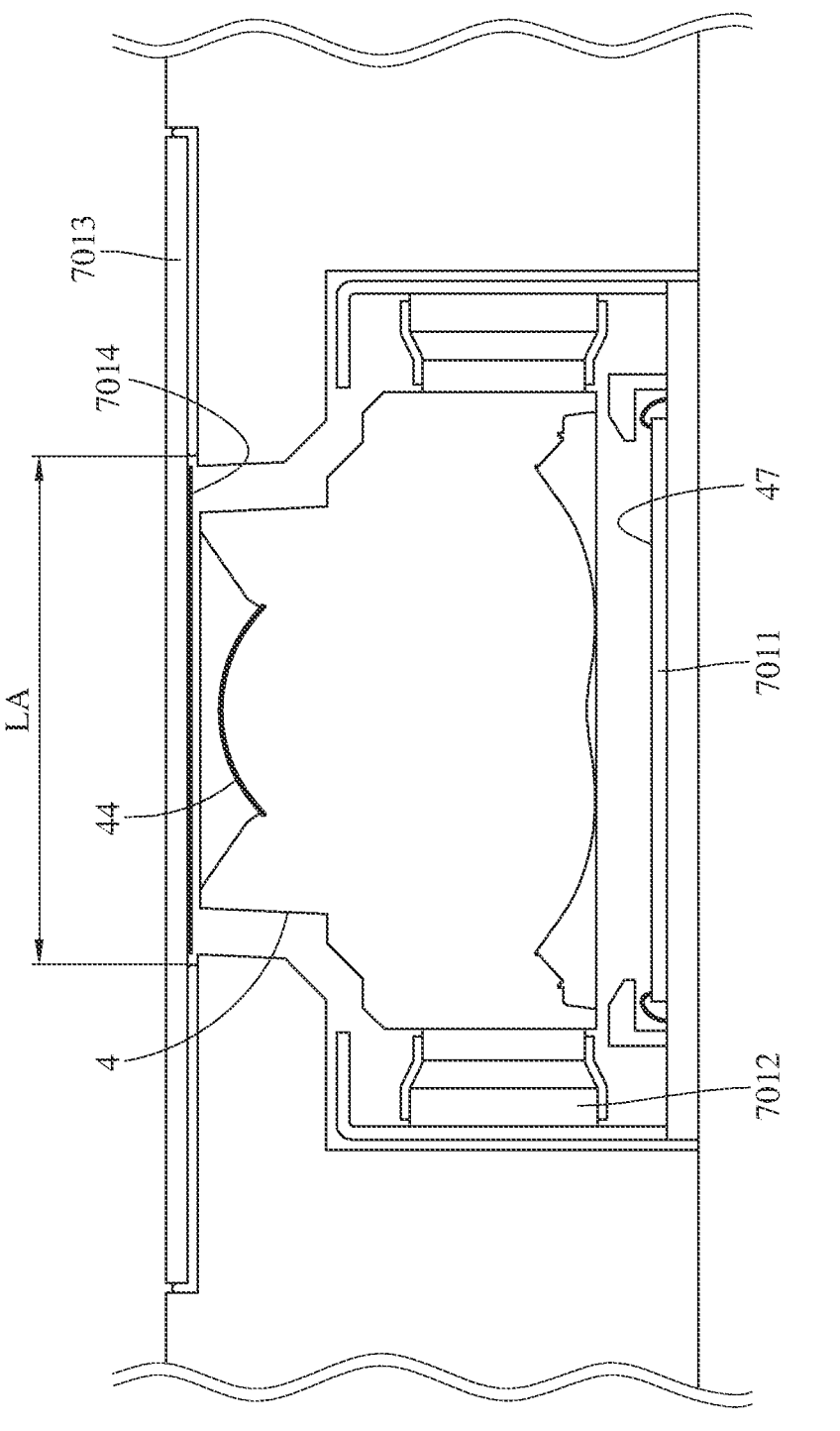
FIG. 43 is a partial and cross-sectional view of the electronic device in FIG. 41 at a position where one camera module is located.
Figure 44:
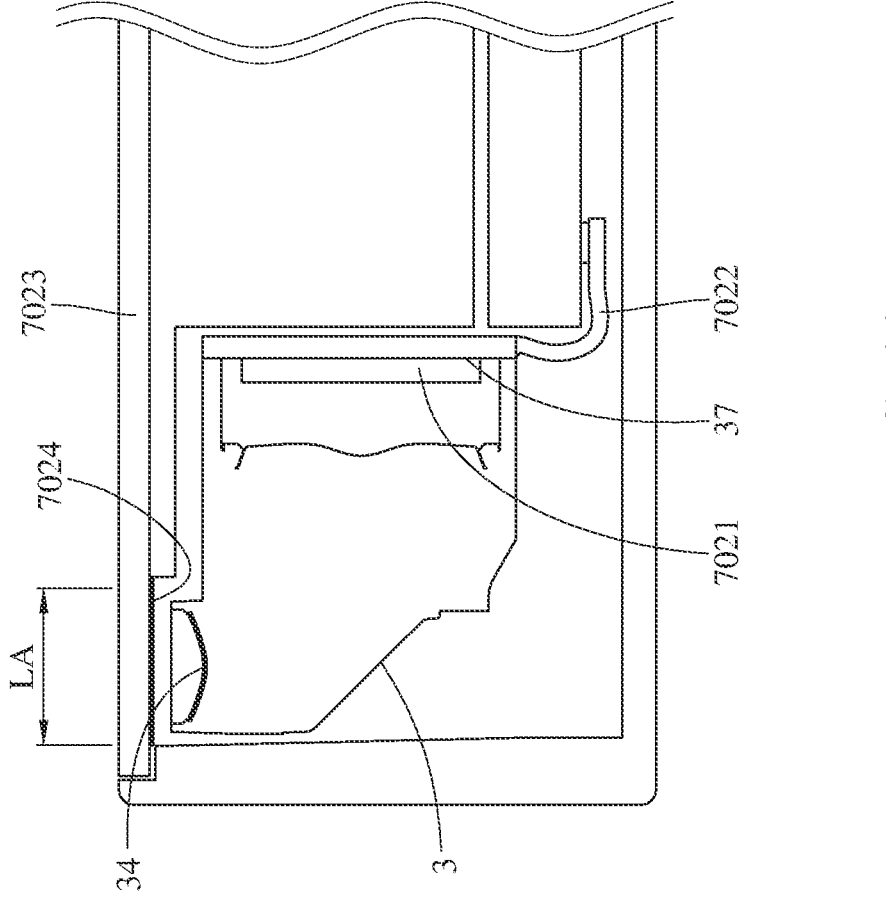
FIG. 44 is a partial and cross-sectional view of the electronic device in FIG. 42 at a position where another camera module is located.
Figure 45:
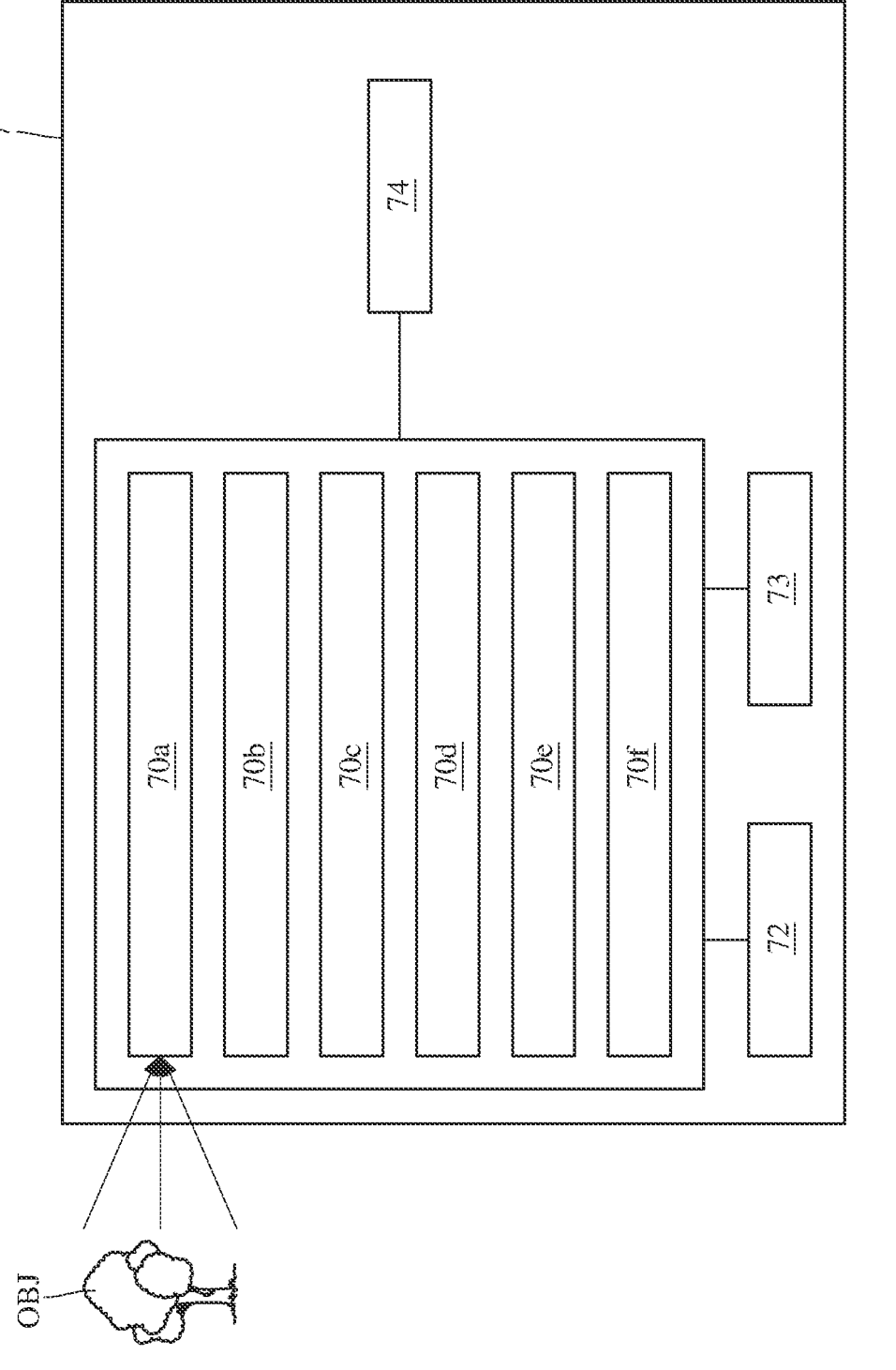
FIG. 45 is a block diagram of the electronic device in FIG. 41.

Please refer to FIG. 41 to FIG. 45, where FIG. 41 is a perspective view of an electronic device according to the 7th embodiment of the present disclosure, FIG. 42 is another perspective view of the electronic device in FIG. 41, FIG. 43 is a partial and cross-sectional view of the electronic device in FIG. 41 at a position where one camera module is located, FIG. 44 is a partial and cross-sectional view of the electronic device in FIG. 42 at a position where another camera module is located, and FIG. 45 is a block diagram of the electronic device in FIG. 41.

In this embodiment, an electronic device 7 is a mobile device such as a computer, a smartphone, a smart wearable device, a camera drone, or a driving recorder and displayer, and the present disclosure is not limited thereto. The electronic device 7 includes a camera module 70a, a camera module 70b, a camera module 70c, a camera module 70d, a camera module 70e, a camera module 70f, a flash module 72, a focus assist module 73, an image-capturing control interface 74, an image signal processor (not numbered) and an image software processor (not numbered). In addition, the camera module 70a and the camera module 70e are, for example, the imaging lens 4 as disclosed in the 4th embodiment and the imaging lens 3 as disclosed in the 3rd embodiment, respectively, but the present disclosure is not limited thereto. Each of the camera modules 70a, 70b, 70c, 70d, 70e and 70f may be one of the imaging lenses 1-6 as disclosed in the above embodiments of the present disclosure.

The camera module 70a, the camera module 70b, the camera module 70c and the camera module 70d are disposed on the same side of the electronic device 7. The camera module 70e, the camera module 70f and the image-capturing control interface 74 are disposed on the opposite side of the electronic device 7. The image-capturing control interface 74 can be a display module, such that the camera module 70e and the camera module 70f can be front-facing cameras of the electronic device 7 for taking selfies, but the present disclosure is not limited thereto.

The camera module 70a is a wide-angle camera module, the camera module 70b is a telephoto camera module, the camera module 70c is an ultra-wide-angle camera module, the camera module 70d is a macro-photo camera module, the camera module 70e is a front camera module, the camera module 70f is a ToF (time of flight) camera module. In this embodiment, the camera module 70a, the camera module 70b, the camera module 70c and the camera module 70d have different fields of view, such that the electronic device 7 can have various magnification ratios so as to meet the requirement of optical zoom functionality. In addition, the camera module 70f can determine depth information of the imaged object. In this embodiment, the electronic device 7 includes multiple camera modules 70a, 70b, 70c, 70d, 70e and 70f, but the present disclosure is not limited to the number and arrangement of optical units.

Moreover, the electronic device 7 further includes an image sensor 7011, an activator 7012, a cover element 7013 and an additional wide-range low reflection layer 7014.

Specifically, as shown in FIG. 43, with regard to the camera module 70a (imaging lens 4), the image sensor 7011 is disposed on the image surface 47 of the imaging lens 4. The activator 7012 can move the imaging lens 4 to focus imaging light on the image surface 47. The cover element 7013 is disposed at an object side of the imaging lens 4. The cover element 7013 has a light passable region LA disposed corresponding to the wide-range low reflection layer 44. The additional wide-range low reflection layer 7014 is disposed on the light passable region LA.

Moreover, the electronic device 7 further includes an image sensor 7021, a circuit element 7022, a cover element 7023 and an additional wide-range low reflection layer 7024.

Specifically, as shown in FIG. 44, with regard to the camera module 70e (imaging lens 3), the image sensor 7021 is disposed on the image surface 37 of the imaging lens 3. The circuit element 7022 is disposed on and electrically connected to the image sensor 7021 so as to transmit imaged data of the image surface 37 to other elements for further processing. The cover element 7023 is disposed at an object side of the imaging lens 3. The cover element 7023 has a light passable region LA disposed corresponding to the wide-range low reflection layer 34. The additional wide-range low reflection layer 7024 is disposed on the light passable region LA.

When a user captures images of an object OBJ, light rays converge in the camera module 70a, the camera module 70b, the camera module 70c or the camera module 70d to generate images, and the flash module 72 is activated for light supplement. The focus assist module 73 detects the object distance of the imaged object OBJ to achieve fast auto focusing. The image signal processor is configured to optimize the captured image to improve image quality. The light beam emitted from the focus assist module 73 can be either conventional infrared or laser.

In addition, the light rays may converge in the camera module 70d, the camera module 70e or the camera module 70f to generate images. The electronic device 7 can include a reminder light 7a that can be illuminated to remind the user that the camera module 70d, the camera module 70e or the camera module 70f is working. The image-capturing control interface 74 can be a touch screen or collaborated with physical buttons such as a zoom button 7b and a shutter release button 7c of the electronic device 7. The user is able to interact with the image-capturing control interface 74 and the image software processor having multiple functions to capture images and complete image processing. The image processed by the image software processor can be displayed on the image-capturing control interface 74. The user can replay the previously captured image through an image playback button 741 of the image-capturing control interface 74, can choose a suitable camera module for shooting through a camera module switching button 742 of the image-capturing control interface 74, and can properly adjust shooting parameters according to current shooting situations through an integrated menu button 743 of the image-capturing control interface 74.

Further, the electronic device 7 further includes a circuit board 75 and a plurality of electronic components 76 disposed on the circuit board 75. The camera modules 70a, 70b, 70c, 70d, 70e and 70f are electrically connected to the electronic component 76 via connectors 751 on the circuit board 75. The electronic components 76 can include a signal emitting module and can transmit image(s) to other electronic device or a cloud storage via the signal emitting module. The signal emitting module can be a wireless fidelity (WiFi) module, a Bluetooth module, an infrared module, a network service module or an integrated module for transmitting various signals mentioned above, and the present disclosure is not limited thereto.

The electronic components 76 can also include a storage unit, a random access memory for storing image information, a gyroscope, and a position locator for facilitating the navigation or positioning of the electronic device 7. In this embodiment, the image signal processor, the image software processor and the random access memory are integrated into a single chip system 71, but the present disclosure is not limited thereto. In some other embodiments, the electronic components can also be integrated in the camera module or can also be disposed on one of the circuit boards. In addition, the user can use the biometric identification device 7*d* of the electronic device 7 to turn on or unlock the electronic device 7.

The smartphone in this embodiment is only exemplary for showing the imaging lens and the camera module of the present disclosure installed in the electronic device 7, and the present disclosure is not limited thereto. The imaging lens and the camera module can be optionally applied to optical systems with a movable focus. Furthermore, the imaging lenses 1-6 feature good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens, having a central optical path and comprising:

a plurality of lens elements, sequentially arranged along the central optical path, wherein the plurality of lens elements comprise a first lens element and at least one subsequent lens element, and the first lens element is located closer to an object side than the at least one subsequent lens element;

a wide-range low reflection layer, disposed on an object-side surface of the first lens element, wherein an average reflectance of the wide-range low reflection layer to light with a wavelength ranging from 750 to 1050 nanometers is less than or equal to 0.98%; and an infrared light reduction layer, located closer to an image side than the wide-range low reflection layer, wherein an average reflectance of the infrared light reduction layer to light with the wavelength ranging from 750 to 1050 nanometers is greater than or equal to 50%;

wherein the central optical path passes through a paraxial region of the first lens element, a thickness of the first lens element along the central optical path is T, a distance along the central optical path between the wide-range low reflection layer and the infrared light reduction layer is D, a curvature radius of the wide-range low reflection layer in a region where the central optical path passes is R1, a curvature radius of the infrared light reduction layer in a region where the central optical path passes is R2, and the following conditions are satisfied:

$$0.11 \le T/D \le 10;$$

and
$$0 \le R1/R2 \le 1.48.$$

2. The imaging lens according to claim 1, wherein the thickness of the first lens element along the central optical path is T, the distance along the central optical path between the wide-range low reflection layer and the infrared light reduction layer is D, and the following condition is satisfied:

$$0.2 \le T/D \le 1.0.$$

3. The imaging lens according to claim 1, wherein the curvature radius of the wide-range low reflection layer in the region where the central optical path passes is R1, the curvature radius of the infrared light reduction layer in the region where the central optical path passes is R2, and the following condition is satisfied:

$$0 \le R1/R2 \le 0.8.$$

4. The imaging lens according to claim 1, wherein the first lens element is configured to absorb infrared light, and the first lens element has an absorption peak value within an infrared band ranging from 600 to 850 nanometers.

5. The imaging lens according to claim 1, wherein an average reflectance of the wide-range low reflection layer to light with a wavelength ranging from 400 to 1050 nanometers is less than or equal to 0.98%.

6. The imaging lens according to claim 5, wherein the average reflectance of the wide-range low reflection layer to light with the wavelength ranging from 400 to 1050 nanometers is less than or equal to 0.5%.

7. The imaging lens according to claim 1, wherein a reflectance difference of the wide-range low reflection layer to light with a wavelength ranging from 550 to 1050 nanometers is less than or equal to 2%.

8. The imaging lens according to claim 7, wherein the reflectance difference of the wide-range low reflection layer to light with the wavelength ranging from 550 to 1050 nanometers is less than or equal to 1%.

9. The imaging lens according to claim 1, wherein the average reflectance of the infrared light reduction layer to light with the wavelength ranging from 750 to 1050 nanometers is greater than or equal to 80%.

10. The imaging lens according to claim 9, wherein the average reflectance of the infrared light reduction layer to light with the wavelength ranging from 750 to 1050 nanometers is greater than or equal to 95%.

11. The imaging lens according to claim 1, wherein an average transmittance of the imaging lens to light with the wavelength ranging from 750 to 1050 nanometers is less than or equal to 10%.

12. The imaging lens according to claim 11, wherein the average transmittance of the imaging lens to light with the wavelength ranging from 750 to 1050 nanometers is less than or equal to 3%.

13. The imaging lens according to claim 1, wherein at least one of the plurality of lens elements is an infrared light absorption lens element disposed between the wide-range low reflection layer and the infrared light reduction layer, the central optical path passes through a paraxial region of the infrared light absorption lens element, a thickness of the infrared light absorption lens element along the central optical path is T', the distance along the central optical path between the wide-range low reflection layer and the infrared light reduction layer is D, and the following condition is satisfied:

$$0.18 \le T'/D \le 1.0.$$

14. The imaging lens according to claim 1, wherein the first lens element has positive refractive power.

15. The imaging lens according to claim 1, wherein the wide-range low reflection layer comprises a ridge structure layer thereon, the ridge structure layer tapers off along a direction away from the first lens element, and a height of the ridge structure layer ranges from 120 to 300 nanometers.

16. The imaging lens according to claim 1, further comprising a second wide-range low reflection layer facing towards an image-side surface of the infrared light reduction layer.

17. The imaging lens according to claim 1, wherein the infrared light reduction layer is disposed on an image-side surface of the first lens element.

18. An imaging lens, having a central optical path and comprising:

a plurality of lens elements, sequentially arranged along the central optical path, wherein the plurality of lens elements comprise a first lens element and at least one subsequent lens element, and the first lens element is located closer to an object side than the at least one subsequent lens element;

a wide-range low reflection layer, disposed on an object-side surface of the first lens element, wherein an average reflectance of the wide-range low reflection layer to light with a wavelength ranging from 750 to 1050 nanometers is less than or equal to 0.98%; and an infrared light reduction layer, located closer to an image side than the wide-range low reflection layer, wherein an average reflectance of the infrared light reduction layer to light with the wavelength ranging from 750 to 1050 nanometers is greater than or equal to 50%;

wherein the central optical path passes through a paraxial region of the first lens element, a thickness of the first lens element along the central optical path is T, a distance along the central optical path between the wide-range low reflection layer and the infrared light reduction layer is D, and the following condition is satisfied:

$$0.11 \le T/D \le 1.0.$$

19. The imaging lens according to claim 18, wherein the thickness of the first lens element along the central optical path is T, the distance along the central optical path between the wide-range low reflection layer and the infrared light reduction layer is D, and the following condition is satisfied:

$$0.2 \le T/D \le 1.0.$$

20. The imaging lens according to claim 18, wherein the first lens element is configured to absorb infrared light, and the first lens element has an absorption peak value within an infrared band ranging from 600 to 850 nanometers.

21. The imaging lens according to claim 18, wherein an average reflectance of the wide-range low reflection layer to light with a wavelength ranging from 400 to 1050 nanometers is less than or equal to 0.98%.

22. The imaging lens according to claim 18, wherein a reflectance difference of the wide-range low reflection layer to light with a wavelength ranging from 550 to 1050 nanometers is less than or equal to 2%.

23. The imaging lens according to claim 18, wherein the average reflectance of the infrared light reduction layer to light with the wavelength ranging from 750 to 1050 nanometers is greater than or equal to 80%.

24. The imaging lens according to claim 18, wherein an average transmittance of the imaging lens to light with the wavelength ranging from 750 to 1050 nanometers is less than or equal to 10%.

25. The imaging lens according to claim 18, wherein the at least one subsequent lens element comprises an infrared light absorption lens element disposed between the wide-range low reflection layer and the infrared light reduction layer, the central optical path passes through a paraxial region of the infrared light absorption lens element, a thickness of the infrared light absorption lens element along the central optical path is T', the distance along the central optical path between the wide-range low reflection layer and the infrared light reduction layer is D, and the following condition is satisfied:

$$0.18 \le T'/D \le 1.0.$$

26. The imaging lens according to claim 18, wherein the wide-range low reflection layer comprises a ridge structure layer thereon, the ridge structure layer tapers off along a direction away from the first lens element, and a height of the ridge structure layer ranges from 120 to 300 nanometers.

27. The imaging lens according to claim 18, further comprising a second wide-range low reflection layer facing towards an image-side surface of the infrared light reduction layer.

28. The imaging lens according to claim 18, wherein the infrared light reduction layer is disposed on an image-side surface of the first lens element.

29. A camera module, comprising:
the imaging lens of claim 18.

30. An electronic device, comprising:
the camera module of claim 29; and
an image sensor disposed on an image surface of the imaging lens.

31. The electronic device according to claim 30, further comprising a cover element and an additional wide-range low reflection layer, wherein the cover element is disposed at an object side of the imaging lens, the cover element has a light passable region disposed corresponding to the wide-range low reflection layer, and the additional wide-range low reflection layer is disposed on the light passable region.

32. An imaging lens, having a central optical path and comprising:

a plurality of lens elements, sequentially arranged along the central optical path, wherein the plurality of lens elements comprise a first lens element and at least one subsequent lens element, and the first lens element is located closer to an object side than the at least one subsequent lens element;

a wide-range low reflection layer, disposed on an object-side surface of the first lens element, wherein an average reflectance of the wide-range low reflection layer to light with a wavelength ranging from 750 to 1050 nanometers is less than or equal to 0.98%; and an infrared light reduction layer, located closer to an image side than the wide-range low reflection layer, wherein an average reflectance of the infrared light reduction layer to light with the wavelength ranging from 750 to 1050 nanometers is greater than or equal to 50%;

wherein a curvature radius of the wide-range low reflection layer in a region where the central optical path passes is R1, a curvature radius of the infrared light reduction layer in a region where the central optical path passes is R2, and the following condition is satisfied:

$$0 \leq R1/R2 \leq 1.48.$$

33. The imaging lens according to claim 32, wherein the curvature radius of the wide-range low reflection layer in the region where the central optical path passes is R1, the curvature radius of the infrared light reduction layer in the region where the central optical path passes is R2, and the following condition is satisfied:

$$0 \leq R1/R2 \leq 0.8.$$

34. The imaging lens according to claim 32, wherein the first lens element is configured to absorb infrared light, and the first lens element has an absorption peak value within an infrared band ranging from 600 to 850 nanometers.

35. The imaging lens according to claim 32, wherein an average reflectance of the wide-range low reflection layer to light with a wavelength ranging from 400 to 1050 nanometers is less than or equal to 0.98%.

36. The imaging lens according to claim 32, wherein a reflectance difference of the wide-range low reflection layer to light with a wavelength ranging from 550 to 1050 nanometers is less than or equal to 2%.

37. The imaging lens according to claim 32, wherein the average reflectance of the infrared light reduction layer to light with the wavelength ranging from 750 to 1050 nanometers is greater than or equal to 80%.

38. The imaging lens according to claim 32, wherein an average transmittance of the imaging lens to light with the wavelength ranging from 750 to 1050 nanometers is less than or equal to 10%.

39. The imaging lens according to claim 32, wherein the at least one subsequent lens element comprises an infrared light absorption lens element disposed between the wide-range low reflection layer and the infrared light reduction layer, the central optical path passes through a paraxial region of the infrared light absorption lens element, a thickness of the infrared light absorption lens element along the central optical path is T', the distance along the central optical path between the wide-range low reflection layer and the infrared light reduction layer is D, and the following condition is satisfied:

$$0.18 \leq T'/D \leq 1.0.$$

40. The imaging lens according to claim 32, wherein the wide-range low reflection layer comprises a ridge structure layer thereon, the ridge structure layer tapers off along a direction away from the first lens element, and a height of the ridge structure layer ranges from 120 to 300 nanometers.

* * * * *